US006738891B2

(12) United States Patent
Fujii et al.

(10) Patent No.: US 6,738,891 B2
(45) Date of Patent: May 18, 2004

(54) ARRAY TYPE PROCESSOR WITH STATE TRANSITION CONTROLLER IDENTIFYING SWITCH CONFIGURATION AND PROCESSING ELEMENT INSTRUCTION ADDRESS

(75) Inventors: Taro Fujii, Tokyo (JP); Masato Motomura, Tokyo (JP); Koichiro Furuta, Tokyo (JP)

(73) Assignee: NEC Corporation (JP)

( * ) Notice: Subject to any disclaimer, the term of this patent is extended or adjusted under 35 U.S.C. 154(b) by 547 days.

(21) Appl. No.: 09/792,394

(22) Filed: Feb. 23, 2001

(65) Prior Publication Data

US 2001/0018733 A1 Aug. 30, 2001

(30) Foreign Application Priority Data

Feb. 25, 2000 (JP) ........................... 2000/050067
Feb. 20, 2001 (JP) ........................... 2001/043202

(51) Int. Cl.[7] ................................. G06F 15/80
(52) U.S. Cl. ..................... 712/16; 712/10; 712/11; 712/15; 712/17
(58) Field of Search ................. 712/10, 11, 15, 712/16, 17

(56) References Cited

U.S. PATENT DOCUMENTS

| 3,979,728 A | 9/1976 | Reddaway ............... 712/16 |
| 4,065,808 A | 12/1977 | Schomberg et al. ........ 712/13 |
| 5,892,962 A | 4/1999 | Cloutier ................ 712/16 |
| 5,915,123 A * | 6/1999 | Mirsky et al. .............. 712/16 |
| 6,145,072 A * | 11/2000 | Shams et al. .............. 712/22 |
| 6,167,501 A * | 12/2000 | Barry et al. .............. 712/11 |
| 6,185,667 B1 | 2/2001 | Abercrombie et al. ....... 712/11 |

FOREIGN PATENT DOCUMENTS

| JP | 1-147767 | 6/1989 |
| JP | 4-291659 | 10/1992 |

OTHER PUBLICATIONS

Japanese Office Action issued Nov. 25, 2003 (with English translation of relevant portion).
L. Snyder, "Introduction to the Configurable, Highly Parallel Computer", *IEEE Computer*, Jan. 1982, pp. 47–56.

* cited by examiner

*Primary Examiner*—Kenneth S. Kim
(74) *Attorney, Agent, or Firm*—Dickstein, Shapiro, Morin & Oshinsky, LLP.

(57) ABSTRACT

To execute all processing in an array section of an array-type processor, each processor must execute processing of different types, i.e., processing of an operating unit and processing of a random logic circuit, which limits its size and processing performance. A data path section including processors arranged in an array are connected via programmable switches to primarily execute processing of operation and a state transition controller configured to easily implement a state transition function to control state transitions are independently disposed. These sections are configured in customized structure for respective processing purposes to efficiently implement and achieve the processing of operation and the control operation.

33 Claims, 38 Drawing Sheets

ARRAY-TYPE PROCESSOR 1

F I G. 2
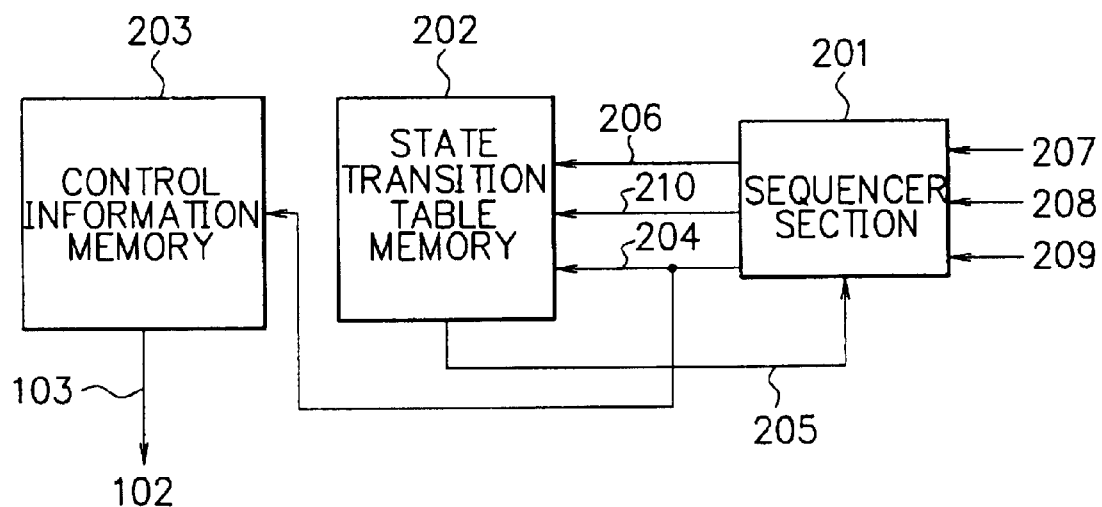

DATA PATH SECTION 102

STATE TRANSITION TABLE MEMORY 202

EVENT STATE TRANSITION TABLE 1101

DEFAULT STATE TRANSITION TABLE 1102

FORCED STATE TRANSITION TABLE 1103

STATE TRANSITION EXAMPLE

STATE TRANSITION TABLE MEMORY 202

MORMAL STATE TRANSITION TABLE 1301

FORCED STATE TRANSITION TABLE 1103

F I G. 28
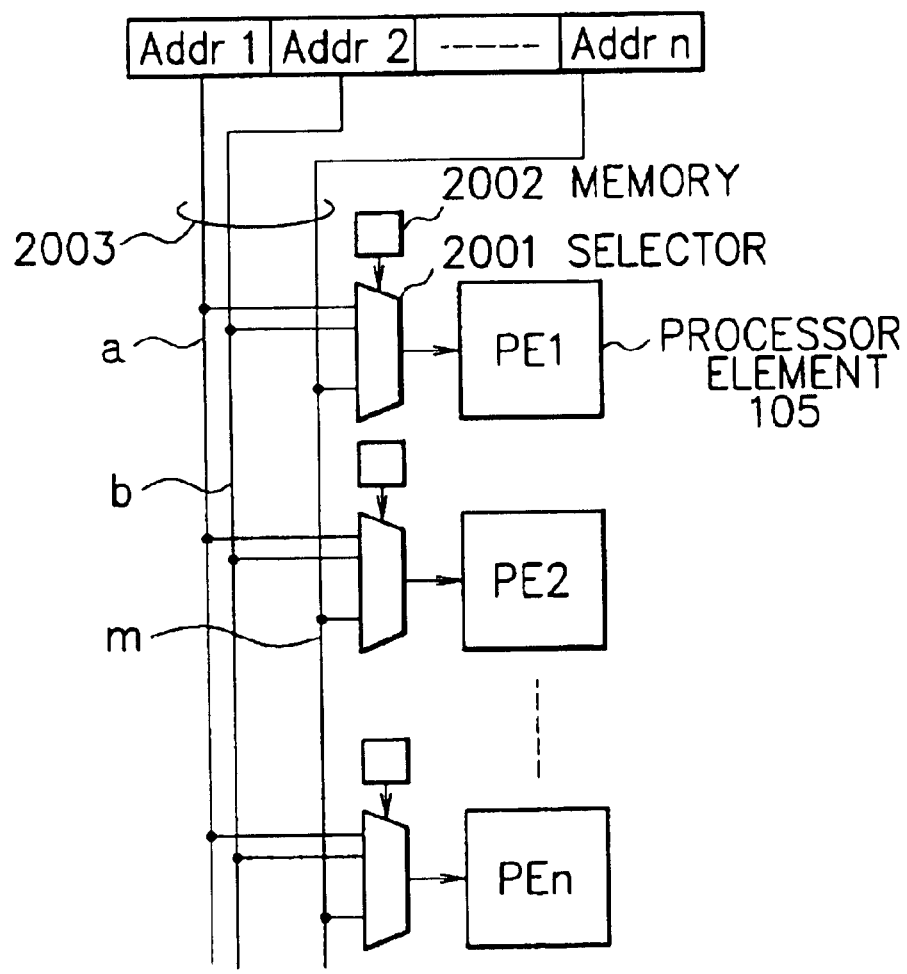

(a)

(b)

F I G. 35
(a)
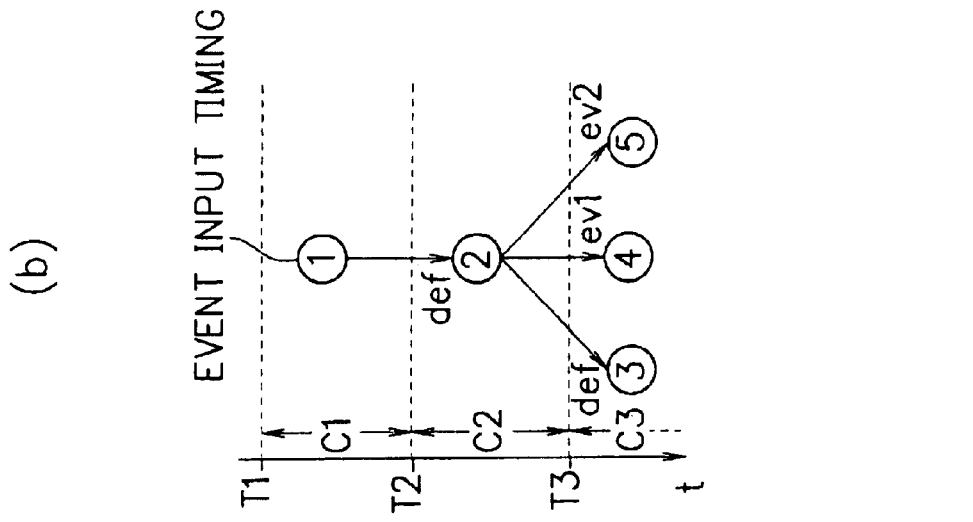
(b)
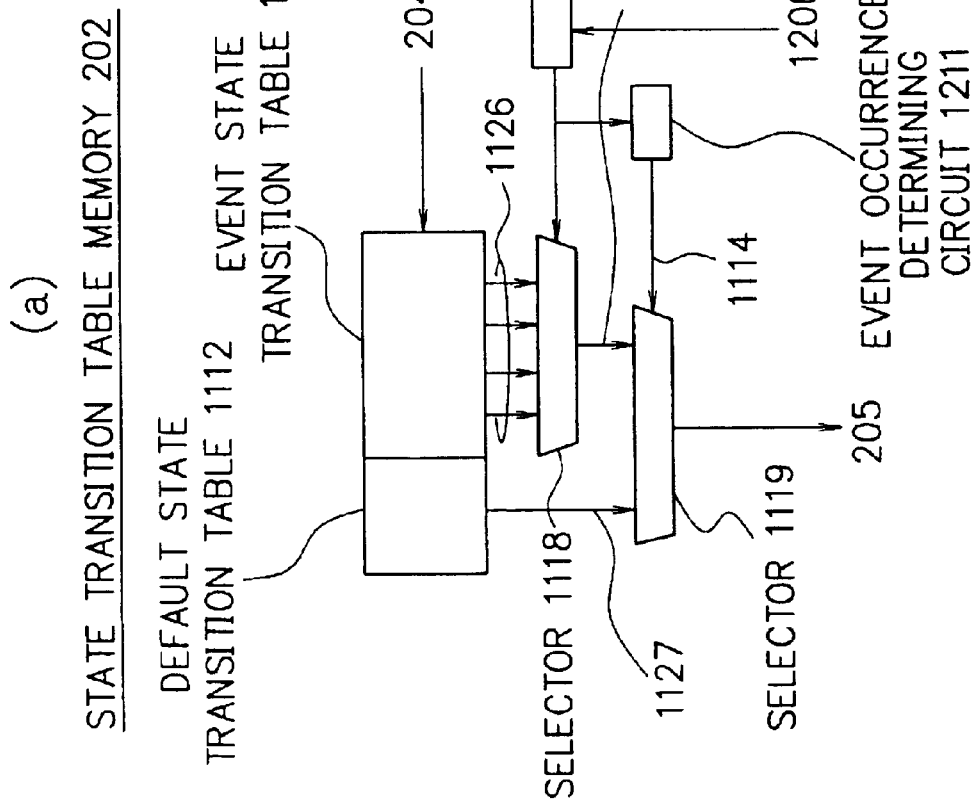

ARRAY TYPE PROCESSOR WITH STATE TRANSITION CONTROLLER IDENTIFYING SWITCH CONFIGURATION AND PROCESSING ELEMENT INSTRUCTION ADDRESS

BACKGROUND OF THE INVENTION

The present invention relates to a processor to execute processing a desired operation according to a program prepared therefor, and in particular, to an array-type processor including a plurality of processor elements arranged in a two-dimensional array shape.

DESCRIPTION OF THE PRIOR ART

The known programmable devices include various types of microprocessors in which instructions or commands stored in a memory are read in an order therefrom and are sequentially executed.

That is, in such a microprocessor, instructions each of which executes quite simple processing are ordered in a combination and are executed in an order to execute a target sequence of processing.

However, only several instructions can be simultaneously executed by one microprocessor. This limits improvement of processing performance or capacity.

Specifically, when the same processing is to be executed for a large amount of data, it is necessary to repeatedly execute sequential processing. Therefore, processing performance cannot be improved.

To surmount the limitation, a technique to concurrently (simultaneously) execute instructions by a plurality of processor elements is already known. Concretely, there exist various techniques depending on electric connections between the processor elements.

In the "Introduction To The Configurable, Highly Parallel Computer" (IEEE Computer, January 1982), Lawrence Snyder proposed one of the techniques. According to the proposal, a plurality of processor elements are disposed in an array shape and are electrically connected to each other using programmable switches (to be referred to as a first prior art technique hereinbelow).

The microprocessor of the first prior art technique executes concurrent processing by a plurality of processors to improve processing performance when compared with processing executed by one processor. Since processor elements are electrically connected by programmable switches, the electric connections between the elements can be established according to a purpose. Particularly, efficient processing can be executed in applications of data processing fields.

In the microprocessor, different kinds of processing, that is, processing based on an operating unit such as a data path and processing of a random logic circuit such as a control circuit are executed only by an array section of each processor element. It is therefore necessary to add general processing capacity to each processor element.

To meet requirements for miniaturization and high performance of microprocessors, a technique to customize the function of each processor element for it processing purpose is to be developed. However, the technique is quite difficult and hence there arises a problem that the requirements for miniaturization and high performance of microprocessors cannot be satisfied.

SUMMARY OF THE INVENTION

It is therefore an object of the present invention to provide an array-type processor, devised to remove the problem of the prior art, including processor elements arranged in an array shape and electrically connected by programmable switches. The array-type processor includes a data path section to primarily conduct processing of operation and a state transition control section configured for easy implementation of a state transition function or unit to control state transition. Each section is customized for each processing purpose to thereby miniaturize its size and to improve processing performance.

To achieve the object above in accordance with the present invention, there is provided an array-type processor comprising a state transition control section including a state transition table memory for storing a state transition table in which transition rules between a plurality of operation states are written, and a sequencer section for controlling, using the state transition table memory, transitions between the operation states and for determining the operation states at a particular point of time; and a data path section independent of said state transition control section, including a plurality of processor elements for executing processing of operations according to the operation states determined by said state transition control section and a plurality of programmable switch elements for connecting the processor elements to each other according to the operation states determined by said state transition control section. The processor elements and said programmable switch elements are electrically connected in a two-dimensional array shape. Each said processor element includes an instruction code memory for storing a plurality of instruction codes, an instruction decoder for decoding an instruction code read from said instruction code memory, and an operating section for executing processing of operation according to the instruction code decoded by said instruction decoder. Each said programmable switch element includes a connection layout information memory for storing a plurality of sets of connection layout information, the information indicating a connection layout between said processor elements and said programmable switch elements and/or between said programmable switch elements.

As above, the data path section to primarily conduct operation and the state transition control section are separated from each other and each there of is configured in a customized manner according to its processing purpose. Therefore, the operation and the control operation can be efficiently implemented and the processing can be effectively executed. This minimizes the array-type processor in size, and processing performance is improved.

Additionally, in accordance with the present invention, in the array-type processor, the state transition control section conducts a control operation according to a transition of the operation state by said state transition control section itself and/or a transition of the operation state by inputting an event from said data path section and/or a transition of the operation state by inputting an event from an external device.

The configuration allows the array-type processor to carry out a flexible control operation for detailed items and hence processing performance is improved.

Moreover, in accordance with the present invention, the array-type processor further comprises an operation control bus for electrically connecting said state transition control section to said data path section. The state transition control section outputs an address of said instruction code memory and/or an address of said connection layout information memory via said operation control bus according to the operation states at a particular point of time.

Thanks to the structure, the array-type processor can efficiently delivers control signals from the state transition control unit to the processor elements and the programmable switch elements.

Furthermore, in accordance with the present invention, the array-type processor further comprises one or more said operation control buses. The state transition control section outputs the address to said operation control buses. Each of the processor elements and/or each of the programmable switch elements select/selects one of said operation control buses to input the address.

In consequence, the array-type processor can effectively operate the processor elements and hence processing performance is increased.

In addition, in accordance with the present invention, in the array-type processor, the state transition control section concurrently supplies independent said addresses respectively to said processor elements and respectively to said programmable switch elements.

In this constitution, the array-type processor can effectively operate the processor elements in the data path section, which improves processing performance.

Furthermore, in accordance with the present invention, in the array-type processor, the processor elements and/or the programmable switch elements are classified into groups. The address is supplied to one of the groups.

Consequently, the array-type processor can effectively operate the processor elements classified into groups in the data path section and hence processing performance is increased.

Moreover, in accordance with the present invention, in the array-type processor, the address is supplied only to a part of the processor elements and/or a part of the programmable switch elements according to the operation states at a particular point of time. Each of other said processor elements and other said programmable switch elements continuously uses said address immediately used before the operation state at a particular point of time.

In this structure, the array-type processor can continuously execute processing by the processor elements and can accomplish a flexible control operation for detailed items, which leads to improvement of processing performance.

Additionally, in accordance with the present invention, in the array-type processor, the operation control buses are arranged for said processor elements and said programmable switch elements. The state transition control section outputs said address to said operation control buses. Each of said processor elements and/or said programmable switch elements selects one of said operation control buses in the vicinity thereof to obtain said address.

This simplifies the constitution of the array-type processor and hence the control operation is advantageously simplified.

Furthermore, in accordance with the present invention, in the array-type processor, the operation control buses are disposed respectively or independently for said processor elements and said programmable switch elements. The independent operation control buses are independent of each other. The operation control buses conduct mutually independent control operations for said processor elements and said programmable switch elements, respectively.

In consequence, the array-type processor is simplified in constitution and the control operation is facilitated.

In addition, in accordance with the present invention, in the array-type processor, each processor element includes a register for recording operation data.

Therefore, wiring efficiency between the operating section and the register is improved in the array-type processor. This minimizes the size of the array-type processor and increases processing performance.

Furthermore, in accordance with the present invention, in the array-type processor, each processor element executes processing of operation for external input data received from an external device or for the operation data under control of said state transition control section and outputs a result of the processing as output data to the external device or records a result of the processing in said register.

Thanks to the structure, the array-type processor can efficiently execute processing of operation and hence processing efficiency is improved.

Additionally, in accordance with the present invention, the array-type processor further includes an event notifying bus for electrically connecting said state transition control section to said data path section. The data path section notifies a result of processing as an event via said event notifying bus to said state transition control section.

Consequently, the array-type processor can achieve a flexible control operation for detailed items and can execute processing with high processing efficiency.

Furthermore, in accordance with the present invention, in the array-type processor, the sequencer section controls state transitions from the operation states to the same operation states or other different operation states according to the state transition rules written in said state transition table memory and sets said same operation states or said other different operation states as new operation states.

In the construction, the array-type processor can effectively conduct a control operation and hence processing efficiency is improved.

Additionally, in accordance with the present invention, in the array-type processor, the state transition table is recorded in a list format including a plurality of script entries of a plurality of operation states. Each of the script entries includes a state number to identify a first state at a point of time, a state number to identify a second state of a state transition destination at a subsequent point of time, and a state transition condition for a transition from the first state to the second state.

In the structure of the array-type processor, since the state transition table is configured in a list form including a plurality of script entries of operation states, the control operation can be efficiently and easily carried out with higher processing efficiency.

Furthermore, in accordance with the present invention, the state transition control section further comprises a control information memory for controlling an address of said instruction code memory and/or an address of said connection layout information memory in association with the first state number at the point of time or the second state number at the subsequent point of time. The address of said instruction code memory and/or the address of said connection layout information memory are/is identified using said control information memory according to the first state number at the point of time or the second state number at the subsequent point of time identified using said state transition table.

As above, the identification of the first state number at the point of time or the second state number at the subsequent point of time as the state transition destination and the identification of the address of said instruction code memory and/or the address of said connection layout information memory are/is accomplished using respectively different memories. Therefore, the circuit area on which memories are mounted can be reduced and the bit width of the connection control bus can be minimized without decreasing the degree of freedom to determine the state transition destination.

Additionally, in accordance with the present invention, the array-type processor further comprises a control information memory for controlling the next state number of the subsequent point of time and an address of said instruction code memory and/or an address of said connection layout information memory in association with the first state number at the point of time. The state transition table identifies the next state number of the subsequent point of time and the address of said instruction code memory and/or the address of said connection layout information memory using the first state number at the point of time.

Not only the next state number of the subsequent point of time, but also the address of said instruction code memory at the point of time can be identified according to the first state number of the point of time. This minimizes the number of operations to refer to memories and hence the processing can be executed at a higher speed.

Furthermore, in accordance with the present invention, in the array-type processor, the state transition table includes an event state transition table containing the entries, each said entry including a state number at a point of time, a state number at a subsequent point of time, and a state transition condition and a default state transition table containing the entries, each said entry includes a state number at a point of time and a state number of a subsequent point of time. A state transition is achieved when the state transition condition is satisfied, according to said event state transition table. A state transition is achieved when the state transition condition is not satisfied, according to said default state transition table.

Thanks to the configuration, the array-type processor can effectively achieve the state transition and the control operation is facilitated.

Moreover, in accordance with the present invention, in the array-type processor, a plurality of said script entries correspond to said state number at a certain point of time. The script entries respectively have different state transition conditions, in case when the number of said script entries for said state number is two or more.

Therefore, the degree of freedom for the array-type processor to achieve a state transition becomes higher. Therefore, the control operation becomes easier as a result.

In addition, in accordance with the present invention, in the array-type processor, the sequencer section generates an event identifying code from an event and searches said state transition table memory using the state number at a point of time and the event identifying code. When there is found in the search an entry which has a state number matching the state number at a point of time and for which the event identifying code satisfies the state transition condition, a state of the state transition destination is determined according to the state number at a subsequent point of time in the entry.

In the structure of the array-type processor, a destination of state transition can be determined by an operation in which the sequencer generates an event identifying code from an event and make a search through a state transition table memory. This increases the degree of freedom to select a control method.

Additionally, in accordance with the present invention, in the array-type processor, when the event is not notified, said sequencer section generates an event identifying code indicating that the event is not generated and searches said state transition table memory using a combination of the state number at a point of time and the event identifying code.

Consequently, in the array-type processor, even no event is generated, the sequencer can make a search through the state transition table memory to determine a destination of state transition.

Furthermore, in accordance with the present invention, in the array-type processor, the sequencer section generates an event identifying code from an event and searches said event state transition table using the state number at a point of time and the event identifying code and searches said default transition table memory using the state number at a point of time. When there is found in the search an entry for which the state number and the event identifying code result in a matching state, a state of the state transition destination is determined according to the state number at a subsequent point of time in the entry. When there is not found in the search an entry for which the state number and the event identifying code result in a matching state, a state of the state transition destination is determined according to the state number of a subsequent point of time in the script entry in the default state transition table for which the state number at a point of time results in a matching state.

In this manner, the array-type processor can determine a destination of state transition and the degree of freedom for selection of a control method is increased.

Moreover, in accordance with the present invention, in the array-type processor, the state number at a point of time and the event identifying code is inputted to a content address memory including said state transition table. A collation is concurrently conducted for the content address memory and the script entry. When the collation results in a matching state for the script entry, the state number at a next point of time of the script entry is outputted from the content address memory.

In this construction of the array-type processor, the state transition memory is adopted as a content address memory, and a state number at a subsequent point of time can be produced by achieving a collation through the content address memory. The control method can be more freely selected.

Additionally, in accordance with the present invention, in the array-type processor, when after start or completion of generation of the second state number of the subsequent point of time, an address of said instruction memory and/or an address of said connection layout information memory corresponding to the state of the state transition destination.

Therefore, in the array-type processor, the degree of freedom is increased for communication of signals between the state transition control section and the data path section. The array-type processor can achieve a flexible control operation for detailed items.

In accordance with the present invention, when the state of the state transition destination thus determined is assumed as the state at a point of time by the state transition control section, the system starts generating the address corresponding to the state at a point of time.

Therefore, the array-type processor can continuously achieve the same state transition.

In addition, in accordance with the present invention, the array-type processor further includes a register in a path from the start of generation of the address to when the address of said instruction code memory and/or the address of said connection layout information memory reach/reaches said processor elements and said programmable switch elements. The address generation start point of time and the point of time when said processor elements and said programmable switch elements receive the addresses/address are assigned to mutually different cycles.

In the array-type processor, the address generation start point and the point of time when the processor elements and the programmable switch elements receive an address are assigned to mutually different cycles. This leads to increase in the operation speed for the following reasons. The operation "processing operation+event propagation+address distribution" is not assigned to one cycle. Namely, the operation "processing operation+event propagation" and the operation "address distribution" are assigned to mutually different cycles. This makes it possible to beforehand issues addresses, and hence the delay in this point of a critical path can be removed.

Further more, in accordance with the present invention, the array-type processor, when said state transition control section determines that the state of the state transition destination matches the state at a point of time, generation of the address corresponding to the state at a point of time is started.

Thanks to the structure, the array-type processor can consecutively execute the same state transition.

Moreover, in accordance with the present invention, the array-type processor, a period of time from when the generation of the address is started to when the address of said instruction code memory and/or the address of said connection layout information memory reach/reaches said processor elements and said programmable switch elements is assigned to one independent cycle.

Consequently, in the structure of the array-type processor, the address generation start point and the point of time when the processor elements and the programmable switch elements receive an address are assigned to mutually different cycles. This increases the operation speed. Using registers and the like, the operation "processing operation +event propagation" and the operation "address distribution" can be assigned to mutually different cycles. This minimized the critical path and hence the operation speed is increased.

Additionally, in accordance with the present invention, the array-type processor further comprises a first register on a connection line to propagate the event identifying code from said sequencer section to said state transition table memory. The first register temporarily keeps the event identifying code on said connection line to thereby separate a cycle in which the address generation start point exists from a cycle in which said processor elements and said programmable switch elements receive the address of said instruction code memory and/or the address of said connection layout information memory.

In this construction, the array-type processor can operate such that the point of time of the instruction code address generation and the point of time of arrival of the generated instruction code address at the processor elements 105 and the programmable switch elements 106 are respectively in different cycles. Therefore, the instruction code address can be issued at timing independent of other configurations or sections, and hence the control operation can be achieved with higher reliability.

In addition, in accordance with the present invention, in the array-type processor, the state transition table memory includes one or more second registers each of which keeps the state number at the subsequent point of time in each entry including the state number at a point of time. The state transition table memory selects and outputs, when the state transition condition is satisfied, either one of the state numbers of the subsequent points of time kept in said second registers, the selected one state number satisfying the state transition condition.

Thanks to the constitution, in the array-type processor, an instruction code address for a state number at a subsequent point of time can be issued to the data path section regardless of presence or absence of an input of a state number at a point of time to the event state transition table. This consequently improves reliability of the control operation.

Furthermore, in accordance with the present invention, the array-type processor further comprises a selector for selecting whether or not each of said first and second registers is to be used. The instruction code includes control information for controlling whether or not said first register and said second register are to be used. The selector selects, according to said instruction code, whether or not said first register and said second register are to be used.

By the construction, the array-type processor can execute the control operation more precisely according to the state. This advantageously leads to improvement of reliability of the control operation.

Moreover, in accordance with the present invention, the array-type processor, the state transition control section includes a clock signal input terminal and synchronizes operation of a transition of the operation state at a rising point and/or a falling point of a clock signal inputted to said clock signal input terminal.

In the array-type processor, since the operation of state transition between operation states is carried out in at synchronized timing, the control operation can be accomplished with high precision.

Additionally, in accordance with the present invention, in the array-type processor, the state transition control section forcibly conducts a transition of the operation state by a forced state transition signal to cause a state transition regardless of the operation state at the current point.

Therefore, the array-type processor forcibly conducts a transition between operation states, and hence the control operation can be easily achieved.

Additionally, in accordance with the present invention, the array-type processor, the state transition table includes a forced state transition table to detect a matching state with respect to the event identifying code inputted thereto. When said forced state transition table contains a script entry matching the event identifying code inputted to said state transition table, a state number of a subsequent point of time described in the entry is forcibly set as a state of the state transition destination.

As above, in the constitution of the array-type processor, a transition between operation states is forcibly carried out. This advantageously facilitates the control operation.

Furthermore, in accordance with the present invention, the array-type processor, the state transition control section includes an operation control information memory for controlling said data path section.

Consequently, with provision of the operation control information memory, the array-type processor can efficiently control the data path section.

BRIEF DESCRIPTION OF THE DRAWINGS

The objects and features of the present invention will become more apparent from the consideration of the following detailed description taken in conjunction with the accompanying drawings in which:

FIG. 2 is a schematic block diagram showing a first embodiment of a state transition control section in an array-type processor in accordance with the present invention;

FIG. 28 is a schematic diagram showing a seventh embodiment of a control method of the data path section using the operation control information memory in an array-type processor in accordance with the present invention;

FIG. 35 is a schematic diagram to explain a second embodiment of instruction code address issuance timing of a state transition table memory in an array-type processor in accordance with the present invention in which (a) is a schematic block diagram of the second embodiment and (b) is a state transition timing chart of the second embodiment;

DESCRIPTION OF THE EMBODIMENTS

Referring next to the drawings, description will be given of an array-type processor in accordance with the present invention.

First, description will be given of an embodiment of an array-type processor in accordance with the present invention.

[Embodiments of Array-Type Processor]

Figure 1:
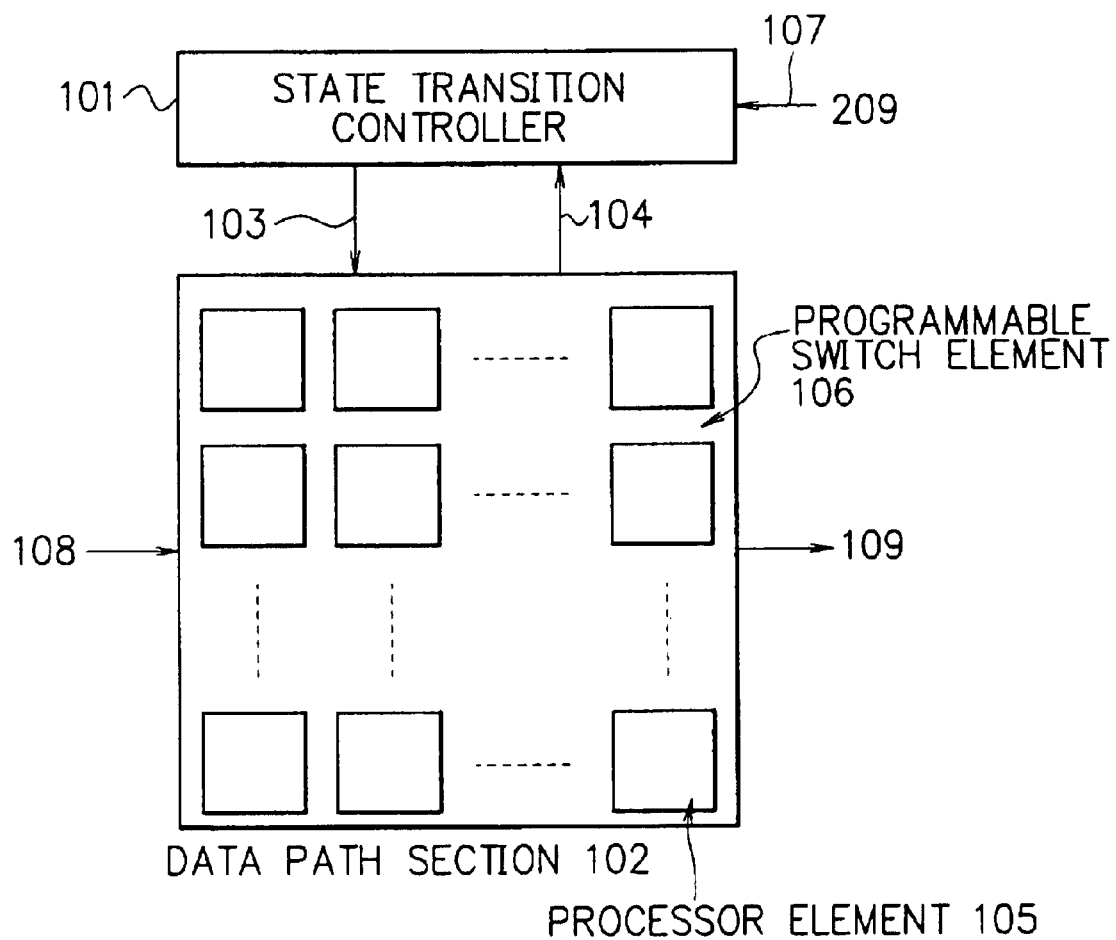
FIG. 1 is a schematic block diagram showing an embodiment of an array-type processor in accordance with the present invention.

FIG. 1 shows an embodiment of an array-type processor in accordance with the present invention in a schematic block diagram.

<Configuration of Array-Type Processor >
[First Embodiment of Array-Type Processor]

Description will be given of a first embodiment of an array-type processor shown in FIG. 1.

In the configuration of FIG. 1, an array-type processor 1 includes primarily two independent constituent elements, namely, a state transition control section 101 electrically connected to an operation control bus 103, an event notifying bus 104, and an external event bus 107 and a data path section 102 to execute processing of operation under control of the state transition control section 101. In the data path section 102, a plurality of processor elements 105 and a plurality of programmable switch elements 106 to electrically connect the processor elements to each other are connected to each other in a two-dimensional array shape.

The state transition controller 101 controls transition of an operation state, namely, basically serves as a state transition unit.

Preferably, the state transition controller 101 operates such that an operation state transition takes place under control of the controller 101 itself (i.e., a closed state in which the transition occurs according to decision by the controller 101 regardless of signals inputted) and/or an operation state transition takes place when an event is inputted via the event notifying bus 104 from the data path section and/or an operation state transition takes place when an event is inputted via the external event bus 107 from an external device disposed outside the array-type processor 1. Therefore, the array-type processor 1 can achieve a flexible control operation for detailed items and hence its processing performance is improved.

Desirably, the array-type processor 1 includes the operation control bus 103 to electrically connect the state transition controller 101 to the data path section 102. According to the operation state, the state transition control section 101 outputs an address of an instruction code memory and/or an address of a connection layout information memory, which will be described later, via the operation control bus 103. The controller 101 can therefore efficiently output control signals to the processor elements 105 and the programmable switch elements 106.

That is, in the data path section 102, operation of the processor elements 105 and a relationship of electric connection of the programmable switch elements 106 are determined according to an address of the instruction code memory to store instruction codes and an address of the connection layout information memory indicating the connection layout between the programmable switch elements 106. These addresses will be collectively called an instruction code address when necessary herebelow.

Specifically, each processor element 105 conducts operation according to an instruction code address inputted thereto. Each programmable switch element 106 similarly conducts internal and external electric connections of the data path section 102.

Resultantly, the data path section processes a data input 108 or data recorded in the data path section 102 by a register, which will be described later. The data path section 102 outputs a result of the processing as a data output 109 or records the result therein.

The number of operation control bus 103 of the array-type processor 1 is not limited to one. The processor 1 may includes two or more operation control buses 103 and may be configured such that each processor element 105 and/or each programmable switch element 106 selects one operation control bus 103 to receive an instruction code address. This enables the processor elements 105 to efficiently conduct operation and hence processing performance is improved.

Preferably, in the array-type processor 1, the state transition controller 101 concurrently supplies mutually independent addresses respectively to the pertinent processor element 105 and the pertinent programmable switch element 106. The processor elements 105 in the data path section can therefore efficiently conduct operation to improve processing efficiency.

In the basic operation of the array-type processor 1, the state transition controller 101 first controls operation state transition and thereby outputs an instruction code address indicating processing to be executed in a state at a point of time (to be simply referred to as a current state hereinbelow) via the operation control bus 103 to the data path section 102.

Subsequently, the data path section 102 executes processing according to the current state and sends an event resultant from the data path section 102 via the event notifying bus 104 to the state transition controller 101.

The state transition controller 102 makes a transition to a next operation state according to the invent input, an external event input, or operation of the state transition controller 101 itself. By repeatedly conducting the operation above, the controller 102 supervises execution of a sequence of operations.

<Configuration of State Transition Controller>
[First Embodiment of State Transition Controller]

Referring next to the drawings, description will be given of a suitable first embodiment of the state transition controller 101 in accordance with the present invention.

FIG. 2 shows in a simple block diagram a configuration of the state transition controller 101 in the array-type processor 1 in according to the present invention.

The controller of FIG. 2 includes a state transition table memory 202 to store a state transition table in which transition rules between a plurality of states are written, a sequencer section 201 to determine a subsequent state by controlling transitions between a plurality of states using the memory 202, and a control information memory 203 to deliver an instruction code to the data path section 102.

The sequencer 201 receives a clock signal 207, a reset signal 208, an event signal 209, and a next state number 205 to accordingly produce an event identifying code 206 and/or a forced event identifying code 210 and a current state number 204.

The current state number 204 is a number to identify a current state (also called "a state number at a point of time" in this specification).

The next state indicates a state next to the current state in transition. The next state number 205 is similarly called a number to identify a next state (also called "a state number at a next point of time in this specification).

In this specification, "a state" indicates a state of the processor element 105 or a programmable switch element 106.

The state transition table memory 202 receives the event identifying code 206 and/or a forced event identifying code 210 and the current state number 204 to produce the next state number 205.

The control information memory 203 outputs an instruction code address to the operation control bus 103 according to an input of the current state number 204.

In short, in the state transition control section 101, when the sequencer 201 serves as a state transition unit, namely, produces the current state number 204 and the event identifying code 206 and/or the forced event identifying code 210, the state transition table memory 202 sends a next state number 205 according to a combination of the number 204 and the code 206 to the sequencer 201.

The sequencer 201 outputs the next state number 205 as a subsequent current state number 204.

The state transition unit means a unit to cause transitions between a plurality of operation states.

The event identifying code 206 is a signal generated according to the clock signal 207, the reset signal 208, and the event signal 209 received by the sequencer 201 (in the naming of these signals, "signal" is omitted depending on cases).

The event signal 209 is electrically connected to the event notifying bus 104 and the external event bus 107.

This leads to an operation of the state transition unit, namely, the combination of a state indicated by the current state number 204 and an event designated by the event identifying cod 206 determines a subsequent state.

In addition, similarly, the forced event identifying code 210 is generated in response to each of the input signals to the sequencer section 201, namely, the reset signal 208 and the event signal 209. That is, the forced event identifying code 210 is supplied as an input signal from another section.

However, the event identifying code 206 and the forced event identifying code 210 need not be discriminated from each other. Namely, these codes may be of the same configuration. The codes 206 and 210 will be described later in conjunction with FIG. 13.

The control information memory 203 stores instruction code addresses. On receiving a current state number 204 delivered from the sequencer 201, the control information memory 203 outputs an associated instruction code address via the operation control bus 103 to the data path section 102.

The instruction code address(es) determines operation of the data path section 102 as described above.

As a result, there is implemented a system in which the data path section 102 operates according to the current state.

The array-type processor 1, which will be described later by referring to FIG. 5, may be constructed without using the control information memory 203. In this situation, the control information memory 203 does not output the instruction code address, namely, the state transition table memory 202 produces, in addition to the next state number 205, an instruction code address (corresponding to the instruction code address 1505 of FIG. 16 for explaining details of the associated state transition table memory 202).

Figure 16:
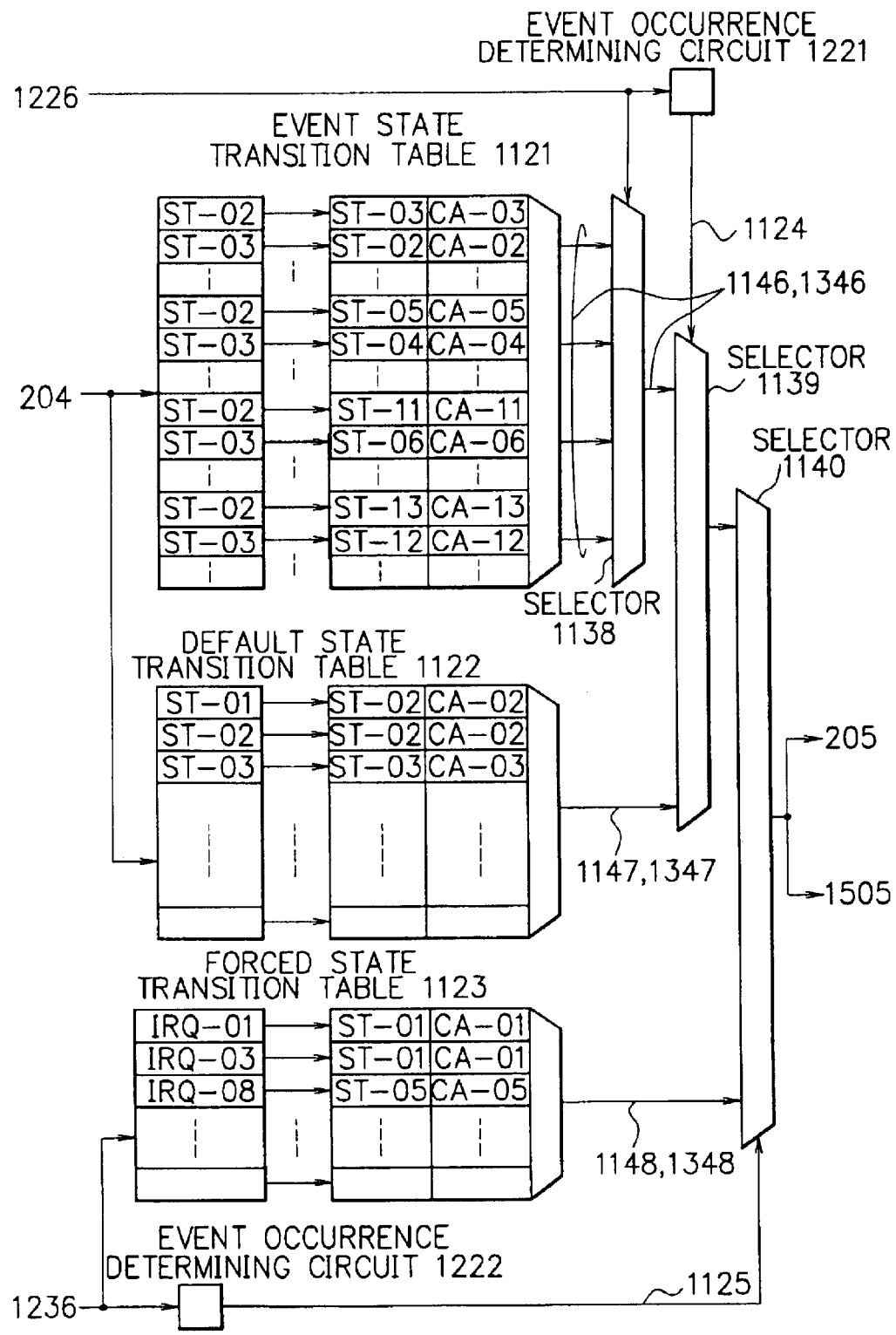
FIG. 16 is a schematic block diagram showing a third embodiment of the state transition table memory in an array-type processor in accordance with the present invention.

However, the state transition table memory 202 in this situation is configured, for example, as shown in FIG. 16.

Figure 5:
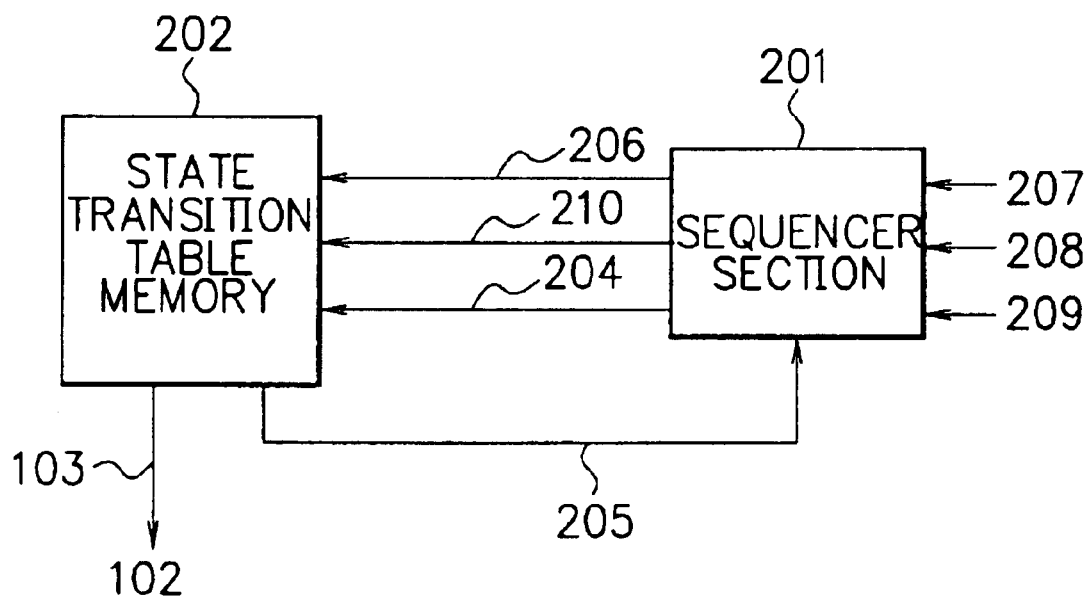
FIG. 5 is a schematic block diagram showing a third embodiment of the state transition control section in an array-type processor in accordance with the present invention.

The configuration may be implemented in FIG. 5 such that the instruction code address 1505 is not produced, but the next state number 205 is delivered as an instruction code address via the control information bus 103 to the data path section 102. In this occasion, in the data path section 102, the operation state transition of each processor element 105 and/or the connection state transition of each programmable switch element 106 are/is executed according to the received next state number 205. However, in this configuration, the degree of freedom is slightly restricted for the operation state or the connection state as the transition destination of each processor element 105 and each programmable switch element 105 in the data path section 102. This drawback is removed by the configuration above in which the state transition table memory 202 produced both of the next state number 205 and the instruction code address. The configuration will be later by referring to FIG. 16.

Preferably, the array-type processor 1 may be constructed such that the sequencer section 201 of the state transition controller 101 includes a clock signal input terminal. In this structure, the operation state transition is achieved at timing synchronized with a rise time and/or a fall time of the clock signal 207 supplied to the clock input terminal. The control operation can be conducted with higher precision.

The array-type processor 1 may forcibly operation of the sequencer 201 according to an input of the reset signal 208 to set the current state number 204 to an initial value.

Moreover, the array-type processor 1 may forcibly change the current state number 204 according to an input of the reset signal 208.

For example, when the processor elements 105 and/or the programmable switch elements 106 are classified into groups as in a fourth embodiment of the data path section 102, which will be described later, it is preferable to concurrently supply mutually independent addresses to the groups, respectively. As a result, the array-type processor 1 can efficiently operate the processor elements 105 grouped in the data path section 102 and hence processing performance is improved.

In the array-type processor 1, the operation of the processor elements 105 and the electric connections between the programmable switch elements are basically determined by an instruction code address from the state transition control section 101. However, part of or the all of the determination of the operation and the electric connections may be conducted by other than the state transition controller 101. That is, the determination is achieved directly by an event signal produced by the data path section 102.

Preferably, the array-type processor 1 supplies addresses corresponding to a plurality of states only to part of processor elements 105 and/or part of programmable switch elements 106 and continuously uses the addresses being used immediately before the to plurality of states to the remaining processor elements 105 and/or the remaining programmable switch elements 106. The processor elements 105 can therefore continuously execute processing. Therefore, part of processing can be continuously executed in the previous operation (state) and part thereof can be executed in another operation (state). It is possible for the array-type processor 1 to conduct a flexible control operation and hence processing efficiency is improved.

This constitution will be described in detail later by referring to an embodiment.

The data path section 102 can notify an operation result as an event via the event notifying bus 104 to the state transition controller 101. The array-type processor 1 can resultantly carry out a flexible control operation.

<Second Embodiment of State Transition Controller Section>

Referring next to the drawings, description will be given of a second embodiment the state transition controller.

Figure 3:
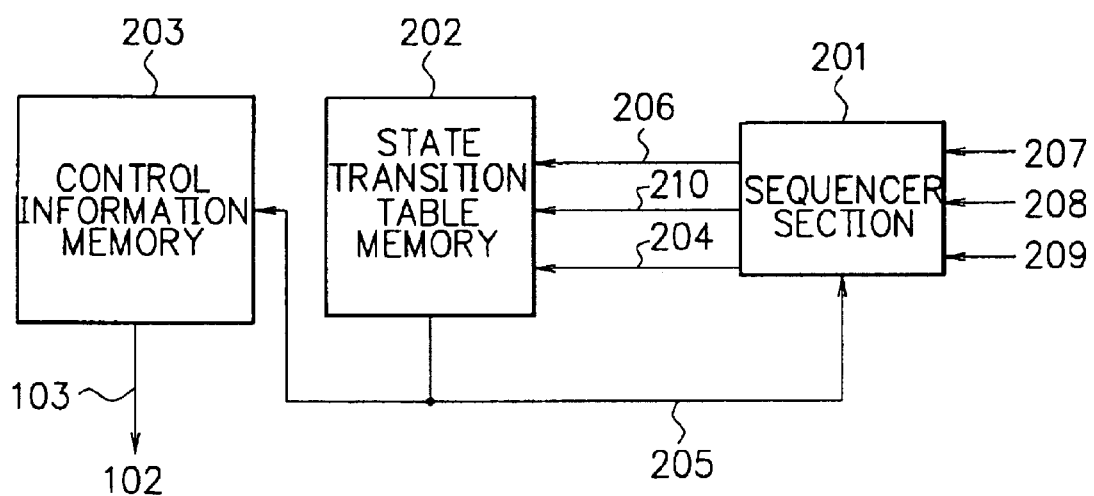
FIG. 3 is a schematic block diagram showing a second embodiment of the state transition control section in an array-type processor in accordance with the present invention.

FIG. 3 shows in a schematic block diagram a second embodiment of the state transition controller 101 in the embodiment of an array-type processor 1 in accordance with the present invention.

In FIG. 3, a state transition control section 101 differs from that shown in FIG. 2. In the configuration of FIG. 3, the next state number 205 is fed to the control information memory 203 and an instruction of address of a subsequent state is delivered to the operation control bus 103.

In this structure, the array-type processor 1 conducts validation or assertion of the state transition of the sequence section 201 to assert or to validate the next state number 205 as the current state number 204. When each processor element 105 and each programmable switch element 106 asserts an instruction code address from the operation control bus 102, each processor element 105 and each programmable switch element 106 can start execution of an instruction in a concurrent fashion with the operation of state transition.

The initiation of the instruction execution, namely, of the operation will be described by referring to the drawings.

Figure 4:
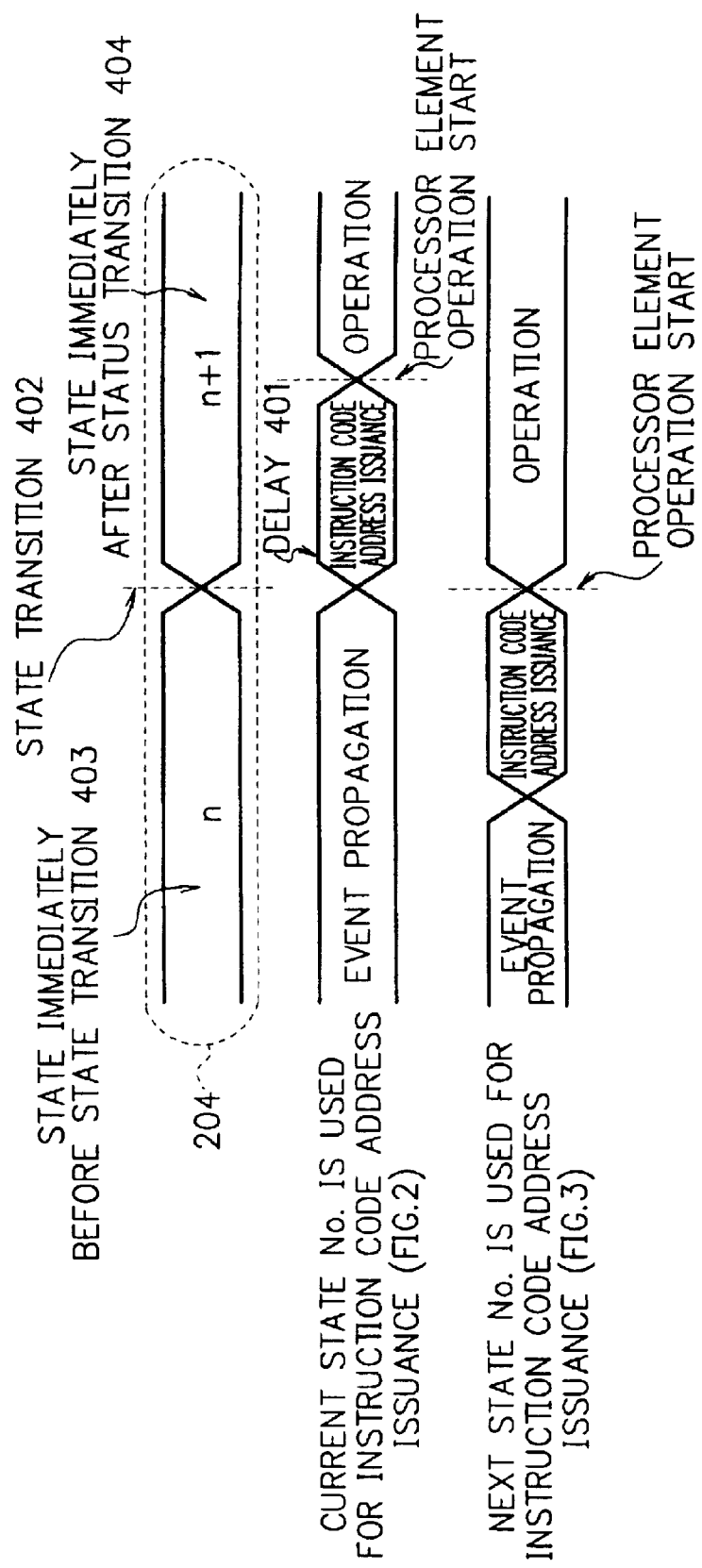
FIG. 4 is a signal timing chart of instruction code address issuance in the state transition control section shown in FIGS. 2 and 3.

FIG. 4 shows in a signal timing chart an operation of the state transition controller shown in FIGS. 2 and 3 to issue an instruction code address.

According to the timing chart of FIG. 4, when a current state number is used to issue an instruction code address (FIG. 2), a delay 401 from when the sequencer 201 issues a current state number 204 to when instruction code address outputted from the control information memory 203 reaches each processor element 105 and each programmable switch element 106 is necessary from a state transition 402 to when each processor element 105 and each programmable switch element 106 executes an instruction.

In contrast thereto, when a next state number 204 is used to issue an instruction code address (FIG. 3), an instruction address is issued before the delay 401 and hence the delay can be avoided.

However, a delay 401 for issuance of an instruction code address is included in a state 403 immediately before a state transition.

To avoid the delay, the array-type processor 1 may be configured, which will be described in a last part of the specification by referring to a configuration example, such that an electrically insulating register is disposed in a path from an output of the next state number 205 from the state transition table memory 202 to reception of an instruction code address by each processor element 105 and each programmable switch element 106. This distributes the delay 401 for issuance of an instruction code address to a state 403 immediately before the state transition 402 and a state 404 immediately after the state transition 402. Alternatively, the array-type processor 1 may be constructed such that the delay 401 for issuance of an instruction code address is separated as an event in one cycle to thereby conceal the delay 401.

<Third Embodiment of State Transition Controller Section>

The state transition control section 101 shown in FIG. 3 may be implemented in a variation shown in FIG. 5. This is referred to as a third embodiment of the state transition control section 101 in the description below.

Referring to the drawings, description will next be given of the third embodiment of the state transition control section 101.

FIG. 5 shows a schematic block diagram of the third embodiment of the state transition control section 101 in the array-type processor in accordance with the present invention.

In the configuration of FIG. 5, the state transition control section 101 differs from the second embodiment of the state transition controller shown in FIG. 3 in that the control information 203 is removed and the state transition table memory 202 is connected via the operation control bus 103 directly to the data path section 102.

In contrast with the second embodiment of the state transition controller in which the memory referring operation is accomplished for the state transition table memory 202 and the control information memory 202, the configuration of the third embodiment achieves only one memory referring operation for the state transition table memory 202. That is, the second embodiment identifies, according to the current state number 204 fed from the sequencer section 201, a subsequent state number 205 associated therewith in the state transition table memory 202 is identified and the next state number 205 is concurrently fed to the sequencer section 201 and the control information memory 203. Thereafter, an associated instruction code address is identified in the control information memory 203. However, in the third embodiment shown in FIG. 5, the state transition table memory 202 identifies a subsequent state number 205 corresponding to a current state number 204 delivered from the sequencer section 201 and an instruction code address (corresponding to the instruction code address 1505 in FIG. 16 to explain details of the associated state transition table memory 202) such that the obtained subsequent state number 205 is fed to the sequencer section 201 and the instruction code address is supplied to the data path section 102.

Thanks to the construction, the array-type processor 1 of this embodiment can execute processing of memory referencing operations at a time. This increases the processing speed.

Figure 6:
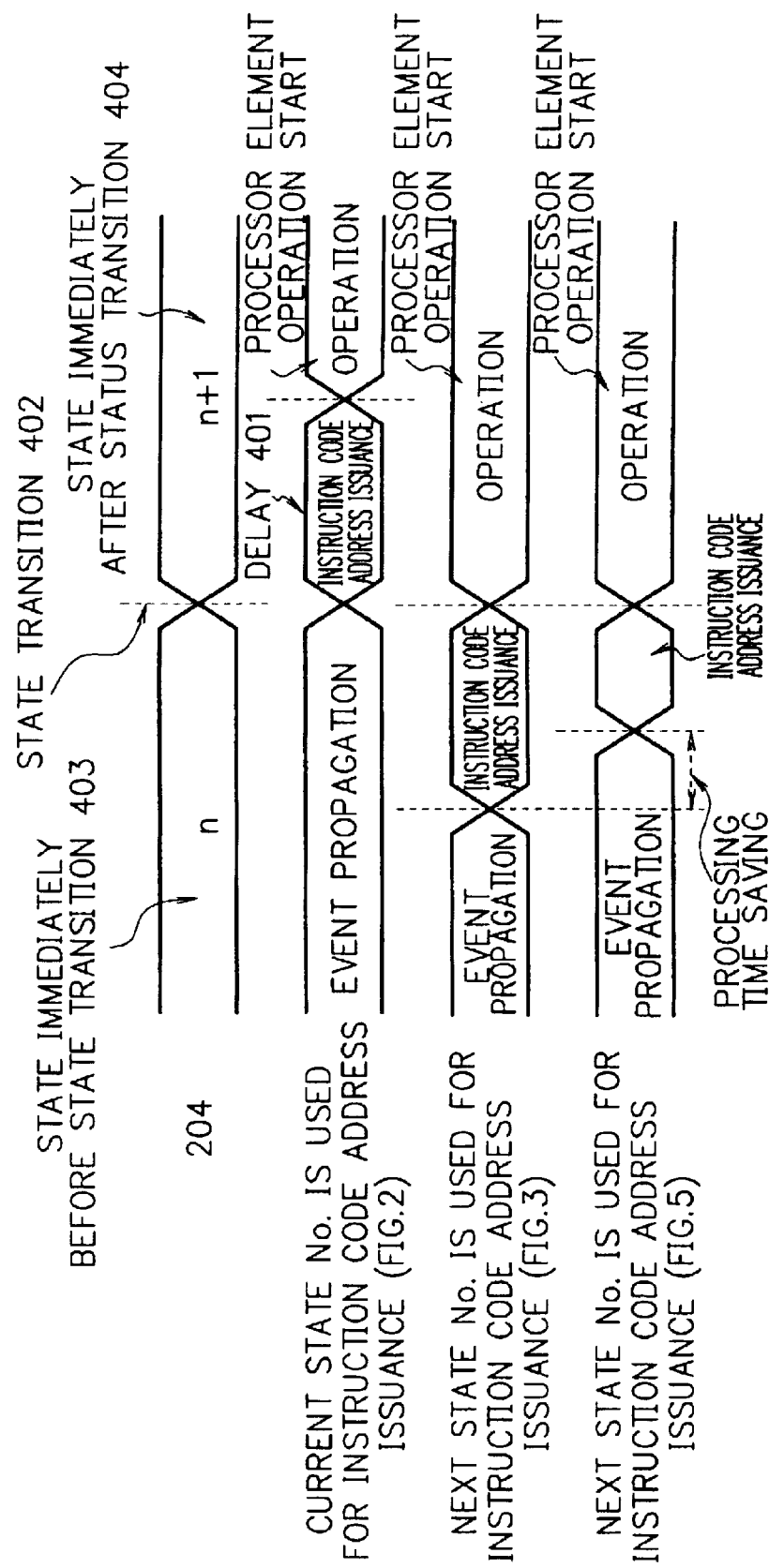
FIG. 6 is a signal timing chart of issuance of an instruction code address in the state transition control section shown in FIG. 5.

FIG. 6 shows a signal timing chart to schematically explain the processing. Referring to the chart of FIG. 6, the period of time to issue an instruction code address is minimized, namely, the delay by the second memory access (to the control information memory 203) is removed in this embodiment when compared with the second embodiment of the state transition control section. As a result, the period of time from the event propagation to the operation start point of the processor elements in the data path section is reduced. This advantage is obtained that the processing requires only one memory reference operation.

Data Path Configuration

[First Embodiment of Data Path Section]

Next, a first embodiment of the data path section 102 will be described by referring to the drawings.

Figure 7:
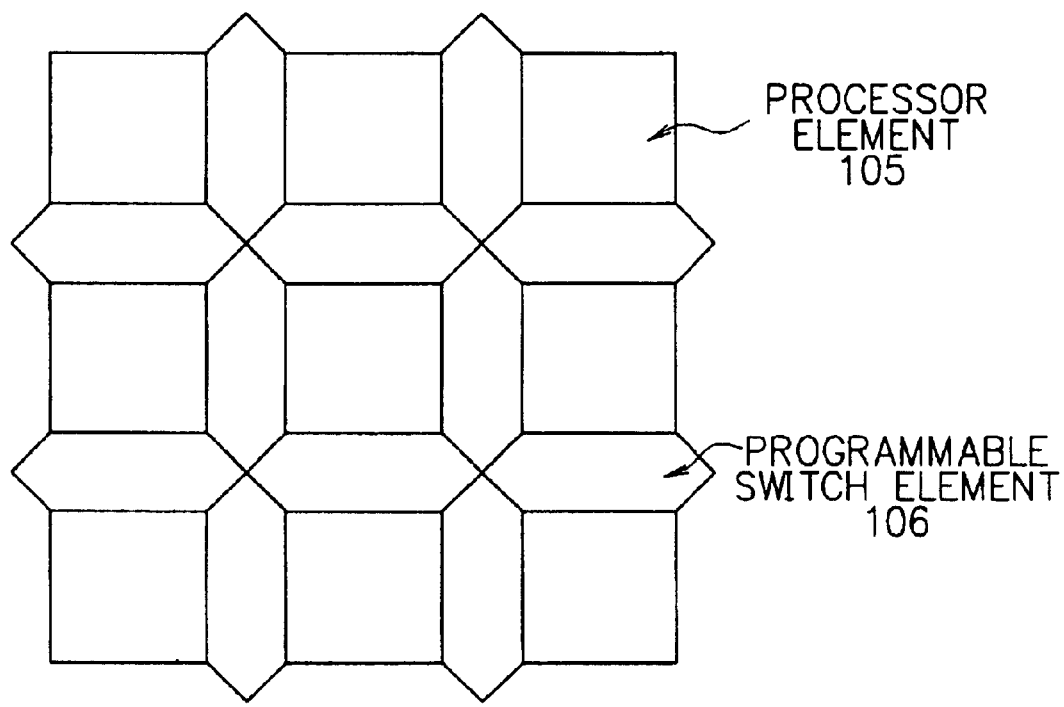
FIG. 7 is a conceptual diagram showing a first embodiment of a data path section in an array-type processor in accordance with the present invention.

FIG. 7 shows in a schematic diagram the first embodiment of the data path section 102 in an array-type processor in accordance with the present invention.

The data path section 102 of FIG. 7 includes processor elements 105 and programmable switch elements 106 in an array layout.

In the configuration, adjacent processor elements 105 are connected via a programmable switch element 106 to each other.

Each processor element 105 is electrically connected to one or more programmable switch elements. The processor element is further connected, with or without a predetermined restriction, to another processor element 105 or an external device with respect to the data path section 102.

Figure 8:
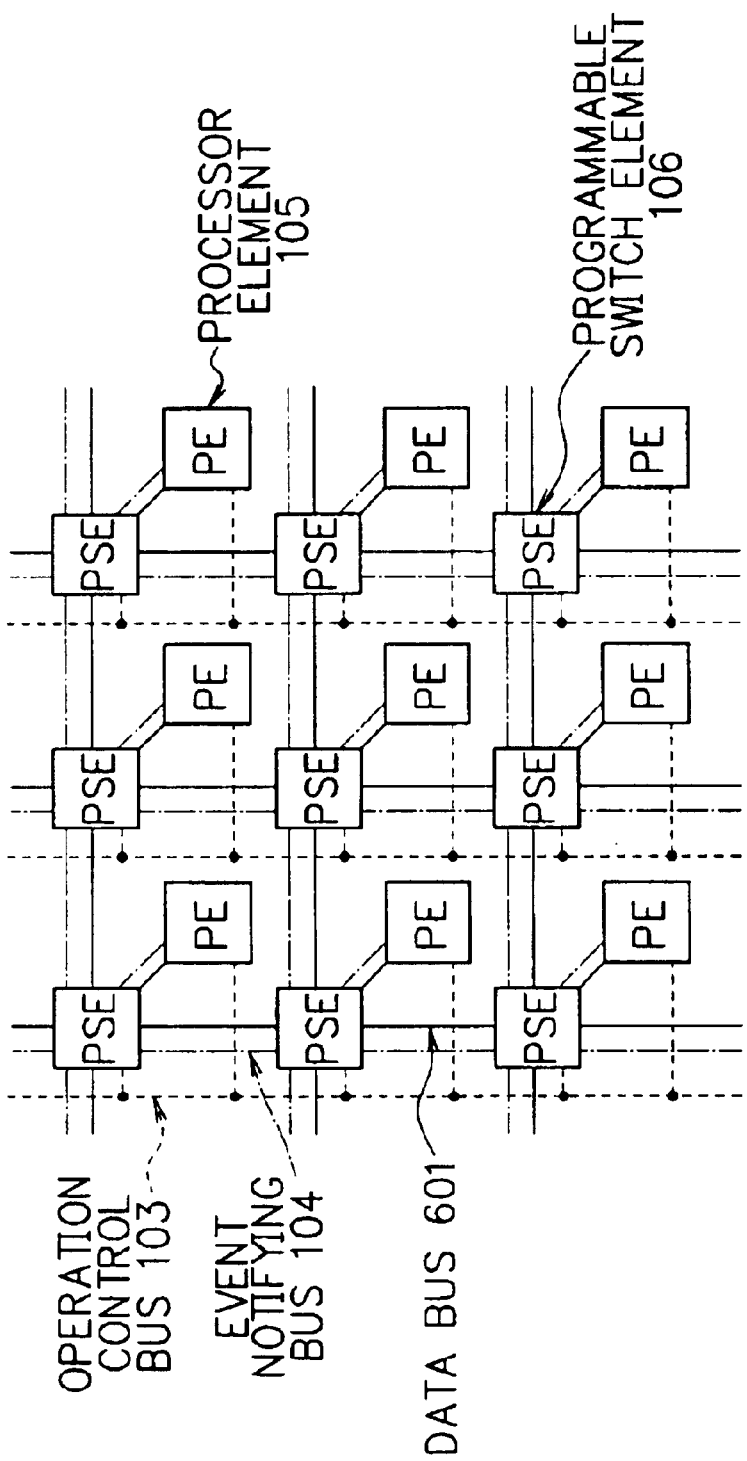
FIG. 8 is a schematic block diagram showing a first embodiment of a data path section in an array-type processor in accordance with the present invention.

FIG. 8 shows in a simple block diagram a first embodiment of the data path section 102 in an array-type processor in accordance with the present invention.

In FIG. 8, the data path section 102 includes processor elements 105 and programmable switch elements 106 in a matrix layout.

Each programmable switch element 106 is electrically connected to a data bus 601 and an event notifying bus 104 arranged in a grid layout and to one of the operation control buses 103 disposed in parallel to each other in a column direction.

Each programmable switch element 106 can set connection of a data bus 601 electrically connected thereto to on and off. Similarly, each programmable switch element 106 can set connection of an event bus 104 electrically connected thereto to on and off. However, each programmable switch element 106 does not conduct the turn on/off operation for the connection of all data buses 601 and all event notifying bus 104 and the operation may be limited depending on situations for the following reasons. If the system is configured such that each programmable switch element 106 achieves the turn on/off operation for the connection of all data buses 601 and all event notifying bus 104, the degree of freedom is increased for the connection. However, wiring is conducted for each fragment (a connecting switch is disposed for each programmable switch element 106) and hence the delay is increased. Furthermore, when each programmable switch element 106 achieves the turn on/off operation for the connection of all data buses 601 and all event notifying bus 104, a large amount of information is required to control the operation. Therefore, the switch is not disposed for all buses (the data buses 601 and the event notifying buses 104), but is partially arranged for the buses to establish appropriate integration of the overall system.

Additionally, in this configuration, the data bus 601 is included in the programmable switch element 106 of FIG. 7 and is used to connect the programmable switch elements 106 to each other.

Each processor element 105 is electrically connected to a data bus 601 and an event notifying bus 104 associated with a programmable switch element 106 corresponding to the processor element 105 and to one of the operation control buses 103 arranged in parallel to each other in a column direction.

In this configuration, the processor element 105 can achieve a data input operation 108 and a data output operation 109 via the programmable switch element 106 and can similarly carry out issuance and reception of an event.

The data path section 102 may be configured such that the event notifying bus 104 is incorporated in the data bus 601.

In the data path section 102, the operation control buses 103 are wired to the associated processor elements 105 and the associated programmable switch elements 106. The operation control bus 103 outputs an instruction code address to each associated processor element 105 and each associated programmable switch element 106 to determine operation of each element.

Although the space of the operation control buses 103 is minimized by the configuration, the operation control buses 103 are not restricted by the constitution.

For example, the operation control buses 103 may be arranged in a grid layout for the processor elements 105 and the programmable switch elements 106 such that each processor element 105 and each programmable switch element 106 select either one of the adjacent operation control buses 103 to obtain an address. In this configuration, the array-type processor 1 can precisely conduct a flexible control operation.

Moreover, for example, there may be arranged an independent operation control bus 103 for the processor elements 105 and an independent operation control bus 103 for the programmable switch elements 106 to independently control the processor elements 105 and the programmable switch elements 106. This extends degree of freedom of control. The array-type processor 1 is simplified in constitution and the control operation is facilitated.

[Second Embodiment of Data Path Section]

Referring now to the drawings, description will be given of a second embodiment of the data path section 102.

Figure 9:
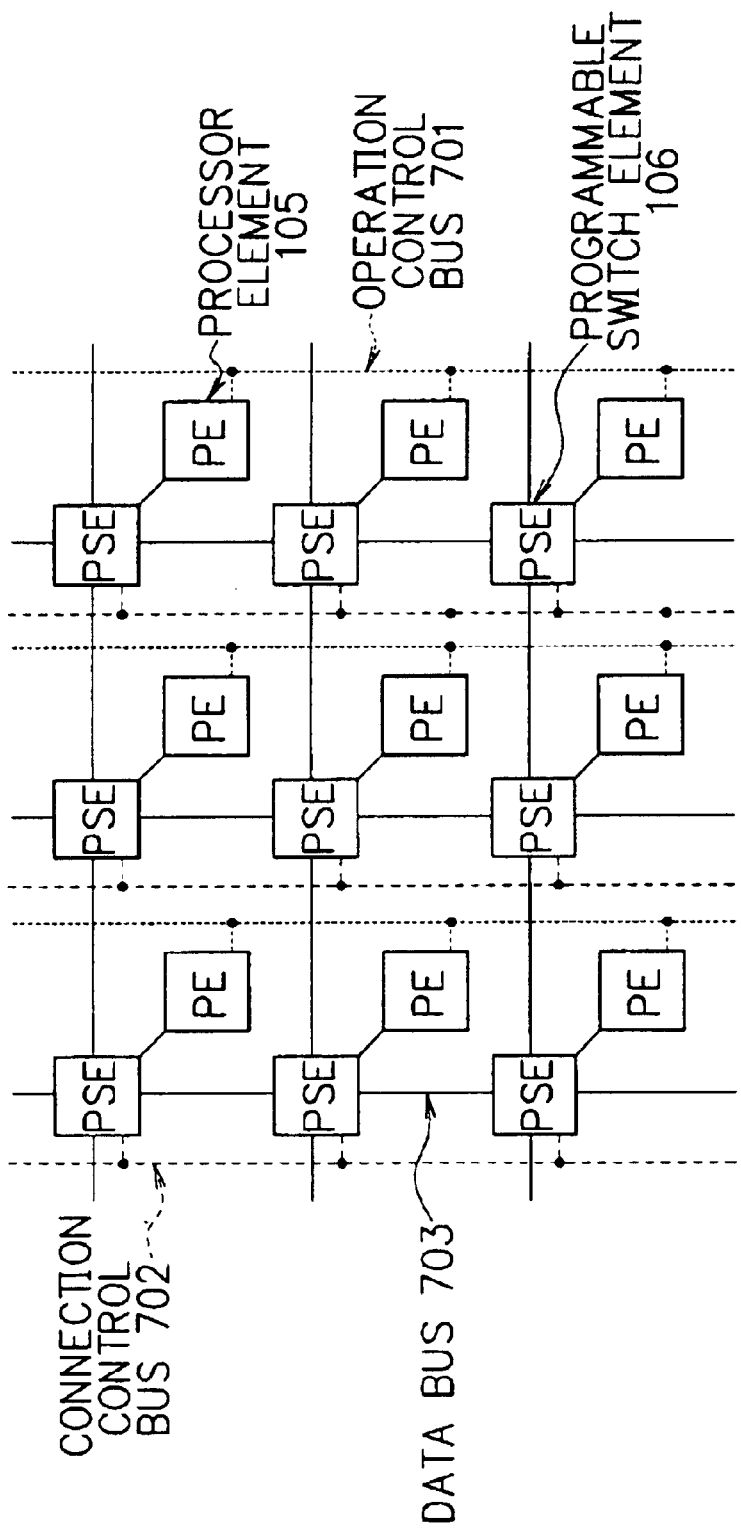
FIG. 9 is a schematic block diagram showing a second embodiment of a data path section in an array-type processor in accordance with the present invention.

FIG. 9 shows in a schematic block diagram a second embodiment of the data path section 102 in an array-type processor 1 according to the present invention.

In FIG. 9, a data path section 102 includes processor elements 105 and programmable switch elements 106 arranged respectively in matrix configurations. Each operation control bus 701 is electrically connected to associated processor elements 105. Each connection control bus 702 to control connection layout information is electrically connected to associated programmable switch element 106.

The other configurations of FIG. 9 are substantially the same as the data path section 102 shown in FIG. 8. However, the connection control bus 702 in FIG. 9 is included in the operation control bus 103 described in association with the processor element 105 and is a medium to propagate an instruction code address to cause transition of the connection state of each programmable switch element 106. In accordance with the present invention, for clear and simplified explanation, description of the connection control bus 702 is avoided when possible. However, in the overall configuration, the connection control bus 702 is inherently included in the operation control bus 103. In the description of the present embodiment below, these constituent elements are separately described as the operation control buses 701 and 702.

The operation control bus 701 and the connection control bus 702 are respectively arranged as independent resources so that each of the buses 701 and 702 delivers an instruction code address to the associated processor elements 105 and the associated programmable switch elements 106.

Resultantly, the configurations respectively of the processor elements 105 and the programmable switch elements 106 can be completely independently controlled. Degree of freedom of configuration change of the data path section is increased. For example, the connection change of the programmable switch elements 106 is more often achieved when compared with the processor elements 105. This increases flexibility of the control operation.

Also when the operation control bus 701 is separated from the connection control bus 702, the operation control bus 701 and the connection control bus 702 can be implemented, thanks to control of the state transition controller 101, in a configuration similar to that including only the operation control bus 103.

In this embodiment, the event notifying bus 104 separately disposed with respect to the data bus 601 in FIG. 8 is included in the data path section.

[Third Embodiment of Data Path Section]

Referring next to the drawings, description will be given of a third embodiment of the data path section.

Figure 10:
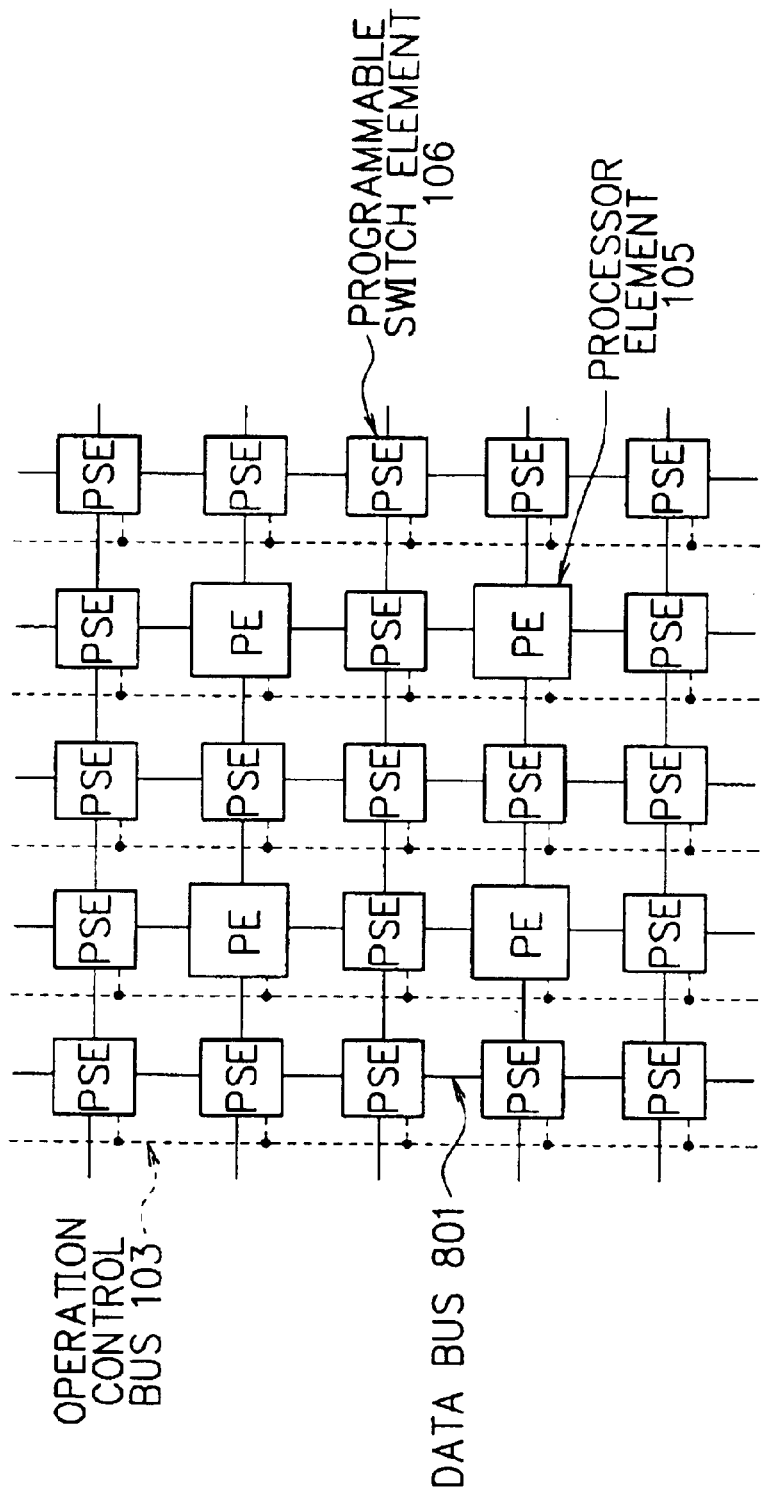
FIG. 10 is a schematic block diagram showing a third embodiment of a data path section an array-type processor in accordance with the present invention.

FIG. 10 schematically shows in a block diagram a third embodiment of the data path section 102 in an array-type processor 1 according to the present invention.

In the block diagram, a data path section 102 includes processor elements 105 and programmable switch elements 106. In the configuration, each processor element 105 is surrounded by eight programmable switch elements 106.

In the data path section 102, adjacent programmable switch elements 106 are electrically connected via a data bus 801 to each other, and each adjacent programmable element 106 and a processor element 105 adjacent thereto is also connected via a data bus 801 to each other. Each of the programmable switch and processor elements 106 and 105 is wired to an operation control bus 103. Although not shown in FIG. 10, of the eight programmable switch elements 106 disposed to surround each processor element 105, also four programmable switch elements 106 existing at diagonal positions of a quadrangle of the pertinent processor element 105 may be connected via the data bus 801 to four programmable switch elements 106 existing at edge positions of a quadrangle of the pertinent processor element 105.

Data is communicated between the processor elements 105 via associated programmable switch elements 106.

That is, since one processor element 105 is linked with a plurality of switch elements 106, connections for data input and output operations of the processor element 105 can be more freely executed.

[Fourth Embodiment of Data Path Section]

Referring now to the drawings, description will be given of a fourth embodiment of the data path section 102.

Figure 11:
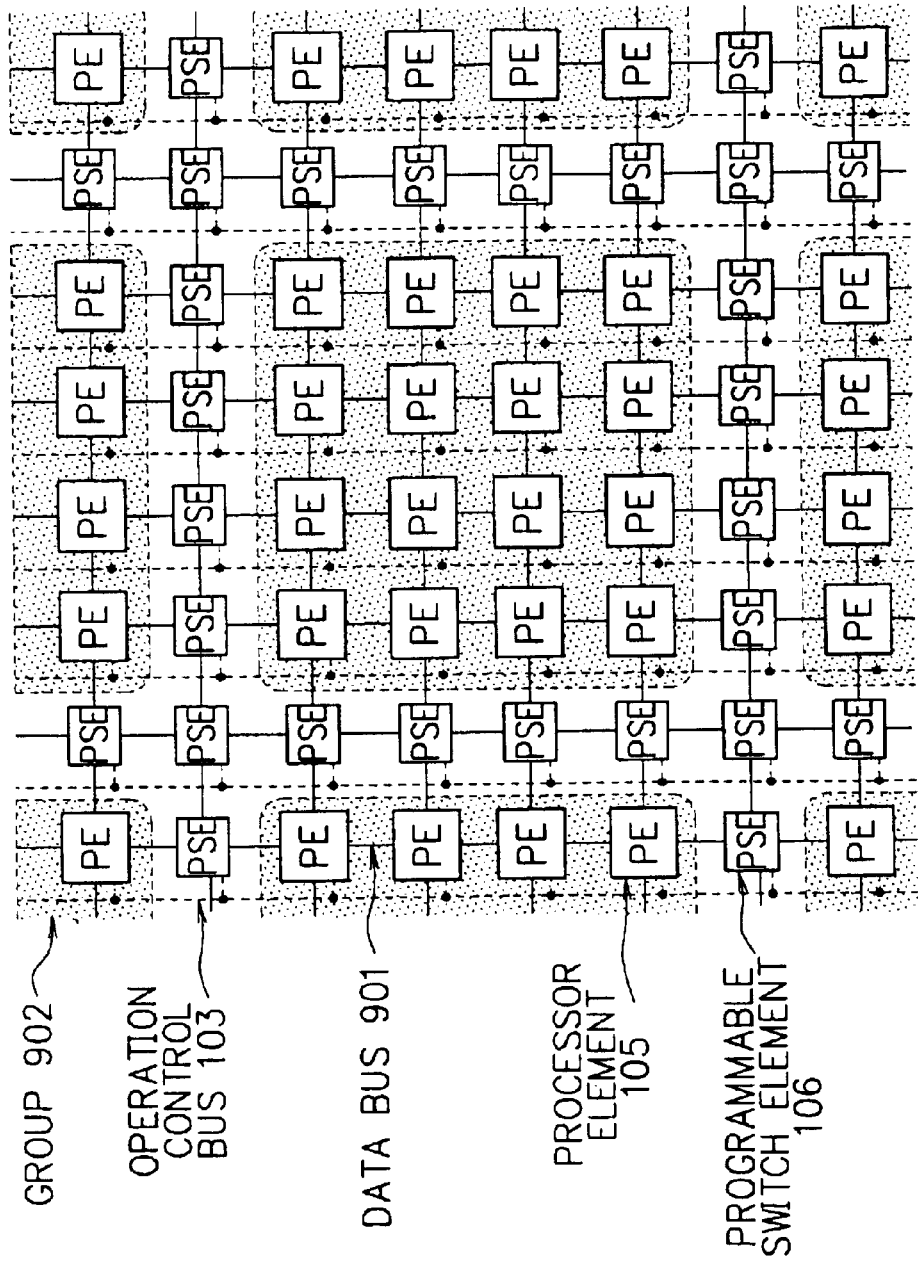
FIG. 11 is a schematic block diagram showing a fourth embodiment of a data path section in an array-type processor in accordance with the present invention.

FIG. 11 shows a fourth embodiment of the data path section 102 in an array-type processor 1 according to the present invention in a schematic block diagram.

In the data path section 102 of FIG. 11, adjacent processor elements 105 are directly and electrically connected to each other. In the structure, the processor elements are classified into groups 902 each of which is surrounded by a plurality of programmable switch elements 106. For example, each group includes 16 processor elements 105 and is surrounded by °programmable switch elements 106.

In short, the groups 902 are electrically connected via programmable switch elements 106 to each other.

Resultantly, in one group 902, adjacent processor elements 105 can be connected to each other without using any programmable switch element 106. This leads to advantages, for example, performance is improved because of reduced delay or the like and the total area is minimized due to reduction in quantity of circuits.

In the wiring process, in a case in which a processor element 105 is sandwiched between programmable switch elements 106, even when adjacent processor elements 105 are connected to each other, a programmable switch element 106 is disposed in any situation. This leads to disadvantage in delay and area.

In an actual use, a programmable switch element 106 does not always exist between the respective processor elements 105. For example, to execute operation "A+B+C", "A" and "B" are supplied to a processor element 105 in a first stage.

Thereafter, an operation result "A+B" from the processor element 105 in the first stage and "C" are fed to a processor element 105 in a second stage. This means that a programmable switch element 106 is not always necessary to connect the adjacent processor elements 105.

Therefore, in the present embodiment, there are formed arrays each of which includes only a predetermined number of processor elements 105 such that these arrays are connected to each other using programmable switch elements 106.

However, also in the configuration of this embodiment, a switch element is necessary to connect processor elements 105 to each other. Since the switch element need only have a function to connect processor elements 105 to each other, detailed description thereof will be avoided in this embodiment. In the drawings of the present invention, it is assumed that the switch element is included in each processor element 105 in advance.

Configuration of Sequencer Section

[First Embodiment of Sequencer Section]

Referring now to the drawings, description will be given of a first embodiment of the sequencer section 201 (FIG. 2).

Figure 12:
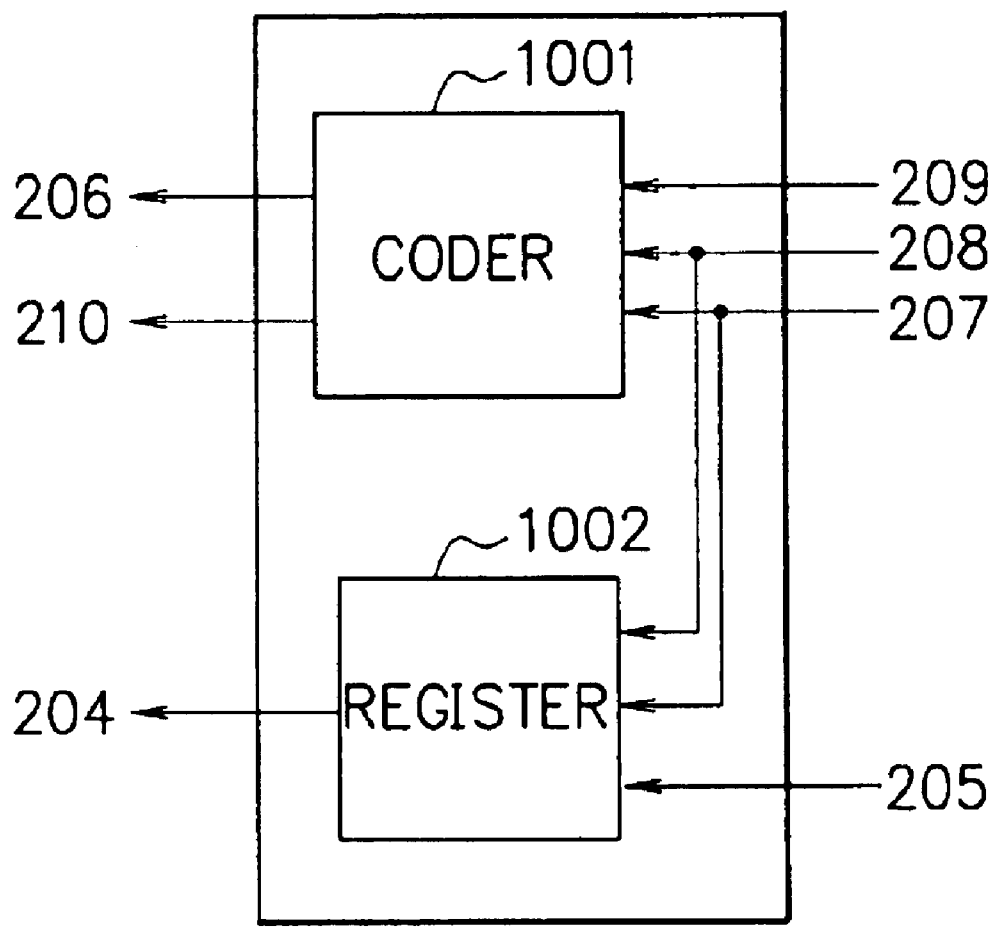
FIG. 12 is a schematic block diagram showing a first embodiment of a sequencer section in an array-type processor in accordance with the present invention.

FIG. 12 schematically shows a configuration a first embodiment of the sequencer section 201 in an array-type processor 1 according to the present invention.

In the configuration of FIG. 12, the sequence 201 includes a coder 1001 which receives a clock signal 207, a reset signal 208, and an event signal 209 to produce an event identifying code 206 and/or a forced event identifying code 210 and a register 1002 which receives a clock signal 207, a reset signal 208, and a next state number 205 to generate a current state number 204.

The next state number 205 is fed to the register 1002 and is outputted therefrom as a current state number 204.

Timing to output the new state number 204 may also be synchronized at a point of time using the clock signal 207.

The current state number 204 may be initialized when the input of the reset signal 208 is received.

The coder 1001 encodes the event signal 209 inputted thereto and produces an event identifying code 206 and/or the forced event identifying code 210.

The event signal 209 may be directly employed as the event identifying code 206 and/or the forced event identifying code 210 or may be encoded into the event identifying code 206 and/or the forced event identifying code 210. In the latter case, the bit width for transmission of the event identifying code 206 and/or the forced event identifying code 210 can be reduced by encoding. The operation will be described by referring to FIG. 15. When the system is configured such that the event signal is not encoded and the event identifying code 206 is one hot signal which include bits having a one-to-one correspondence to one or more outputs from the event state transition table (the event state transition table 1111 in FIG. 15), signals can be easily handled. Moreover, this is advantageous to prevent occurrence of a problem of a hazard that the subsequent state number changes in the same cycle. Moreover, the reset signal 208 may be adopted as one of the event signals 209.

Timing to generate the event identifying code 206 may be synchronized using the clock signal 207. Alternatively, the event identifying code 206 may be generated in an asynchronous fashion in which the output changes immediately at input transition.

Configuration of State Transition Table

[First Embodiment of State Transition Table]

Next, description will be given of a first embodiment of the state transition table memory 202 of the configuration (FIG. 2) by referring to the drawings.

Figure 13:
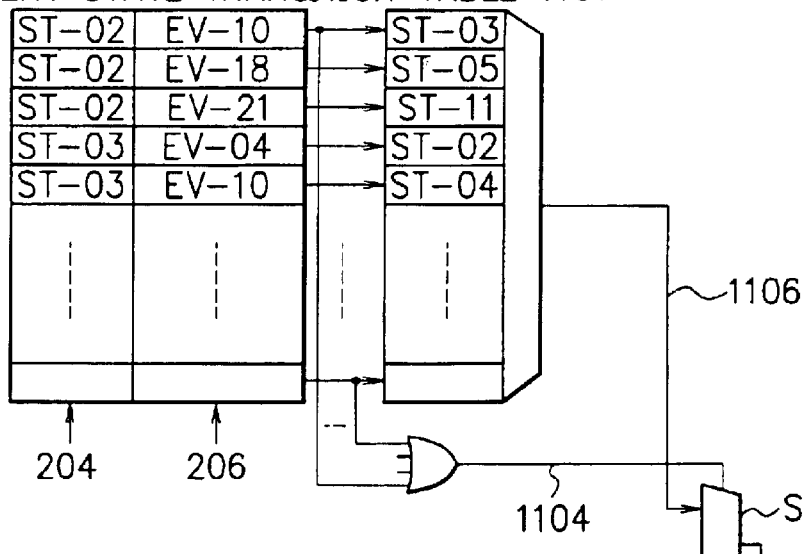
FIG. 13 is a schematic block diagram showing a first embodiment of a state transition table memory in an array-type processor in accordance with the present invention.
Figure 13:
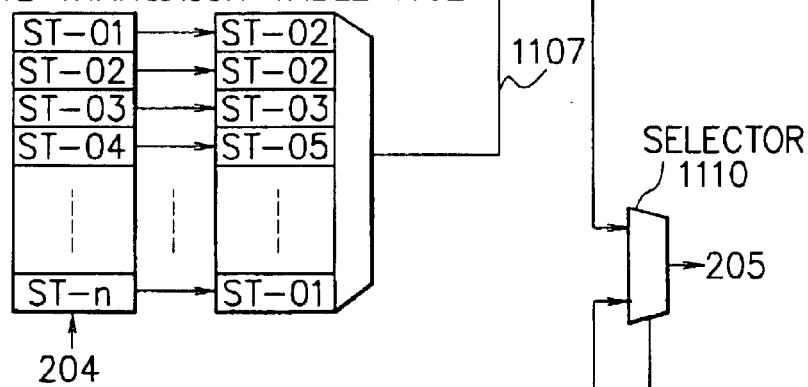
Figure 13:
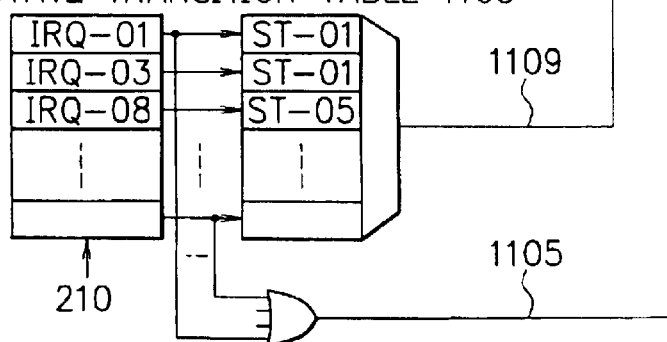

FIG. 13 shows, in a schematic block diagram, a configuration of a first embodiment of the state transition table memory 202 in the configuration of an array-type processor 1 according to the present invention.

The state transition table memory 202 includes an event state transition table 1101, a default state transition table 1102, a forced state transition table 1103, and selectors 1108 and 1110. According to state transition rules stored in the state transition table memory 202, it is possible to control state transitions in which a plurality of operation states are changed to the same or different operation states. A plurality of the same or different operation states can be resultantly set as new operation states.

The event state transition table 1101 receives a current state number 204 and an event identifying code 206. When the table 1101 contains an entry matching a combination of the number 204 and the code 206, the table 110 outputs a next state number 1106 corresponding to the combination.

The table 1101 simultaneously outputs an event matching signal 1104 indicating presence or absence of the matching entry.

The default state transition table 1102 receives a current state number 204 to output therefrom a next state number 1107 associated with the number 204.

In operation of the tables 1101 and 1102, when an entry matching the combination of the current state number 204 and the event identifying code 206 exists in the table 1101, a next stated number 1106 specified in the table 1101 is selected by the selected 1108 to be outputted as a next state number 205.

When the matching entry is absent in the event state transition table 1101, a next state number 1107 found in the table 1102 for the current state number 204 is selected by the selected 1108 and is outputted as a next state number 205. The selection of an appropriate signal above can be achieved by the selector 1108 using the event matching signal 1104.

The forced state transition table 1103 determines a next state number 1109 when the forced event identifying code 210 matches an entry of the forced state transition table 1103.

In the matching case in the forced state transition table 1103, the selector 1110 can preferentially select the next state number 1109 with higher priority as compared with the next state numbers 1106 and 1107 and outputs the number 1109 as the next state number 205.

Concretely, the selector 1110 can output the signal 205 using the selector 1109 and a forced event matching signal 1105 indicating presence of a matching case in the forced state transition table 1103.

As above, the array-type processor 1 is favorably configured that the state transition control section 101 forcibly causes a state transition using the forced event matching signal 1105 as a forced state transition signal. This facilitates the control operations. However, to implement the operation described above, the event state transition table 1101 favorably includes a content addressable memory (CAM). This also applies to the normal state transition table 1301 shown in FIG. 17. However, in operation of the content address memory, the memory is accessed not by an address thereof but by a content thereof (unlike addresses, groups of input values are not continuous).

In the state transition table memory 202, the next state number 205 may be forcibly initialized in response to a reset signal 208.

In this structure, transition rules between operation states can be written in the event state transaction table 1101 and/or the default state transaction table 1102 and/or forced state transaction table 1103.

That is, default state transition destinations are specified in the default state transition table 1102. When conditional branches (state transition destinations other than default values) exist, branch information thereof is entirely written in the event state transition table 1101.

When it is desired that an operation state is forcibly changed regardless of the state to another state, for example, for an interruption, a next state number 1109 associated with the interruption is written in the forced state transition table 1103.

By writing the next state numbers of the next states for transitions in each table according to a state transition condition as above, one of the next states thus written can be selected as an objective next state. In this situation, the determination of the state transition condition is achieved by checking the event identifying code 206 and forced event identifying code 210.

However, in the present and other embodiments, it is also possible that the event identifying code and forced event identifying code (with respective reference codes in the respective embodiments) are not discriminated from each other. That is, these codes are configured as one code.

Moreover, within an allowable range of the table size of the event state transition table 1101, a maximum number of next operation states can be recorded for the state transition for each operation state. The state transition can be achieved in a fixed period of time regardless of the number of next states for the state transition. That is, no problem takes place if the total number of conditional branches in all states is equal to or less than the size (the number of entries) of the event state transition table 1101. That is, this advantageously prevents an event in which the event state transition table 1101 cannot be efficiently used because the number of next operation states for transition varies for each state.

Next, description will be given of a state transition example written in the state transition table memory 202 of the embodiment by referring to FIGS. 13 and 14.

Figure 14:
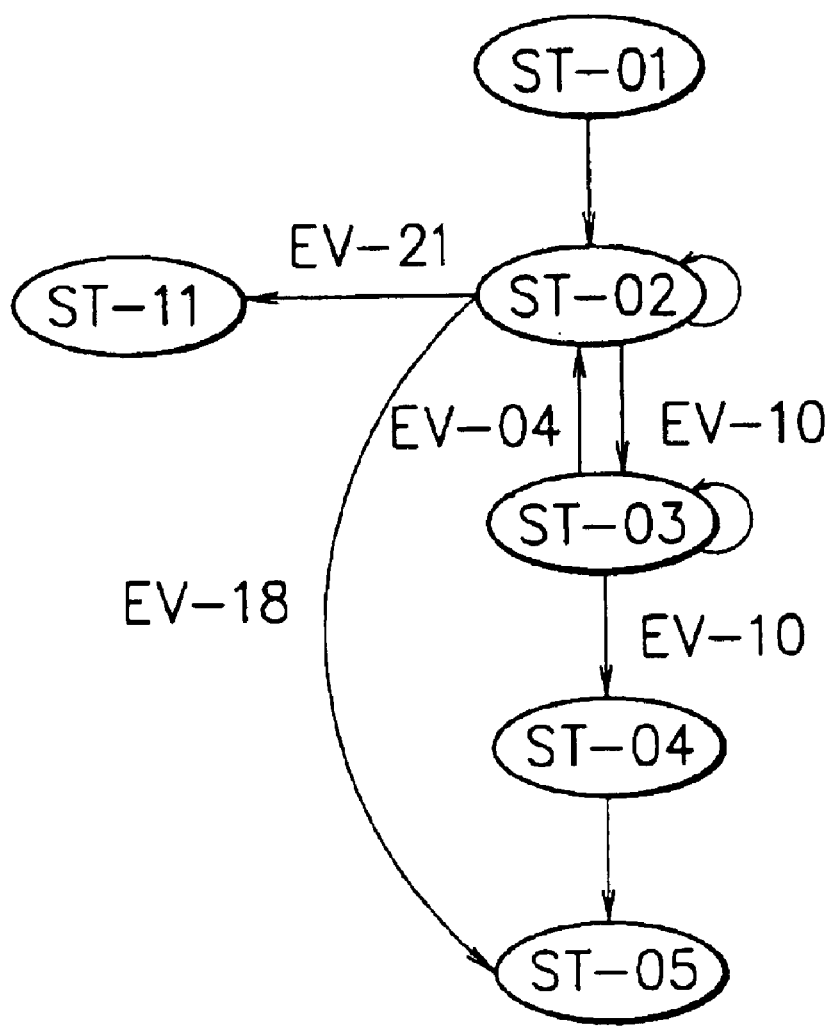
FIG. 14 is a diagram showing a state transition example written in the state transition table memory in the embodiment of an array-type processor in accordance with the present invention.

FIG. 14 shows, in a state transition diagram, a state transition example in the state transition table memory 202 in the embodiment of an array-type processor 1 according to the present invention.

In the state transition diagram, when the current state number 204 is ST-01, the next state number 205 is unconditionally ST-02.

To describe the operation in the state transition table memory 202, it is only necessary to generate an entry in the default state transition table 1102, the entry including ST-01 as the current state number 204 and ST-02 as the next state number 1107.

In operation, when the current state number 204 is ST-01, the event matching signal 1104 is not produced since no entry satisfies the matching condition in the event state transition table 1101. In the default state transition table 1102, an entry having a current state number 204 of ST-01 becomes effective in any situation. Consequently, the state number 1107 becomes ST-02 and is outputted as the next state number 205.

When the current state number 204 is ST-02, the next state number 1106 is ST-02, ST-03, ST-05, or ST-11 according to the condition (reference is to be made to FIG. 13).

When an event EV-10 is received, the state is changed to the state ST-03. Therefore, an entry "current state number 204=ST-02; Event identifying code 206=EV-10; Next state number 1106=ST-03" is set to the event state transition table 1101.

Similarly, at reception of an event EV-18, the state is changed to the state ST-05. Consequently, an entry "current state number 204=ST-02; Event identifying code 206=EV-18; Next state number 1106=ST-05" is generated in the table 1101. At reception of an event EV-21, the state is changed to the state ST-11. Therefore, an entry "current state number 204=ST-02; Event identifying code 206=EV-21; Next state number 1106=ST-11" is set to the table 1101.

In other cases, since the next state number 205 is ST-02, an entry "current state number 204=ST-02; Next state number 1107=ST-02" is generated in the default state transition table 1102.

For example, when the current state number 204 is ST-02, if EV-21 is received for the event identifying code 206, an entry matching a combination of ST-02 and EV-21 becomes effective in the event state transition table 1101. Namely, ST-11 is delivered as the next state number 205.

Since a matching condition has occurred in the table 1101, the event matching signal 1104 is produced, and the next state number ST-02 of the next state number 1107 corresponding to ST-02 of the current state number 204 fed from the default state transition table 1102 is therefore discarded.

When the current state number 204 is ST-02, if none of EV-10, EV-18, and EV-21 is received for the event identifying code 206, the event matching signal 1104 is not produced. The default state transition table 1102 outputs, as the next state number 205, ST-02 corresponding to the current state number ST-02.

In either cases, when IRQ-01 is inputted as the forced event identifying code 210, ST-01 corresponding to IRQ-01 in the forced state transition table 1103 is fed as the next state number 205 (reference is to be made to FIG. 13).

In this situation, since the forced event matching signal 1105 is produced, the output from the event state transition table 1101 and the output from the default state transition table 1102 are discarded. Then, ST-01 of the next state number ST-01 from the forced state transition table 1103 becomes effective.

The state transition table memory 202 shown in FIG. 13 may be implemented in applications described below.

Referring to the drawings, description will be given of embodiments in detail.

[Second Embodiment State Transition Table Memory]

Figure 15:
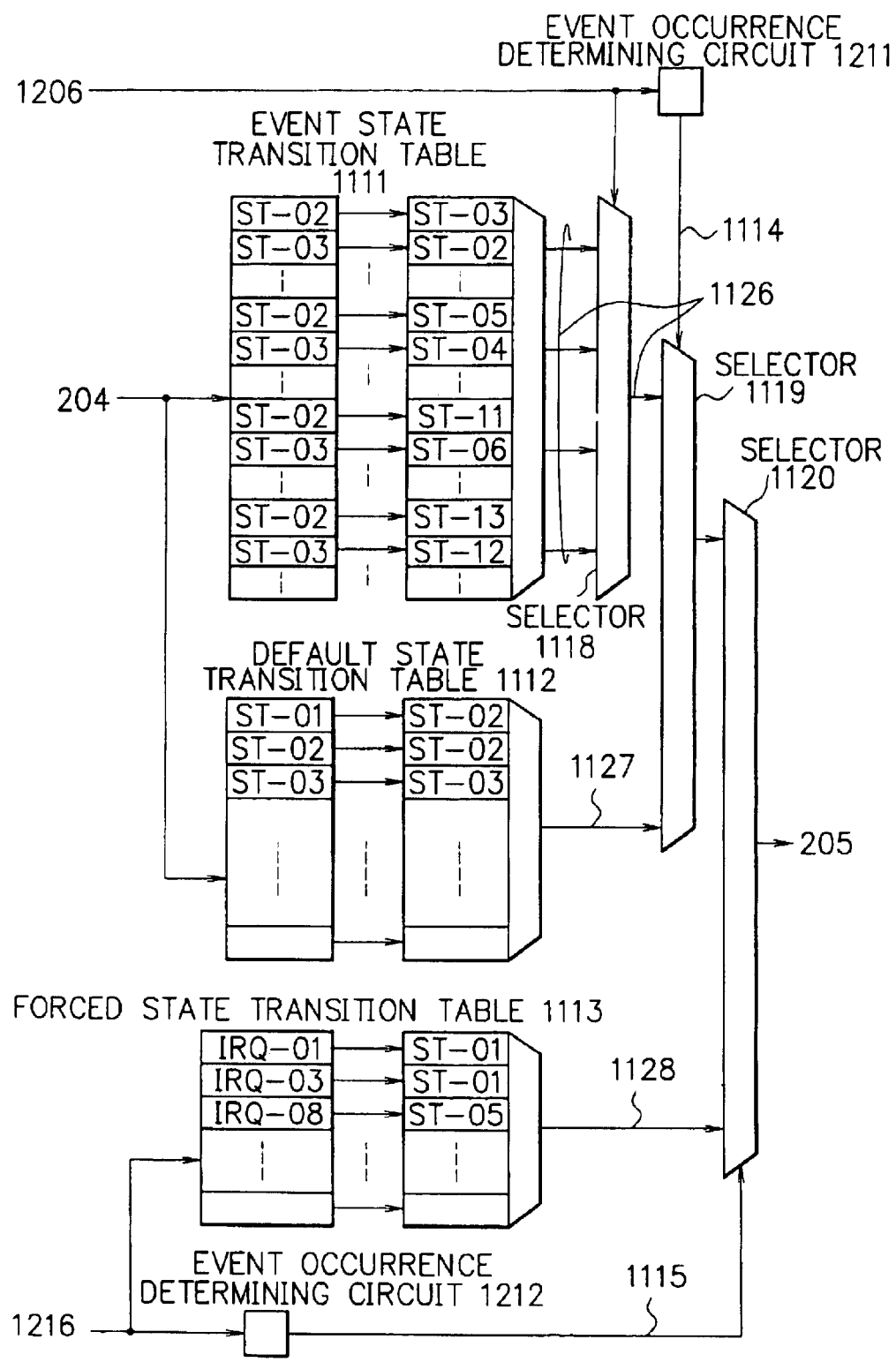
FIG. 15 is a schematic block diagram showing a second embodiment of a state transition table memory in an array-type processor in accordance with the present invention.

FIG. 15 shows in a block diagram a first application example as a variation of the state transition table memory 202 of FIG. 13 in accordance with the present invention.

Referring to FIG. 15, the embodiment of the state transition table memory 202 includes an event state transition table 1111, a default state transition table 1112, a forced state transition table 1113, event occurrence determining circuits 1211 and 1212, and selectors 1118 to 1120. Like the state transition table memory 202 shown in FIG. 13, the state transition table memory 202 controls state transitions from a plurality of operation states to a plurality of same or different operation states and sets the same or different operation states to new operation states according to state transition rules written in the memory 202.

In the construction, the event state transition table 1111 of the present embodiment outputs, for a current state number 204 supplied thereto, one entry as a next state number 1126 (four entries are delivered as the next state number 1126 in FIG. 15).

In this structure, the number of next state numbers 1126 outputted from the table 1111 is set to a value which is possible even when the number of kinds of next state number 1126 corresponding to each current state number 294 takes a maximum value. In other words, for the current state number 204 set to ST-02, when the next state number 205 as possible transition destinations are ST-03, ST-05, ST-11, and ST-13, namely, at least four kinds of next state number 1126 are possible, the number of next state numbers 1126 outputted from the table 1111 is set to four or more.

For example, in a configuration in which for a current state number 204 received by the event state transition table 1111, four entries are outputted as the next state number 1126, the event identifying code 1206 is used by the selector 1118 to select one of the four next state numbers 1126. For this purpose, the event identifying code 1206 includes, for example, four bits which correspond respectively to the outputs from the event state transition table 1111. The selector 1118 selects a next state number 1126 corresponding to the bit set to "1" and outputs the next state number 1126. However, in this constitution, it is necessary that the number of outputs from the event state transition table 1111 is equal to the number of bits of the event identifying code 1206.

In the configuration, the event identifying code 1206 includes four bits when the number of outputs from the event state transition table 1111 is four. However, the event identifying code 1206 may be set to n bits which satisfy $(2^n-1) \geq 4$ (n is 3 in the example shown in FIG. 15). Assume that the code 1206 includes, for example, three bits. Since the code 1206 expresses eight kinds by values 0 to 8, by corresponding the outputs from the table 1111 to the values, it is possible for the selector 1118 to select the next state number 1126 as the output. The operation will be next described in detail by referring to an example of FIG. 15.

In the example of FIG. 15, the event identifying code 1206 includes three bits to express values "0" to "7". The outputs from the event state transition table 1111 are assigned with values "1", "2", "3", "4", etc. from the top to the bottom as shown in FIG. 15. Under this condition, the next status number 1126 to be fed to the selector 1119 is selected.

In this case, when the event identifying code 1206 is "0" or one of "5" to "7", the selector 1118 is controlled such that a next state number 1127 fed from the default state transition table 1112 is delivered to the selector 1119.

It is also possible to include the configurations of the respective event identifying codes 1206. In such a configuration, a memory shown in FIG. 28 is connected to the selector 1118 of FIG. 15. Under control of the memory, it is selected whether or not the event identifying code 1206 is to be decoded. Also in this case, the number of bits of the event identifying code 1206 must be equal to the number of next state number candidates sent from the event state transition table 1111 to the selector 1118.

The next state number 1126 thus selected and outputted by the selector 1118 is supplied to the selector 1119 as above. In the configuration, the selector 1119 also receives the next state number 1127 delivered from the default state transition table 1112.

The default state transition table 1112 is constituted to output the next state number 1127 uniquely corresponding to the input current state number 204. Therefore, the selector 1119 selects and outputs one of the next state numbers 1126 and 1127 respectively fed from the event state transition table 1111 and the default state transition table 1112.

In the operation, an event matching signal 1114 received from the event occurrence determining circuit 1211 is used to determine which one of the next state numbers 1126 and 1127 is to be outputted. The signal 1114 is a signal including, for example, one bit. When there exists a event corresponding to the event identifying code 1206 received by the event occurrence determining circuit 1211, the signal 1114 is produced as "1". Otherwise, the signal 1114 is "0".

When a signal (a 3-bit signal in FIG. 15) encoded as the event identifying code 1206 is adopted, the event occurrence determining circuit 1211 produces "0" for the event matching signal 1114 when the code 1206 is one of "5" to "7" and produced "1" for the event matching signal 1114 when the code 1206 is one of "1" to "4". However, in the construction, it is also possible to configure that none of "5" to "7" is generated as the event identifying code 1206. In this occasion, the system is configured such that when the code 1206 is "0", it is assumed there exists no event. When the code is one of "1" to "4", the selector 1118 selects the next state number 1126. As a result, it is not necessary that the event occurrence determining circuit 1211 makes a check to determine the values "5" to "7".

In contrast thereto, the system may be configured as follows. In a case in which the signal (a 4-bit signal in FIG. 15) is not encoded as the event identifying code 1206, when either one of the bits constituting the code 1206 is "1", the event occurrence determining circuit 1211 produces "1" as the event matching signal 1114. Otherwise, the circuit 1211 produces "0". However, when the event identifying code 1206 to indicate "no event" includes "0" at each position thereof ("0000"), the circuit 1211 may includes a 4-input logical sum (OR) circuit. Resultantly, when either one of the bits constituting the code 1206 is "1", the event occurrence determining circuit 1211 produces "1". When each bit is "0", the circuit 1211 produces "0".

Consequently, when the event matching signal 1114 is "1", the selector 1119 determines that there exists an event corresponding to the event identifying code 1206 and then selects and outputs the next state number 1126 received from the event state transition table 1111. When the event matching signal 1114 is "0", the selector 1119 determines that there does not exist an event corresponding to the event identifying code 1206 and then selects and outputs the next state number 1127 received from the default state transition table 1112. However, the configuration of the default state transition table 1112 may be equal to that shown in FIG. 13.

The next state number 1126 or 1127 sent from the selector 1119 is received by the selector 1120. The selector 1120 outputs either one of the received next state number 1126 or 1127 and a next state number 1128 from the forced state transition table 1113.

The forced state transition table 1113 receives a forced event identifying code 1216 received as an interruption from other configuration or section and outputs an entry corresponding to the code 1216 as the next state number 1128 to the selector 1120.

The selector 1120 also receives a forced event matching signal 1115 from the event occurrence determining circuit 1212. The circuit 1212 has a configuration similar to that of the event occurrence determining circuit 1211. When there exists an event associated with the forced event identifying code 1216 inputted thereto, the event occurrence determining circuit 1212 produces a forced event matching signal 1115 set to "1". Otherwise, the circuit 1212 produces the signal 1115 set to "0".

When a signal (for example, a 2-bit signal) encoded as the forced event identifying code 1216 is employed, the event occurrence determining circuit 1212 produces a forced event matching signal 1115 set to "0" if the code 1216 is "0". Otherwise (for example, the code includes two bits indicating values ranging from "1" to "3"), the circuit 1212 produces the signal 1115 set to "1".

It is also possible to configure to use a signal (for example, a 4-bit signal) not encoded as the forced event identifying code 1216. That is, occurrence of two or more events can be expressed.

In the case in which two or more events occur at the same time, processing can be executes in one of the following methods. In a first method, either one of the events take precedence in the processing; in a second method, the processing is executed according to a combination of the events; and so on.

In a case of a circuit which can determine the forced event identifying code 1216 including, for example, two bits, there is produced a forced state transition table 1113 which can discriminate four values expressed by two bits. That is, in the table, if the forced event identifying code 1216 is "0", "no event occurrence" is determined. If the code 1216 is "1", "occurrence of event a" is determined; if the code 1216 is "2", "occurrence of event b" is determined; and if the code 1216 is "3", "occurrence of events a and b" is determined. In this situation, the next state numbers 1128 respectively corresponding to "1", "2", and "3" are written as entries in the forced state transition table 1113. It is therefore possible to cope with interruption by the forced event identifying code 1216.

Under the condition, when the former method using event precedence in the processing is adopted, the next state number 1128 corresponding to event a or event b is produced. When the latter method using a combination of events in the processing is adopted, the next state number 1128 corresponding to none of events a and b is produced. This is implemented by writing a new entry corresponding to "forced event identifying code 1216=3" in the forced state transition table 1113. As a result, at occurrence of both events a and b, particular processing can be executed.

There may be used still another method in which priority is assigned to the 2-bit forced event identifying code 1216 to determine the next state number according to the priority. For example, in a configuration in which event a takes precedence over event b, when the code 1216 is "0", "no event occurrence" is determined; and when the code 1216 is "1", "occurrence of event a" is determined; and when the code 1216 is "2", "occurrence of event b" is determined. However, at occurrence of events a and b, since event a takes precedence, "occurrence of event a" is hardwarewise determined. That is, in this method, when two or more events occur, particular processing cannot be executed.

As above, when "1" is produced as the forced event matching signal 1115, the selector 1120 selects the next state number 1128 inputted from the forced state transition table 1113 and outputs the number 1128 as the next state number 205.

When there does not exist a forced event associated with the forced event identifying code 1216 inputted in the event occurrence determining circuit 121, namely, when the forced event matching signal 1115 is produced, for example, as "0", the selector 1120 selects the next state number 1126 or 1127 from the selector 1119 and outputs the number 1128 as the next state number 205.

In the construction, the number of next state number candidates from the event state transition table 1111 to the selector 1118 indicates the maximum value of the number (maximum branch number) of next state numbers 1126 as the state transition destinations. However, when the maximum branch number varies in a wide range, hardware overhead (so-called increase in area and delay) becomes great. Therefore, it is necessary to limit the number of next state number candidates and the kinds of next state numbers 1126 as the state transition destinations to some extent. This problem does not take place in the configuration shown in FIG. 13. Therefore, it is desirable to appropriately use the configuration according to the usage of the system. However, in the present embodiment, the number of next state numbers 1126 as state transition destinations may be equal to or more than that of next state number candidates. In this method, the limitation of output kinds of the next state number 1126 in hardware is virtually surmounted by hardware. This method can be softwarewise implemented by providing two or more stages of conditional branches by the event identifying code 1206.

In the configuration shown in FIG. 15, the method is softwarewise materialized by providing two or more stages of conditional branches. For example, assume that eight kinds of candidates "10" to "17" exist for the next state number 205 as the transition destination when the current state number 204 is "01". First, in a first-stage conditional branch, the current state "01" is changed to the next state "02" or "03". Thereafter, the current state "02" is changed to one of the next states "10" to "13", or the current state "03" is changed to one of the next states "14" to "17". Consequently, even when there exist only four outputs from the event state transition table 1111, eight branches can be achieved, exceeding the inherent limitation. However, in the state transition in this configuration, there exists one additional stage when compared with the case of the 1-stage conditional branch.

Additionally, since the event identifying code 1206 has effective in combination with a state number, it is possible to commonly use the code between different states for the following reason. Since one state is effective at any moment, the inputted event identifying code 1206 can be regarded as the value valid in the effective state.

For example, in the states a and b, it is possible that a value x of the event identifying code 1206 has respectively different meanings (the value x is "A" in the state a and is "B" in the state b) as follows. Since both of the states a and b cannot be simultaneously effective, when a value x is supplied in the state a, "A" can be determined for the value x according to a combination (a,x). When a value x is supplied in the state b, "B" can be determined for the value x according to a combination (b,x). That is, it is not necessary that the value x itself has a particular meaning.

[Third Embodiment of State Transition Table Memory]

Referring now to the drawings, description will be given in detail of a third embodiment of the state transition table memory 202 in accordance with the present invention.

FIG. 16 shows in a block diagram the third embodiment as a variation of the first embodiment of the state transition table memory 202 shown in FIG. 13 in accordance with the present invention.

In FIG. 16, the state transition table memory 202 of the embodiment includes an event state transition table 1121, a default state transition table 1122, a forced state transition table 1123, event occurrence determining circuits 1221 and 1222, and selectors 1138 to 1140. Like the state transition table memory 202 shown in FIG. 13, the state transition table memory 202 supervises state transitions from a plurality of operation states to a plurality of same or different operation states and sets the same or different operation states to new operation states according to state transition rules written in the memory 202.

As can be seen from FIG. 16, although the memory 202 of the present invention is almost the same in the configuration as the second embodiment of the state transition table memory 202 shown in FIG. 15, the difference resides in the following configurations. The event state transition table 1121 and the default event state transition table 1122 store respectively not only the next state numbers 1146 and 1147 in association with the current state number 204, but also the instruction code addresses 1346 and 1347 (in FIG. 16, "CA-(number)" indicates an instruction code address) similarly in association with the current state number 204. Moreover, the forced state transition table 1123 stores not only the next state number 1148 corresponding to the forced event identifying code 1236, but also the instruction code address 1348 corresponding also thereto. The event state transition table 1121, the default state transition table 1122, and the forced state transition table 1123 respectively output not only the next state numbers 1146, 1147, and 1148, but also the instruction code addresses 1346, 1347, and 1348. The selectors 1138, 1139, and 1140 respectively output not only the next state numbers 1146, 1147, and 1148, but also the instruction code addresses 1346, 1347, and 1348. However, in operation of the selector 1140, the next state number 205 and the instruction code address 1505 are separately delivered respectively to the sequence section 201 (FIG. 5) and the data path section 102 (FIG. 5) via the operation control bus 103. The event state transition table 1121, the default state transition table 1122, the forced state transition table 1123, and the selectors 1138 and 1139 output in a serial or parallel fashion the next state numbers 1146, 1147, and 1148 and the instruction code addresses 1346, 1347, and 1348. However, in the parallel output configuration, the configuration is not restricted by the configuration in which the signals are not simultaneously outputted. Moreover, in the configuration, in the instruction code addresses 1346, 1347, and 1348 outputted in pair with the next state numbers 1146, 1147, and 1148, the correspondence therebetween is not limited to a one-to-one correspondence. That is, for one next state number 1146, 1147, or 1148, a plurality of instruction code addresses 1346, 1347, or 1348 may be produced.

This configuration is required in association with the construction of the state transition control section 101 shown in FIG. 5. That is, in FIG. 16, a next state number 205 is delivered to the sequencer section 201 of FIG. 5. For the operation control bus 103 in FIG. 16, an instruction code address is delivered to the data path section 102.

[Fourth Embodiment of State Transition Table Memory]

Description will be given in detail of a fourth embodiment of the state transition table memory 202 in accordance with the present invention by referring now to the drawings.

Figure 17:
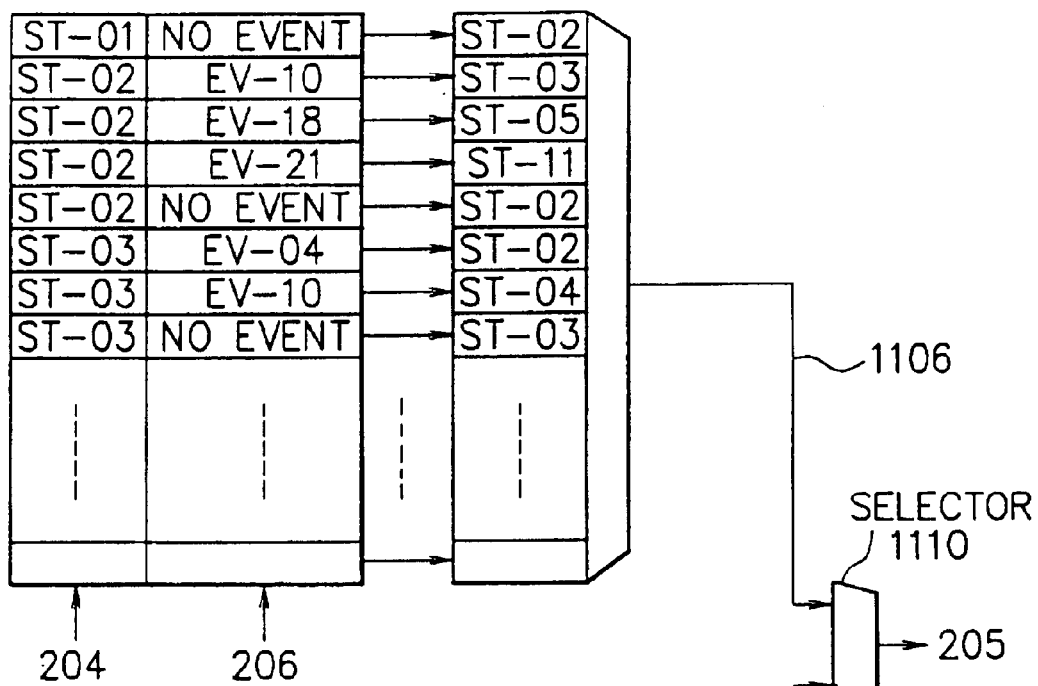
FIG. 17 is a schematic block diagram showing a fourth embodiment of a state transition table memory in an array-type processor in accordance with the present invention.
Figure 17:
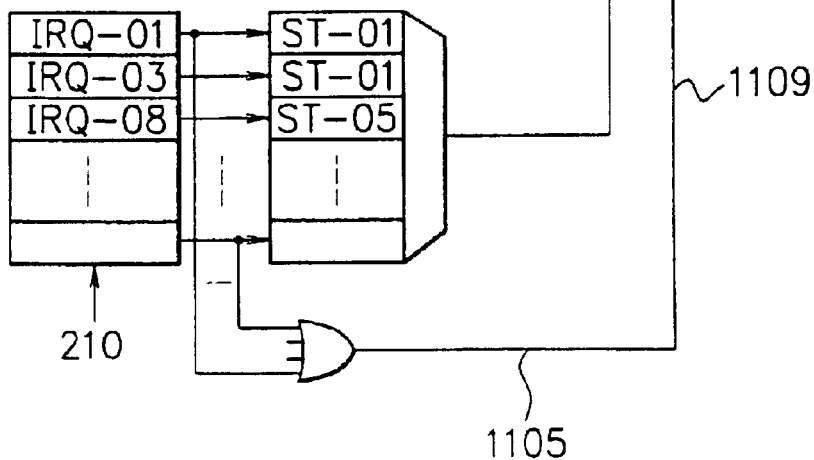

FIG. 17 shows in a block diagram the fourth embodiment of the state transition table memory 202 in the embodiment of the array-type processor 1 in accordance with the present invention.

In the construction of FIG. 17, the state transition table memory 202 includes a normal state transition table 1301, a forced state transition table 1103, and a selector 1110.

By adding a code of "NoEvent (noevent)" in the event identifying code 206 to indicate that an objective event has not taken place, the function of the default state transition table 1102 shown in FIG. 13 is added to the event state transition table 1101 to resultantly form the normal state transition table 1301.

In this construction, an ordinary or normal state transition is processed using the normal state transition table 1301 and other processing such as processing of an interruption is carried out using the forced state transition table 1103.

For this purpose, an event input signal from the data path section 102 and the like to the event 209 must be encoded including the code "no event".

The processing can be executed in the sequencer section 201 or the data path section 102.

The other configurations are substantially same as those of the state transition table memory 202 shown in FIG. 13.

Next, description will be given of operation to carry out state transitions, for example, shown in FIG. 14.

When the current state number 204 is ST-01, the next state number 1106 must be ST-02 in any case. Therefore, the system is established such that when the current state number 204 is received, "no-event" is received for the event identifying code 206 in any situation.

As a result, a matching condition is satisfied for "Current state number 204=ST-01; Event identifying code 206=noevent" in the normal state transition table 1301. Therefore, ST-02 is delivered as the next state number 1106.

In a case of "Current state number 204=ST-02", when either one of EV-10, EV-18, and EV-21 is received for the event identifying code 206, operation is conducted in the normal state transition table 1301 in the same way as described in conjunction with the event state transition table 1101 shown in FIG. 11. The system must be established such that if none of the event identifying codes 206 is received, "noevent" is inputted as the event identifying code 206 in any case.

Resultantly, items operated by the default state transition table 1102 in FIG. 13 are processed using the normal state transition table 1301 in FIG. 17. That is, ST-02 associated with a combination "Current state number 204=ST-02; Event identifying code 206=noevent" is outputted as the next state number 1106.

The forced state transition table 1103 operates in substantially same way as that shown in FIG. 13.

The other operations and functions are almost the same as those of the state transition table memory 202 shown in FIG. 13.

[Fifth Embodiment of State Transition Table Memory]

Description will be given in detail of an embodiment (a fifth embodiment of the state transition table memory) including a combination of the second and fourth embodiments of the state transition table memory 202 in accordance with the present invention by referring now to the drawings.

Figure 18:
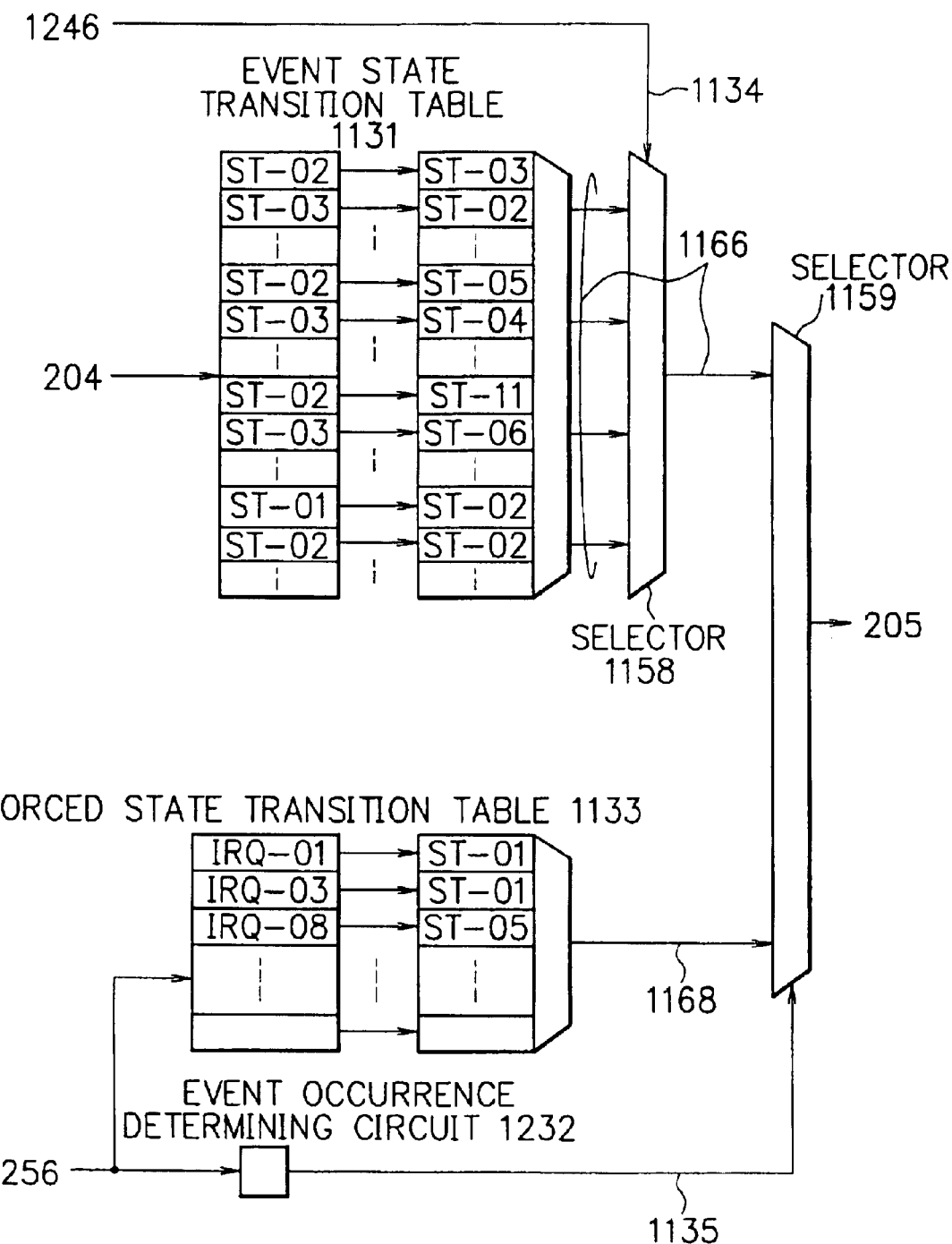
FIG. 18 is a schematic block diagram showing a fifth embodiment of a state transition table memory in an array-type processor in accordance with the present invention.

FIG. 18 shows, in a block diagram, constitution of the fifth embodiment.

In FIG. 18, the state transition table memory 202 of the fifth embodiment includes an event state transition table 1131, a forced state transition table 1133, selectors 1158 and 1159, and an event occurrence determining circuit 1232.

As in the fourth embodiment of the state transition table memory, a code of "NoEvent (No Event, noevent or no event)" to indicate that an objective event has not taken place is additionally provided.

In the configuration of this embodiment, for example, two or more (for example, four in FIG. 18) outputs are disposed in the event state transition table 1131. Either one thereof (for example, a lowest signal line in FIG. 18) is fixed as a signal line to deliver a next state number 1166 corresponding to the case of "noevent". When "noevent" is supplied to the selector 1158, the next state number 1166 fed from the signal line corresponding to "noevent" is selected to be outputted therefrom. As a result, the default state transition table can be removed.

As in the fourth embodiment of the state transition table memory, a normal state transition is processed using the event state transition table 1131, and processing such as processing of an interruption is conducted using the forced state transition table 1133.

For this purpose, the input signals from the data path section 102 and the like to the event 209 must be coded including "noevent" also in the fifth embodiment.

The coding processing can be executed in the sequencer section 201 or the data path section 102.

The other configurations of this example are substantially the same as those of the state transition table memory 202 shown in FIG. 15.

Configuration of Control Information Memory

[First Embodiment of Control Information Memory]

Next, a first embodiment of the control information memory 203 will be described by referring to the drawings (FIG. 2).

Figure 19:
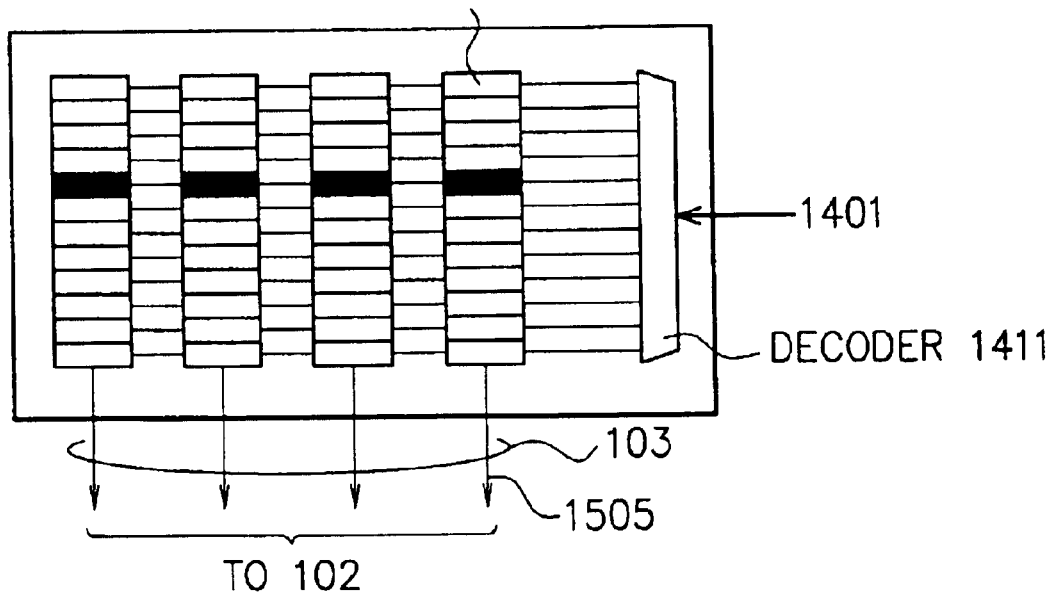
FIG. 19 is a schematic block diagram showing a first embodiment of a control information memory in an array-type processor in accordance with the present invention.

FIG. 19 schematically shows in a block diagram a layout of the first embodiment of the control information memory 203 in the embodiment of an array-type processor 1 according to the present invention.

In the memory layout of FIG. 19, the control information memory 203 of the state transition control section 101 includes a plurality of operation control information memories 1402 and a decoder 1411.

In the control information memory 203, one or more operation control information memories 1402 are selected in response to reception of an input of a state number 1401. Information of each operation control information thus selected is fed via the operation control bus 103 to the data path section 102.

The array-type processor 1 can efficiently control a plurality of operation control buses 103 using the operation control information memories 1402. As a result, it is possible to effectively control the data path section.

That is, since the state transition table memory 202 includes a plurality of entries (or next state candidates) for one state, reduction of the output bit width considerably enhances efficiency of area minimization of the state transition table memory 202. However, to improve the degree of freedom of the instruction code address outputted via the operation control bus 103 (that is, an instruction code address is assigned to each processor element 105 and each programmable switch element 106), it is necessary to increase the output bit width. The control information memory 203 is disposed to meet with the conflicting requirements. That is, by arranging the control information memory 203 between the state transition table memory 202 and the data path section 102, depth (an address space) of the control memory 203 is set to shallower than depth (an address space or the number of entries) of the event state transition table 1111. Resultantly, minimization of the area required for the state transition table memory 202 becomes compatible with improvement of the degree of freedom of the instruction code address required to improve the degree of freedom of the state transition destination.

A concrete example will be described by referring to FIG. 15. In an example in which the state transition table memory 202 shown in FIG. 15 is configured in the state transition table memory 202 shown in FIG. 2, for one current state number 204, the event identifying table 1111 outputs a next state number 1126 as four branch destinations including, and the default state transition table 1112 outputs a next state number 1127 as one transition destination. Moreover, the forced state transition table 1113 outputs a next state number 1128 corresponding to a forced event identifying code. In the selectors 1118, 1119, and 1120, one of the signals is selected to be outputted as a next state number 205. The next state number 205 is replaced in the sequencer 201 with a current state number 204 to be fed to the control information memory 203. In the memory 203 as shown, for example, in FIG. 19, an operation control information memory 1402 corresponding to the inputted state number 1401 is selected and an instruction code address 1505 stored in the operation control information memory 1402 is fed via the operation control bus 103 to the data path section 102. In contrast therewith, when the control information memory is not configured, the output from the state transition table memory 202 must includes an instruction code address 1505. For example, in the example in which the state transition table 202 of FIG. 16 is configured in the state transition table 202 shown in FIG. 5, the control information memory 203 is not constructed. For the event state transition table 1121, the default state transition table 1122, and the forced state transition table 1123, not only the memory for the current state number 204 and the next state number (1146, 1147, 1148) but also the memory for the instruction code address corresponding to the next state number (1346, 1347, 1348) are required. Therefore, for each table (the event state transition table 1121, the default state transition table 1122, and the forced state transition table 1123), a memory area is required to store the instruction code address (1346, 1347, 1348).

That is, in comparison with only the event state transition table 1121, in a configuration (FIG. 16) in which, for example, four sets of information each of which includes a next state number 1146 and an instruction address 1346 are produced for one current state number 204, there is required a memory about four times the memory required when the control information memory 203 is incorporated. Moreover, since the instruction code address (1347, 1348) exist for the default state transition table 1122 and the forced state transition table 1123, the required memory is about five times the memory when the control information memory 203 is disposed. Additionally, it is also necessary that the bit width of the selector (1138, 1139, 1140) and the like is accordingly increased.

In the configuration of FIG. 5, since the control information memory 203 is absent, the number of memories for the state transition table memory 202 is increased as shown in FIG. 16. It is required therefore to increase the bit width. However, this configuration is suitable to increase the operation speed.

On the other hand, in the configuration shown in FIG. 2, the memory area of the state transition table memory 202 can be reduced by providing the control information memory 203. In this construction, since the state transition memory 202 outputs only the next state number 205, the bit width can be minimized. However, in this configuration, since the operation is achieved once via the control information memory 203, the operation speed is decreased. Using good memory efficiency due to the separate control information table memory 203, by setting the number of outputted instruction code addresses to a value larger than that of outputs from the state transition table memory 202 shown in FIG. 16, the data path section 102 can be efficiently configured.

That is, the both configurations are to be respectively used in a case in which the number of instruction codes to be distributed is increased (the degree of freedom is increased) and in a case in which the operation speed is increased.

However, when the configuration in which the memory referring operation is conducted twice, namely, for the state transition table 202 and the control information memory 203 and hence has a problem of delay, it may be possible to decrease the degree of freedom of the instruction code address 1505. Therefore, by removing the output bit width for the event state transition table 1121, the default state transition table 1122, and the forced state transition table 1123, the problem can be removed.

The state number 1401 indicates the current state number 204 or the next state number 205.
Configuration of Processor Element
[First Embodiment of Processor Element]

Subsequently, description will be given of a first embodiment of the processor elements 105 of the embodiment (FIG. 2) will be described by referring to the drawings.

Figure 20:
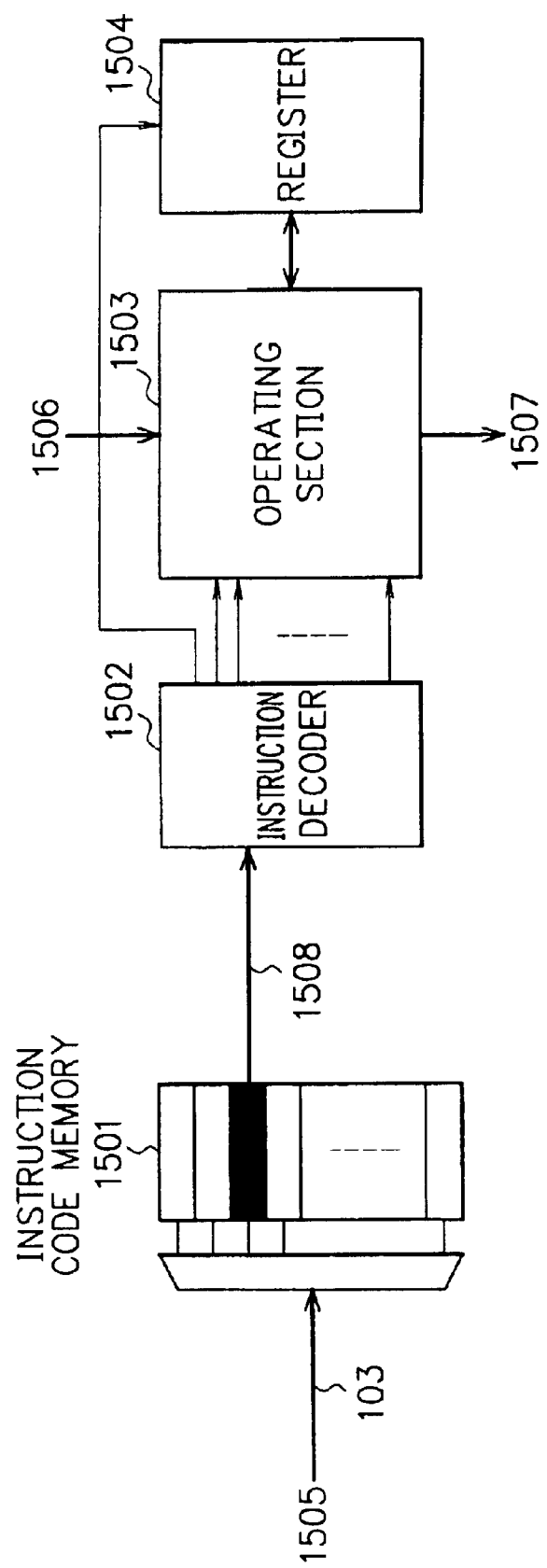
FIG. 20 is a schematic block diagram showing a first embodiment of a processor element in an array-type processor in accordance with the present invention.

FIG. 20 shows, in a schematic block diagram, a construction of the first embodiment of the processor element 105 in the embodiment of an array-type processor according to the present invention.

In the configuration of FIG. 20, the processor element 105 includes an instruction code memory 1501 to store a plurality of instruction codes, an instruction decoder 1502 to decode an instruction code, an operating section 1503 to execute an instruction code beforehand decoded, and a register 1504 to record data for operation.

In the processor element 105, when an instruction code address 1505 is received via the operation control bus 103, one of instruction codes 1508 is selected to be fed from the instruction code memory 1501 to the instruction decoder 1502. The decoder 1502 interprets the instruction code 1508 to resultantly determine operations in the operating section 1503 and the register section 1504. As above, according to the interpretation of the instruction decoder 1502, the operating section 1503 determines an operation, input signals, output signals, and destinations of the output signals. In this construction, whether or not the register section 1504 is used is also determined.

Since the array-type processor 1 includes the register 1504 in which data for operation is stored, wiring efficiency between the operating section 1503 and the register 1504 is improved. The processor 1 is consequently minimized in size and is advantageously improved in processing performance.

Preferably, the processor element 105 conducts, under control of the state transition controller 101, processing for external input data 1506 or data recorded in the register 1504. A result of the processing is fed as output data 1507 to an external device or is recorded in the register 1504. In the configuration, the processing can be effectively executed and hence processing efficiency is improved.

The operating section 1503 basically conducts operation in which the section 1503 receives the input data 1506 or the data of register 1504, executes processing for the data, and outputs a result of the processing as the output data 1507 to an external device or writes data in the register 1504.

The register 1504 need not be necessarily arranged in each processor element 105.

It is possible that one register is shared among a plurality of processor elements or there may be formed a group including a plurality of elements to allocate a register to the group. It is also possible to dispose a register in a path from the input port of the operation control bus 103 to the operating section 1503 and the register 1504 to synchronize a change in operation of the processor element 105, more specifically, to synchronize the operation start point (implementation of a state or change of a configuration) of the processor element 105. This is a configuration incorporated in a construction in which an instruction address corresponding to the next state number 205 is delivered from the state transition control section 101, the configuration being used to validate the instruction code address in a subsequent cycle. In the construction, at timing synchronized with a cycle start point, the configuration (state) of each processor element 105 is changed and then operation is started in the respective processor elements 105.
[Second Embodiment of Processor Element]

Next, description will be given of a second embodiment of the processor element 105 in the embodiment.

Figure 21:
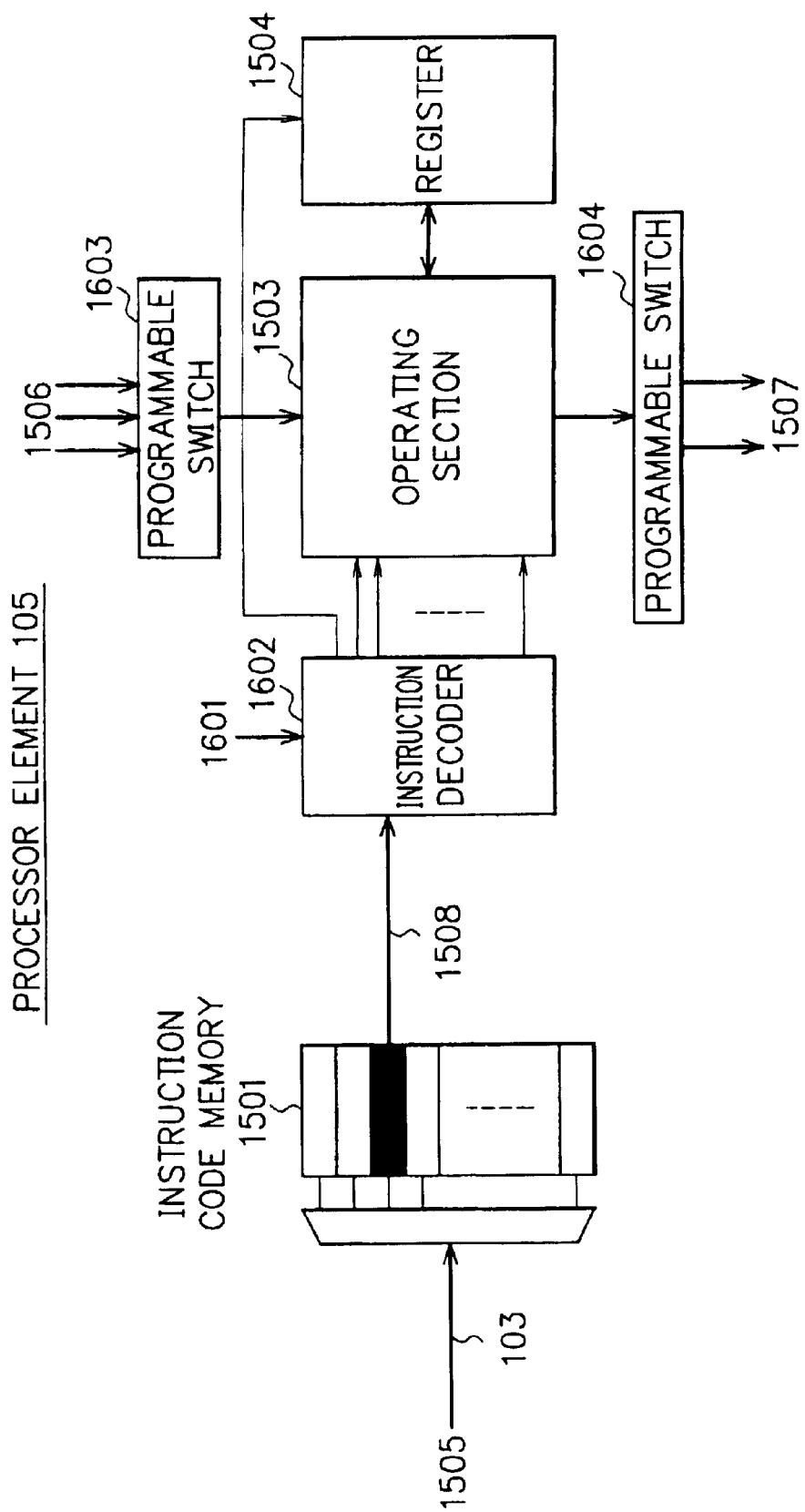
FIG. 21 is a schematic block diagram showing a second embodiment of an application example of the processor element in an array-type processor in accordance with the present invention.

FIG. 21 schematically shows, in a block diagram, a second embodiment of the processor element 105 in the embodiment of an array-type processor 1 according to the present invention.

In the construction of FIG. 21, the processor element 105 includes an instruction code memory 1501, an instruction decoder 1602, an operating section 1503, a register 1504, and programmable switches 1603 and 1604. The instruction decoder 1602 receives a control signal 1601.

The instruction decode 1602 sends control signals to the operating section 1503 and the register 1504 according to the instruction code 1508 and the control signal 1601. The register 1504 communicates signals with the operating section 1503 when necessary.

The control signal 1601 is a signal fed from the processor element 105 or a signal from an external device with respect to the data path section 102. The external signals with respect to the data path section 102 are, for example, signals from a device outside the chip (a control processor) and signals from the state transition control section 101. This is because as follows, for example, although the state transition controller 101 distributes a common instruction code address to a plurality of processor elements 105, the control signals 1601 is individually delivered to each processor element 105 in a pertinent method. This is because a fine adjustment is conducted by the control signal 1601 while using the same instruction code address (minimization of instruction code address space for higher efficiency).

In the configuration, not only the instruction code address 1505 issued from the state transition controller 101, but also a signal in the data path section 102 as well as an external signal from an external device with respect to the array-type processor 1 can be used to control operation of the processor element 105.

For example, when that the operating system 1503 implements a selector with two inputs and one output is beforehand determined by an instruction code address, there may be used, in addition to a method in which the selector selecting line (control) is also included in the instruction code, a method in which the selection line is external inputted with respect to the processor element 105. This configuration also applies to the write control operation, the shift direction, and the like of the register 104.

In the configuration, it is possible that the basic configuration is determined by the instruction code address, and part of the configuration can be externally controlled. That is, using one instruction code address, part of the state can be changed according to, for example, a condition.

Therefore, it is for example possible that a signal fed from another processor element 105 is received by a pertinent processor element 105 to control a selection signal of a selector including an operating unit associated with the pertinent processor element 105. In other words, it is possible that while the operating section 1503 implements a selector as an operating unit (by an instruction code), the selection control operation is not carried out by the pertinent processor element 105, but by an output from another processor element 105.

In the processor element 105, a programmable switch 1603 is arranged between the operating section 1503 and the input data, and a programmable switch 1604 is disposed between the operating section 1503 and the output data 1507.

In this structure, when one of a plurality of input data 1506 is to be selected, one of a plurality of output data ports or destinations 1507 can be selected.

Thanks to the construction, the processor elements 105 can be improved in processing performance particularly when each processor element 105 is connected to a plurality of programmable switch elements 1106 as shown in FIG. 10 and when the processor elements 105 are directly and electrically connected without using programmable switch elements 106 as shown in FIG. 11.

The programmable switch (1603, 1604) may be disposed on both of the input and output sides or on either one thereof.

The other configurations and functional operations are substantially the same as those of the processor elements 105 shown in FIG. 20.

Configuration of Programmable Switch Element

[First Embodiment of Programmable Switch Element]

Subsequently, description will be given of a first embodiment of the programmable switch element 106 in the embodiment (FIG. 7).

Figure 22:
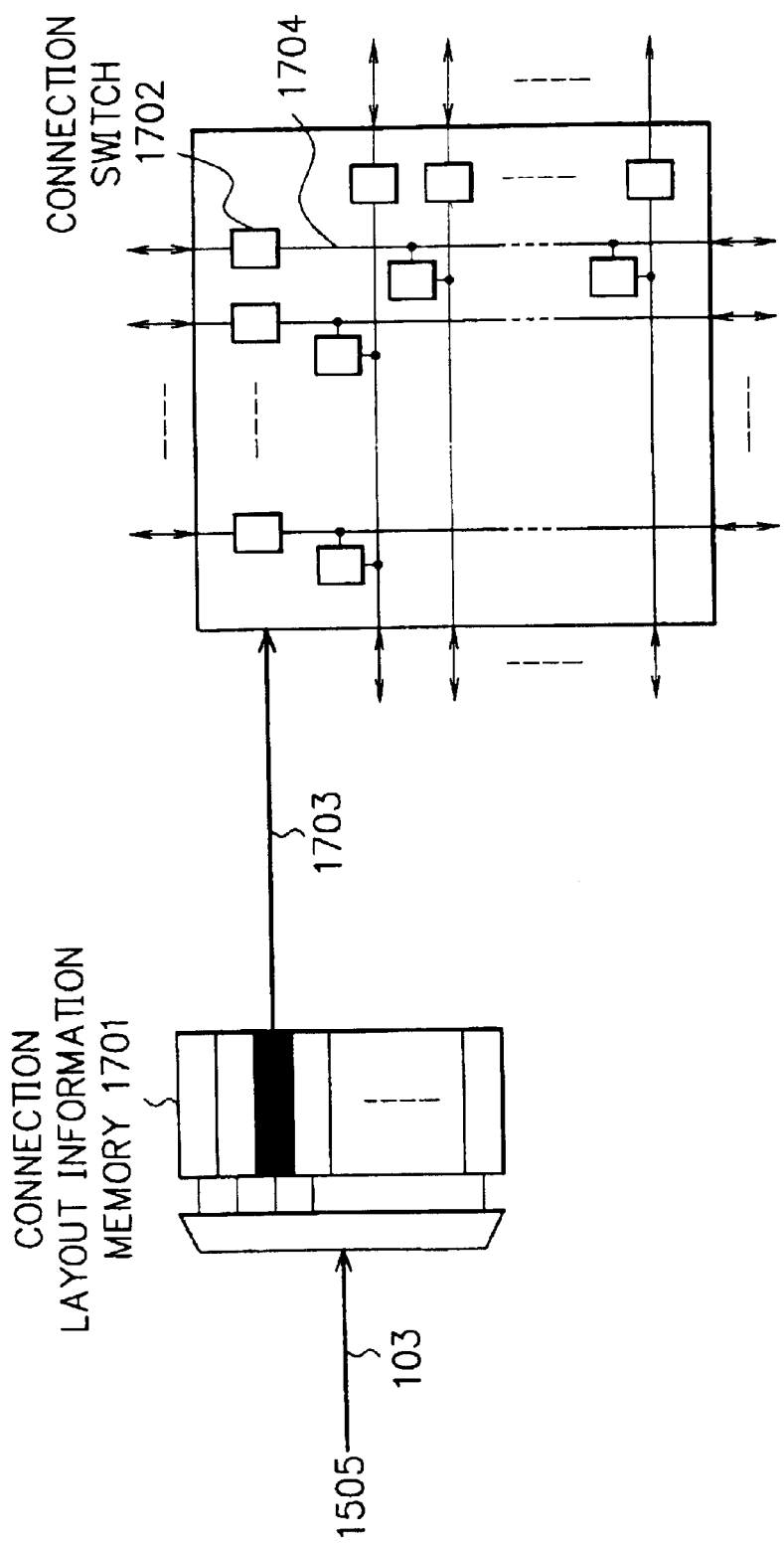
FIG. 22 is a schematic block diagram showing a first embodiment of a programmable switch element in an array-type processor in accordance with the present invention.

FIG. 22 shows, in a schematic block diagram, a configuration of a first embodiment of the programmable switch element 106 in the embodiment of an array-type processor 1 according to the present invention.

In the construction, the programmable switch element 106 includes a connection layout information memory 1701 to store a plurality of sets of connection layout information 1703, connection switches 1702, and connection lines 1704.

The connection layout information 1703 is information to indicate a connection layout, although not shown, between the processor elements 105 and the programmable switch elements 100 and/or between the programmable switch elements 106. According to the connection layout information 1703, each connection switch 1702 sets electric connection between associated connection lines 1704 to on or off.

The programmable switch element 106 selects one of the connection layout information 1703 from the connection layout information memory 1701 and outputs the information 1703.

The connection layout information 1703 determines operation for each of the connection switches 1702 and resultantly indicates the connection layout between the processor elements 105 and the programmable switch elements 106 and/or between the programmable switch elements 106.

The connection switches 1702 and the connection lines 1704 may propagate signals in two directions or in a single direction.

Alternatively, the bi-directional or single-directional transmission may be assigned to each of the connection switches 1702 and the connection lines 1704.

The programmable switch element 106 directly uses the output from the connection layout information memory 1701 to control the connection switches 1702. However, a decoder may be disposed between the connection layout information memory 1701 and the connection switches 1702.

In the programmable switch element 106, quantity of the connection layout information memory may be decreased with respect to the number of connection switches, for example, by sharing the connection layout information memory among the connection switches of which connection is exclusively set to on.

In the programmable switch element 106, when a register is arranged in a path from the input port of the operation control bus 103 to the connection switches 1702, it is possible to synchronize a change of connection of the programmable switch elements 106. That is, in the configuration, the change of the relationship of connections to change the configuration (state) of each processor element 105 can be achieved at timing synchronized with the cycle start point.

Data Path Section Control Method

[First Embodiment of Data Path Section Control Method]

Referring now to the drawings, description will be given of a method of controlling the data path section 102 using the operation control information memory 1402 of the embodiment.

Figure 23:
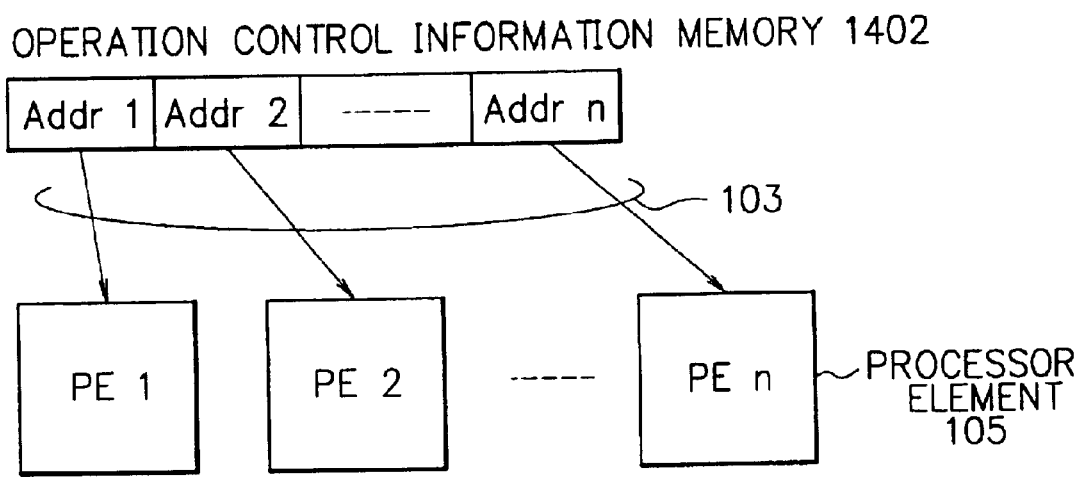
FIG. 23 is a schematic diagram showing a first embodiment of a control method of a data path section using an operation control information memory an array-type processor in accordance with the present invention.

FIG. 23 schematically shows a first embodiment of a method of controlling the data path section 102 using the operation control information memory 203 in the embodiment of an array-type processor 1 according to the present invention.

In the control method shown in FIG. 18, the data path section 102 controls the processor elements 105 using the operation control information memory 1402.

As can be seen from FIG. 19, the operation control information memory 1402 selected from the control information memory 203 according to the state number 1401 is used. The operation control information memory 1402 records therein instruction code addresses the number of which is equal to that of the processor elements 105 controlled by the memory 1402.

That is, a one-to-one correspondence exists between the processor elements 105 and the instruction code addresses.

Specifically, for example, Addr1 corresponds to PE1 and Addr2 corresponds to PE2 so that the address of each processor element 105 can be independently controlled as shown in FIG. 23.

It is to be appreciated that the arrangement of processor elements 105 to be controlled by one operation control information memory 1402 is not restricted by the example shown in the drawings. That is, in the configuration of the embodiment, it is not necessary that the processor elements 105 disposed in a horizontal line are controlled by the operation control information memory 1402. Moreover, it is not necessary that the arrangement (array) of the processor elements 105 is restricted by this configuration. However, when the processor elements 105 are arranged in an array, it is desirable that an individual instruction code address is supplied to each processor element in the configuration.

Although not shown, for the programmable switch elements 106, there may be arranged an independent operation control information memory of substantially the same configuration as that disposed for the processor elements 105. In the structure, the programmable switch elements 106 can be controlled in almost the same way as for the processor elements 105.

[Second Embodiment of Data Path Section Control Method]

In a second embodiment of the method of controlling the data path section 102, the instruction code addresses of the processor elements 105 and the instruction code addresses of the programmable switch elements 106 are stored in the operation control information memory 1402. In this configuration, both of the processor elements 105 and the programmable switch elements 106 can be controlled by the same operation control information memory 1402.

Figure 24:
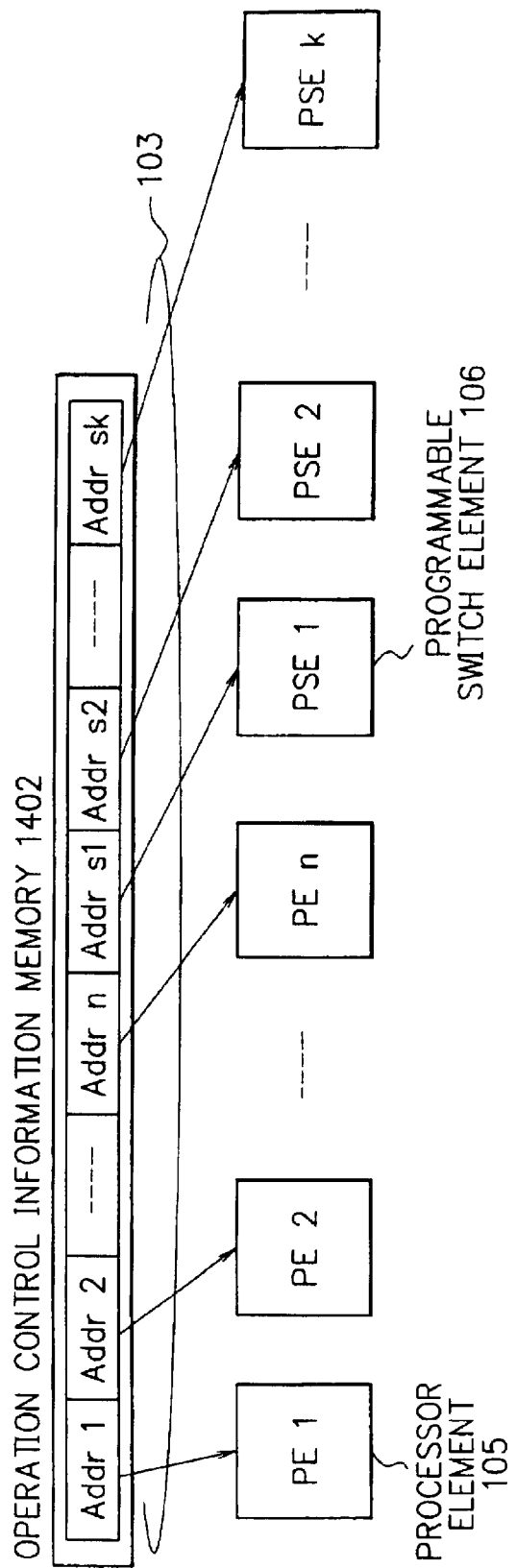
FIG. 24 is a schematic diagram showing a second embodiment of a control method of the data path section using the operation control information memory in an array-type processor in accordance with the present invention.

FIG. 24 is a schematic diagram for explaining the configuration of the first application example.

In the example of FIG. 24, the operation control information memory 1402 of the present embodiment stores, in addition to the instruction code address for the processor elements 105, an instruction code address for the programmable switch elements 106.

Thanks to the construction, it is not necessary in this embodiment to dispose the connection layout information memory as an independent section. Therefore, the circuit size can be reduced.

[Third Embodiment of Data Path Section Control Method]

In a third embodiment of the method of controlling the data path section 102, the same address of the same operation control information memory 1402 is shared between the processor elements 105 and the programmable switch elements 106. In this configuration, an instruction code address can be shared between the processor elements 105 and the programmable switch elements 106.

In the method of controlling the data path section 102 shown in FIG. 23, the number of instruction code addresses in the operation control information memory 1402 selected according to the state number 1401 is equal to the number of processor elements 105 under control of the operation control information memory 1402. Therefore, the instruction code address can be flexibly specified for each processor element 105. However, since each instruction code address is individually transferred to each processor element 105, there is a tendency of increase in resources, for example, the operation control bus 103 required for the transfer of the instruction code address and each operation control information memory 1402 are increased in size.

[Fourth Embodiment of Data Path Section Control Method]

Referring now to the drawings, description will be given of a fourth embodiment of the method of controlling the data path section 102 using the operation control information memory 1402 of the embodiment. The problem is removed by this method.

Figure 25:
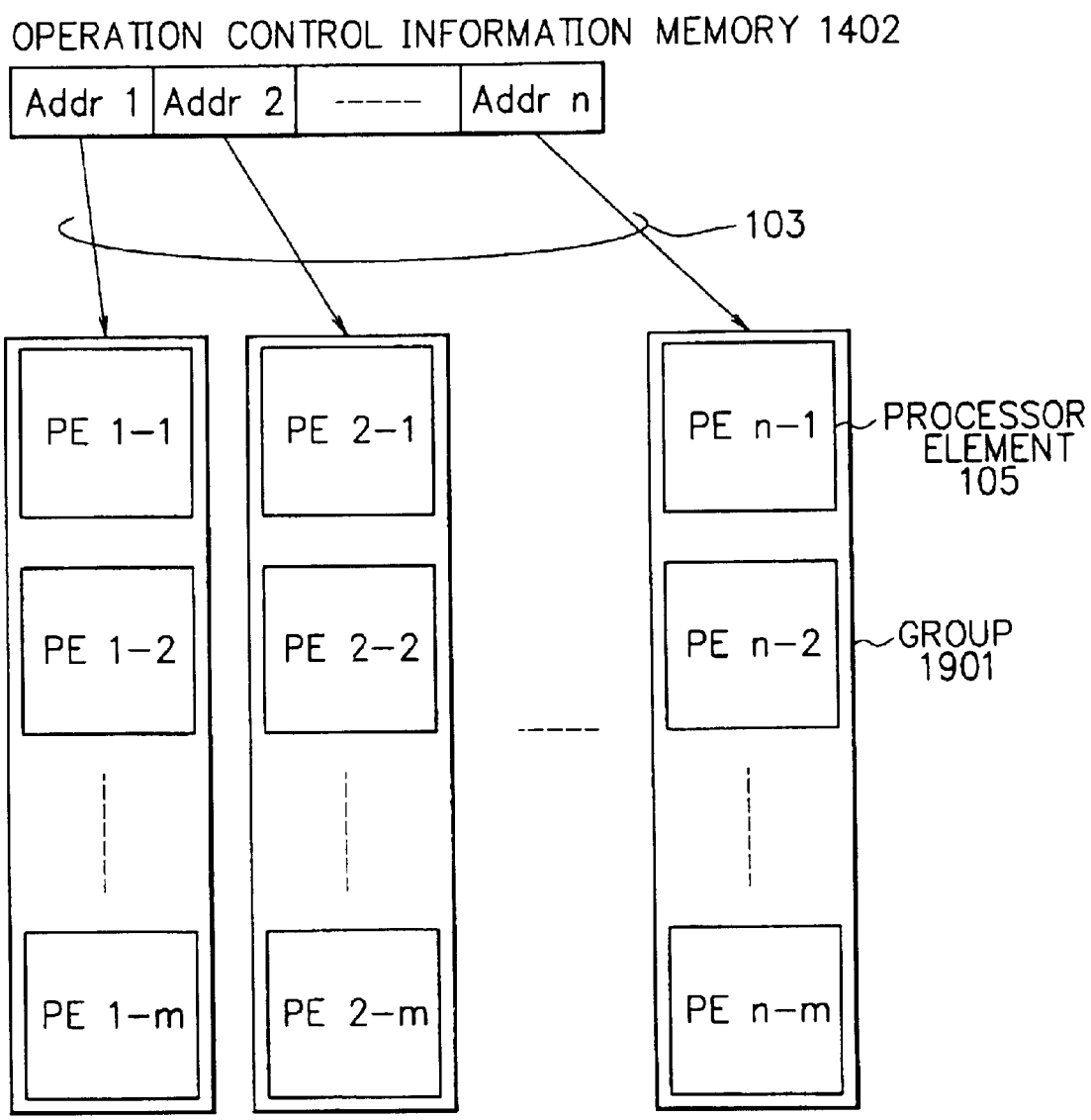
FIG. 25 is a schematic diagram showing a fourth embodiment of a control method of the data path section using the operation control information memory in an array-type processor in accordance with the present invention.

FIG. 25 shows in a schematic block diagram the third application example of the method of controlling the data path section 102 using the operation control information memory 1402 in the embodiment of an array-type processor 1 in accordance with the present invention.

In the fourth embodiment, instruction code addresses respectively of a plurality of processor elements 105 can be specified using one address in the operation control information memory 1402.

Specifically, Addr1 specifies m addresses ranging from PE1-1 to PE1-m and Addr2 specifies m addresses ranging from PE2-1 to PE2-m in this configuration.

Although the flexibility to specify an independent address for each processor element 105 is lost, the quantity of hardware resources required for the control operation can be advantageously minimized.

The number of addresses contained in one operation control information memory 1402 is at least one in the configuration, each group 1901 controlled with one address may contain m processor elements 105. The value of m need not be fixed for all groups and is only at least one.

The programmable switch elements 106 can be similarly controlled.

Next, description will be given in detail of a control method in which the programmable switch elements 106 are also classified into groups by referring to an independent embodiment of the method and the drawings.

[Fifth Embodiment of Data Path Section Control Method]

Figure 26:
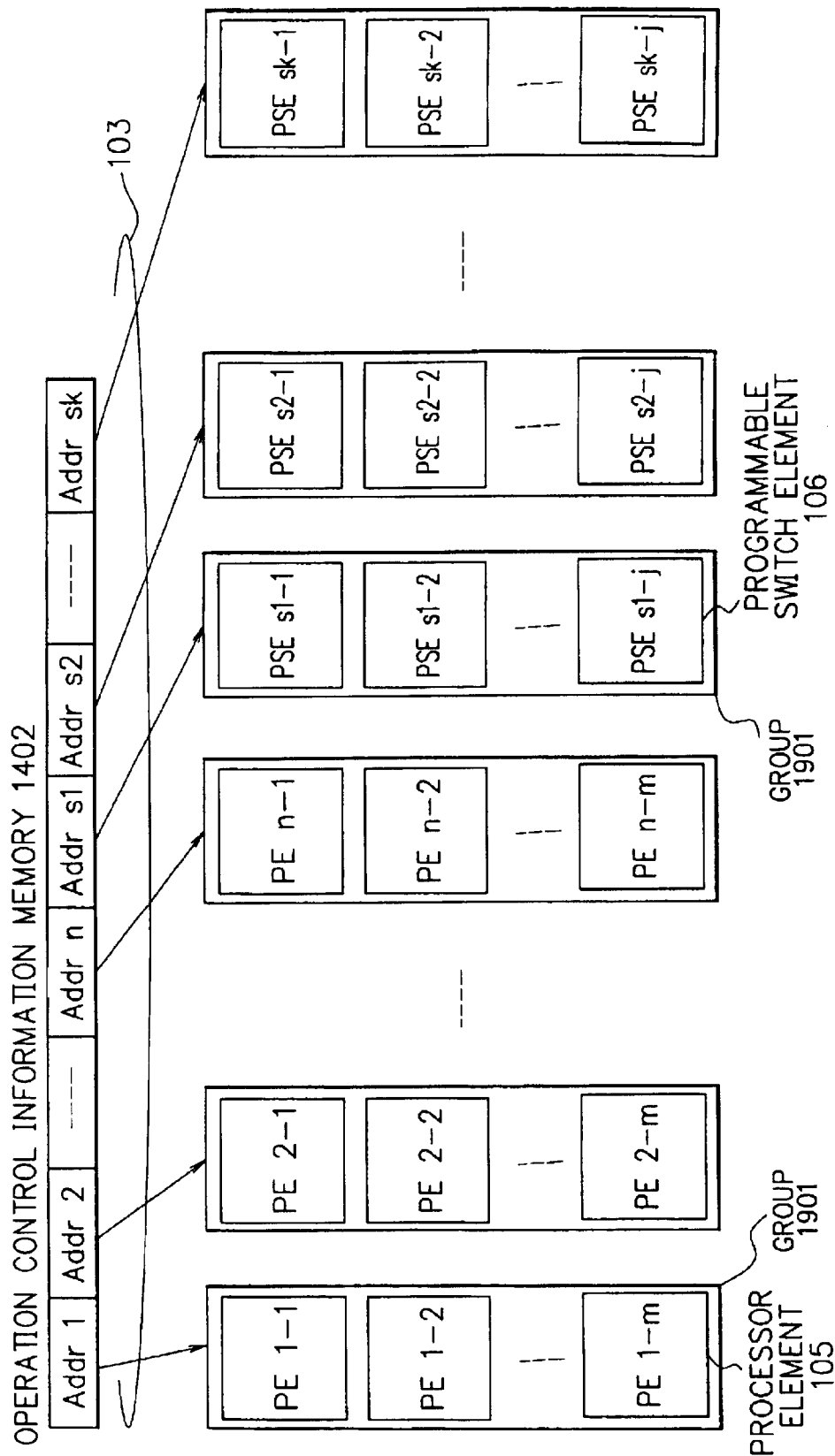
FIG. 26 is a schematic diagram showing a fifth embodiment of a control method of the data path section using the operation control information memory in an array-type processor in accordance with the present invention.

FIG. 26 schematically shows in a block diagram a fifth embodiment of the method of controlling the data path section 102 by use of the operation control information memory 1402 in the embodiment of an array-type processor 1 in accordance with the present invention.

In the method of this embodiment, instruction code addresses of processor elements 105 or programmable switch elements 106 can be specified using one address of the operation control information memory 1402.

Therefore, in this embodiment, addresses for the processor elements 105 are arranged as in the fourth embodiment of the data path section shown in FIG. 25. This embodiment has an inherent configuration in which the programmable switch elements 106 are classified into groups. Addresses are assigned to each of the groups. Therefore, instruction code addresses of programmable switch elements 106 can be specified using one address of the operation control information memory 1402.

Specifically, in the control operation of this configuration, Addrs1 covers j addresses ranging from PSEs1-1 to PSEs1-j and Addrs2 covers j addresses ranging from PSEs2-1 to PSEs2-j.

As in the configuration associated with each processor element 105 of the fourth embodiment of the data path section control method, the flexibility to specify an independent address to each programmable switch element 106 is also lost in the configuration of the fourth application example. However, the amount of required hardware resources is advantageously minimized.

Each of the number n of addresses contained in one operation control information memory 1402 and the number of sk may be at least one in the configuration. The number m of processor elements 105 or the number k of programmable switch elements 106 contained in a group 1901 controlled by one address need not be fixed throughout the groups 1901 and may be at least one.

[Sixth Application Example of Data Path Section Control Method]

Figure 27:
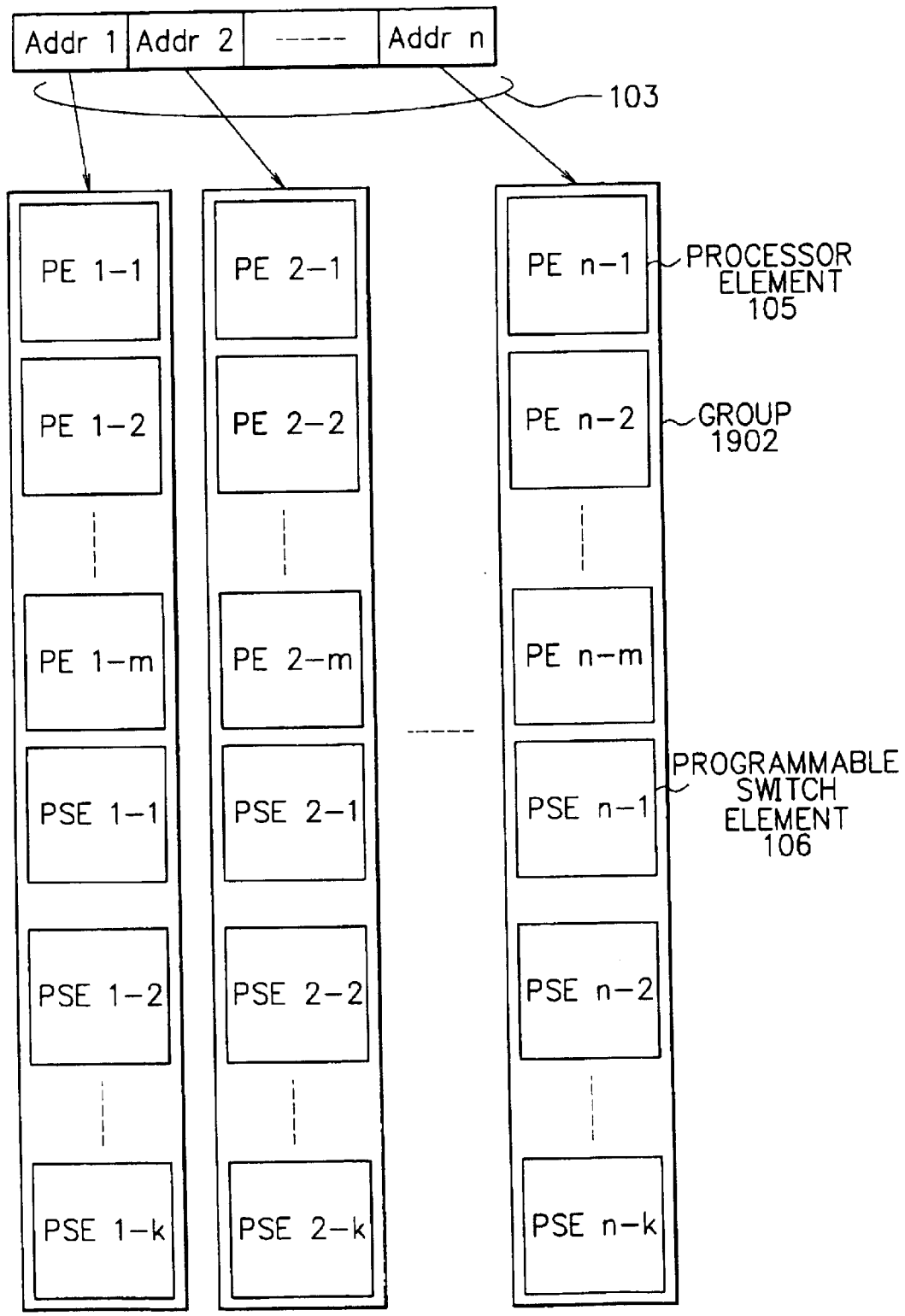
FIG. 27 is a schematic diagram showing a sixth embodiment of a control method of the data path section using the operation control information memory in an array-type processor in accordance with the present invention.

The control method of the operation control information memory 203 in the fifth embodiment of the data path section can also be varied as shown in FIG. 27. The control method of FIG. 27 will be described in detail as the sixth embodiment of the data path section control method.

In the method of this example shown in FIG. 27, instruction code addresses of processor elements 105 and programmable switch elements 106 can be specified using one address of the operation control information memory 1402.

Concretely, the construction allows a control operation in which Addrs1 covers (m+k) addresses ranging from PE1-1 to P1-m and addresses ranging from PSE 1—1 to PSE 1-k.

In the configuration of this application example, the flexibility to specify an independent address to each of the processor elements 105 and the programmable switch elements 106 is lost as in the configuration associated with each processor element 105 of the fourth embodiment of the data path section control method. However, the quantity of required hardware resources is advantageously reduced when compared with the fourth and fifth embodiments of the data path section control method.

The number of addresses contained in one operation control information memory 1402 may be at least one in the configuration. The number m of processor elements 105 or the number k of programmable switch elements 106 contained in a group 1902 controlled by one address need not be fixed for all groups 1902 and may be at least one.

[Seventh Embodiment of Data Path Section Control Method]

Referring next to the drawings, description will be given of a seventh embodiment of the method of controlling the data path section 102 using the operation control information memory 1402 according to the embodiment.

FIG. 28 shows in a block diagram the seventh embodiment of the method of controlling the data path section 102 by use of the operation control information memory 1402 in the embodiment of an array-type processor 1 in accordance with the present invention.

In FIG. 28, address values in the operation control information memory 1402 selected according to the state number 1401 are being fed respectively to the operation control buses 2003. A processor element 105 under control of the pertinent operation control information memory 1402 selects one of the buses 2003 by a selector 2001 to receive an address from the bus 2003 to use the address as an instruction control address.

Therefore, for example, when PE2 which is a processor element 105 selects the operation control bus 1, a value of Addr1 of the operation control information memory 1402 is fed via the operation control bus 1 and is used as an instruction code address of PE2.

Since each processor element 105 can select a desired operation control bus 2003, processor elements 105 connected to one operation control information memory 1402 can be classified into groups the number of which is less than that of the operation control buses 2003. Consequently, mutually different instruction code addresses can be used respectively for the groups.

The grouping of the processor elements 105 is controlled by a memory 2002 shown in FIG. 28. The memory 2002 includes, for example, the instruction code memory 1501 and the instruction decoder 1502 of the processor element 105 shown in FIG. 20.

In short, in the method of controlling the data path section 102 according to this embodiment, an instruction code decoded by the instruction decoder 1502 is used to select the operation control bus 2003 shown in FIG. 28. This configuration is implemented also in an implementation example described below.

There may be employed a method in which for each processor element 105, the operation control buses 2003 which can be selected by the processor element 105 is restricted or a method in which the selector 2001 is shared among several processor elements 105 to minimize the quantity of circuits. In this case, however, the grouping is restricted.

In the seventh embodiment of the data path section control method, it is not necessary that an equal number of processor elements 105 and operation control buses are disposed as shown in FIG. 23. Moreover, a state in which processor elements 105 to be controlled by one address cannot be beforehand fixed as shown in FIG. 25 can be prevented.

In other words, it is possible to reduce the quantity of resources required to propagate the instruction code address and to increase the degree of freedom for the grouping of processor elements 105.

There may be employed a method in which information to indicate a bus to be selected by the selector 2001 is stored as fixed information in the memory 2002 and a method in which the information is dynamically modified according to the state of each processor element 105.

For example, there may be utilized a method in which for each processor element, a next operation control bus 2003 is determined according to the current instruction code address.

[Eighth Embodiment of Data Path Section Control Method]

Referring to the drawings, description will now be given in detail of an eighth embodiment of the data path section control method in which the seventh embodiment of the data path section control method is applied not only to the processor elements 105 but also to the programmable switch elements 106.

Figure 29:
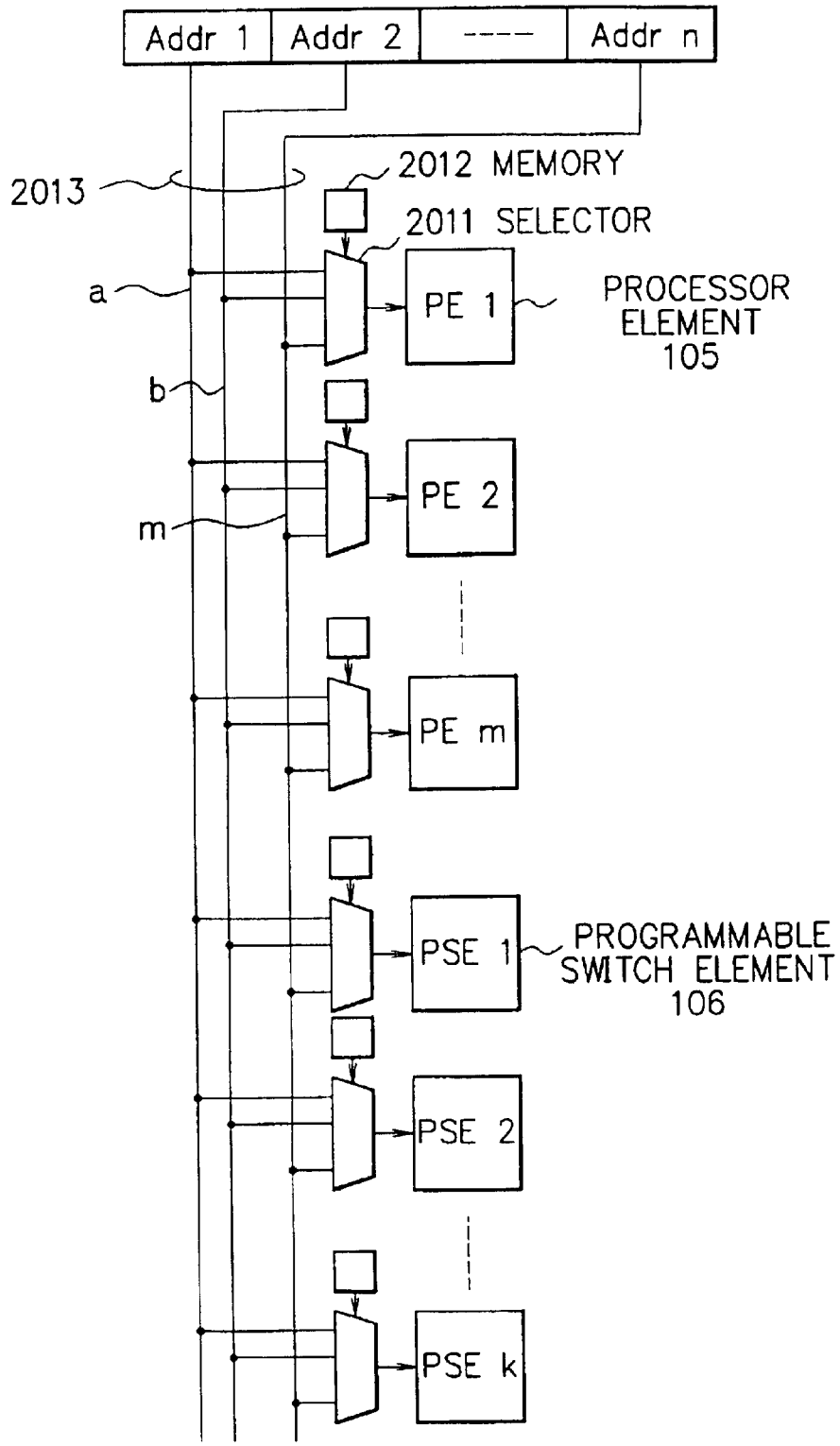
FIG. 29 is a schematic diagram showing an eighth embodiment of a control method of the data path section using the operation control information memory in an array-type processor in accordance with the present invention.

FIG. 29 shows in a block diagram a method of controlling the data path section 102 according to the seventh embodiment.

In FIG. 29, the address values in the operation control information memory 1402 selected by the state number 1401 are respectively supplied to the operation control buses 2013. Each of the processor elements 105 and the programmable switch elements 106 controlled using the operation control information memory 1402 selects one of the operation control buses 2013 by the selector 2011 to receive an address from the bus 2013 and uses the address as an instruction code address.

Therefore, when PSE1 indicating the programmable switch element 106 selects, for example, an operation control bus a, the value of Addr1 in the operation control information memory 1402 is passed via the operation control bus a to be used as an instruction code address by PSE1.

In the configuration in which each of the processor elements 105 and the programmable switch elements 106 can select an arbitrary one of the operation control buses 2013 and a common instruction code address is shared between the processor elements 105 and the programmable switch elements, the processor elements 105 and the programmable switch elements 106 connected to one operation control information memory 1402 can be classified into groups of which the number is equal to or less than that of the operation control buses 2013. Consequently, mutually different instruction code addresses can be used for the respective groups.

It is also possible to employ a method in which the operation control buses 2013 selectable by each of the processor elements 105 and the programmable switch elements 106 is limited and/or a method in which the selector 2011 is shared between several processor elements 105, between several programmable switch elements 106, or between several processor elements 105 and several programmable switch elements 106 to reduce the amount of required circuits. However, the grouping is limited in this case.

As above, in the eighth embodiment of the control method of the data path section 102, the advantage obtained by the seventh embodiment of the data path section control method can be implemented in a configuration also including the programmable switch elements 106.

That is, the amount of resources necessary to propagate the instruction code address can be reduced and it is possible to increase a degree of freedom in the grouping of the processor elements 105 and the programmable switch elements 106.

There may also be used a method in which information to indicate which one of the operation control buses 2013 is selected by the selector 2011 is stored as fixed information in the memory 2012 as in the seventh embodiment of the data path section control method and a method in which the information is dynamically changed according to the state of each of the processor elements 105 and each of the programmable switch elements 106.

There may be employed, for example, a method in which for each of the processor elements 105 and for each of the programmable switch elements 106, a next operation control bus 2013 is determined according to the current instruction code address.

[Ninth Embodiment of Data Path Section Control Method]

Description will now be given in detail of a ninth embodiment of the data path section control method by referring to the drawings. This example is another configuration of the eighth embodiment of the data path section control method.

Figure 30:
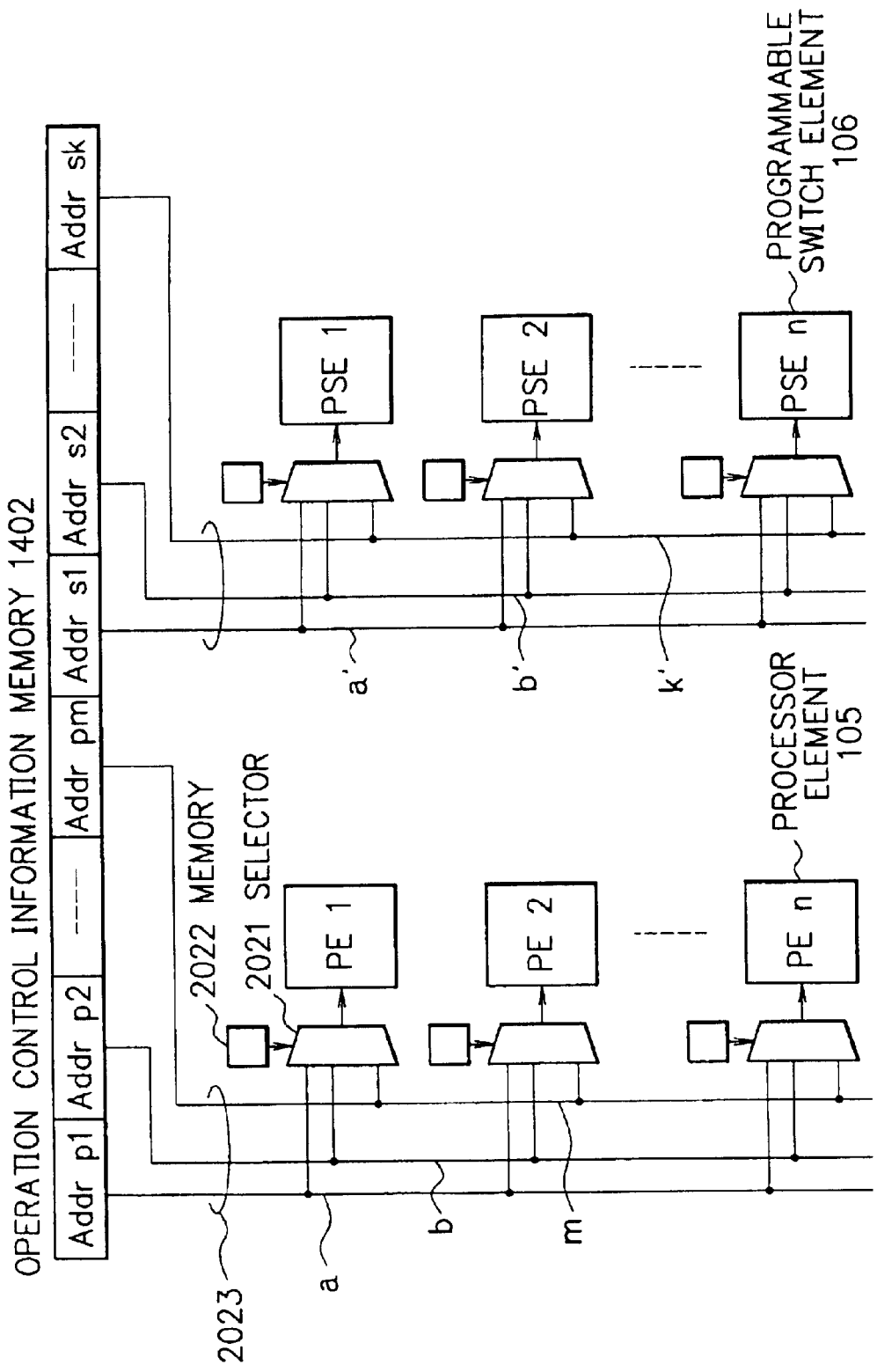
FIG. 30 is a schematic diagram showing a ninth embodiment of a control method of the data path section using the operation control information memory in an array-type processor in accordance with the present invention.

FIG. 30 shows in a block diagram a method of controlling the data path section 102 of the present embodiment.

Referring to FIG. 30, the embodiment includes not only the operation control buses 2023 to feed instruction codes to the processor elements 105 but also operation control buses 2023 to deliver instruction codes to the programmable switch elements 106.

This embodiment include an operation control information memory 1402 storing, in addition to instruction code addresses corresponding to addresses for the processor elements 105, instruction code addresses corresponding to addresses for the programmable switch elements 106.

In FIG. 30, the address values in the operation control information memory 1402 selected by the state number 1401 are supplied to the operation control buses 2023, respectively. Each of the processor elements 105 and the programmable switch elements 106 supervised using the operation control information memory 1402 selects one of the operation control buses 2023 using the selector 2021 and receives an address from the bus 2023 to use the address as an instruction code address.

Therefore, for example, when PSE1 which is the programmable switch element 106 selects an operation control bus a', the value of Addrs1 in the operation control information memory 1402 is fed via the operation control bus a' to be used as an instruction code address by PSE1.

In the structure in which each of the processor elements 105 or the programmable switch elements 106 can select a desired one of the operation control buses 2023, the processor elements 105 connected to one operation control information memory 1402 can be classified into groups of which the number is equal to or less than that of the operation control buses 2023. Moreover, the programmable switch elements 106 connected to the pertinent operation control information memory 1402 can be classified together with the processor elements 105 above into groups of which the number is equal to or less than that of the operation control buses 2023. In addition, mutually different instruction code addresses can be used for the respective groups.

It is also possible to employ a method to limit the operation control buses 2023 which can be selected by each of the processor elements 105 and the programmable switch elements 106 and/or a method in which the selector 2021 is shared between several processor elements 105 or between several programmable switch elements 106 to reduce the quantity of required circuits. However, the grouping is limited in this case.

In accordance with the ninth embodiment of the control method of the data path section 102, the advantage attained by the seventh embodiment of the data path section control method can be implemented in a construction including the programmable switch elements 106.

That is, the quantity of resources required to deliver the instruction code address can be reduced and it is possible to improve a degree of freedom in the grouping of the processor elements 105 and the programmable switch elements 106.

There may also be employed a method in which information to indicate which one of the operation control buses 2023 is selected by the selector 2021 is stored as fixed information in the memory 2022 as in the seventh embodiment of the data path section control method and a method in which the information is dynamically changed according to the state of each of the processor elements 105.

It is also possible to employ, for example, a method in which for each of the processor elements 105, a next operation control bus 2023 is determined according to the current instruction code address.

[Tenth Embodiment of Data Path Section Control Method]

Referring now to the drawings, description will be given of a tenth embodiment of the method of controlling the data path section 102 employing the operation control information memory 1402 according to the embodiment.

Figure 31:
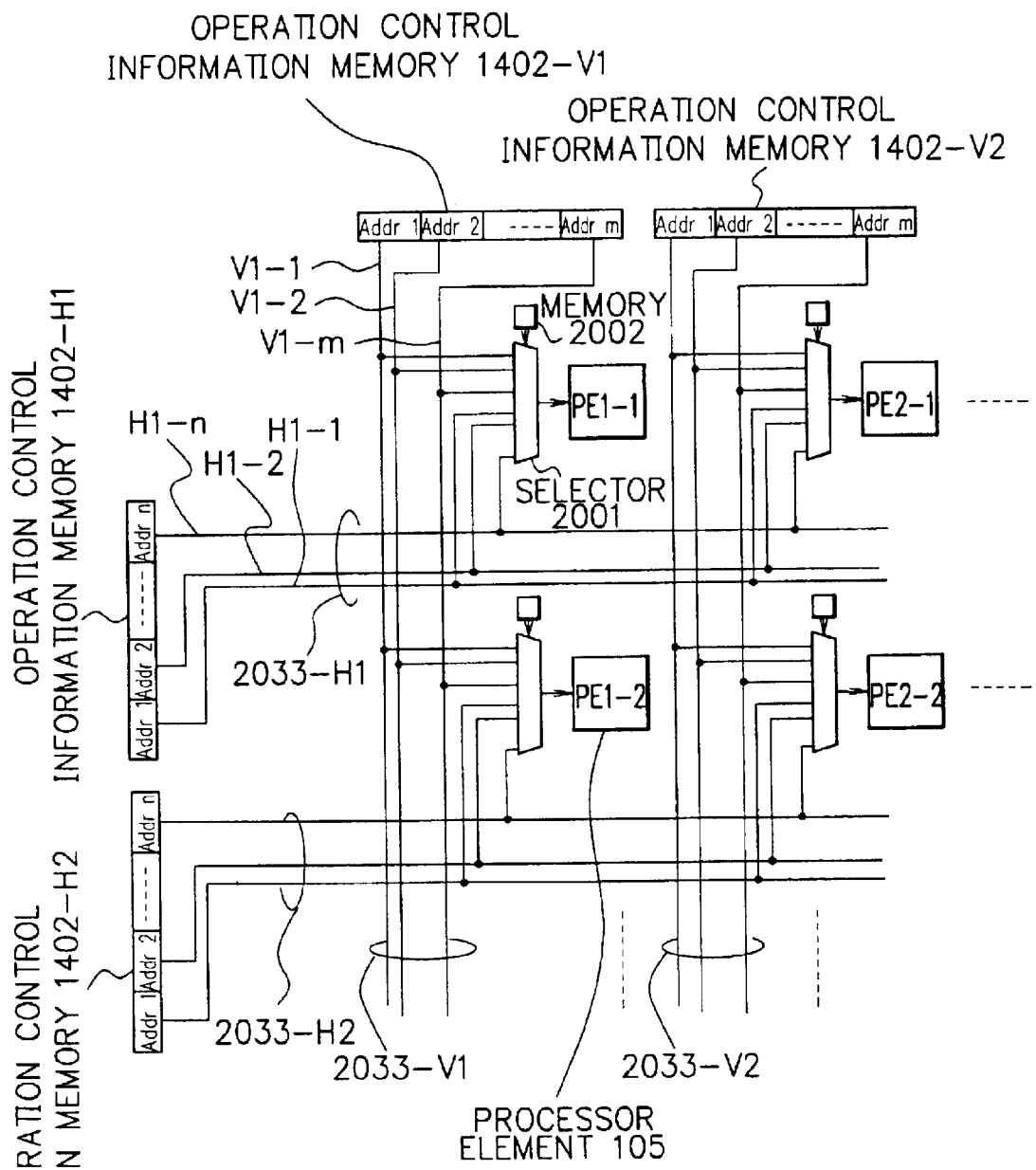
FIG. 31 is a schematic diagram showing a tenth embodiment of a control method of the data path section using the operation control information memory in an array-type processor in accordance with the present invention.

FIG. 31 shows, in a block diagram, a circuit configuration of the tenth embodiment of the method of controlling the data path section 102 using the operation control information memory 1402 in the embodiment of an array-type processor 1 in accordance with the present invention.

In FIG. 31, the data path section 102 includes processor elements 105 disposed in an array shape, operation control buses (2033-V1, 2033-V2, . . .) arranged in a vertical direction, operation control buses (2033-H1, 2033-H2, . . . ) arranged in a horizontal direction, and operation control information memories (1402-V1, 1402-V2, . . . , 1402-H1, 1402-H2, . . . ) connected respectively to the operation control buses in the vertical and horizontal directions.

In the structure, each processor element 105 can select one of the operation control buses 2033 in the vicinity thereof to obtain an instruction code address. That is, paying attention to the processor element PE-1 of FIG. 31, a selector 2001 connected thereto selects, according to a decoded instruction code from the memory 2002, either one of the instruction address buses (V1-1, V1-2, . . . ) V1-m) contained in the operation control bus 2033-VI and the instruction code addresses (H1-1, H1-2, . . . , H1-n) contained in the operation control bus 2033-H1 and delivers the selected item to the processor element PE1-1.

Additionally, to guarantee a free layout and free positions, the maximum diving number for groups is (m+n) which is quite larger than that shown in the configuration of in FIG. 31.

Resultantly, the method of dividing areas of the processor elements 105 can be freely determined in the vertical and horizontal directions within the range of the number of operation control buses 103.

In the embodiment shown in FIG. 31, the data path section 102 can be freely divided into (m+n) regions.

This is because that (m+n) instruction address buses (the number of V1-1, V1-2, . . . , V1-m, H1-1, H1-2, . . . , H1-n in association with PE1-1 in FIG. 31) are inputted to each processor element 105 and each processor element 105 can arbitrarily select either one thereof. This makes it possible to subdivide the overall processor elements 105 into (m+n) groups. In this division, an instruction code address of the processor element can be changed (i.e., the value can be separately determined and inputted) for each group. For example, an address of group 5 can be changed while an address of group 1 is kept fixed.

For example, to provide the entire degree of freedom in the grouping operation in the method shown in FIG. 23 or 24, it is necessary to input an individual address to each processor element 105. To achieve this purpose, a remarkably large amount of hardware components are required. Moreover, it is not possible to implement the entire degree of freedom in an actual method, and it is favorable to decrease the degree of freedom to some extent in the configuration. Furthermore, for example, in the construction shown in FIG. 29, although a high degree of freedom of grouping is obtained for each column, the grouping in the vertical direction is considerably restricted. To overcome this difficulty according to the present embodiment, the instruction address buses (which may be the operation control buses 2033-V1, 2033-V2, . . . , 2033-H1, 2033-H1, . . . ) are arranged in the vertical and horizontal directions to provide a free grouping in the vertical and horizontal directions. However, each group need not be formed in a batch, but may be formed, for example, in a checkered pattern.

The maximum dividing number in the grouping is quite large in the construction shown in FIG. 31. The reason for the possibility of the grouping in a free pattern (that is, positions and numbers of processor elements 105 can be arbitrarily selected) is that (m+n) is guaranteed. However, when (m+n) is guaranteed, it is considered that a higher degree of freedom is obtained when the instruction address buses are disposed in the vertical and horizontal directions as shown in FIG. 31 than when (m+n) instruction address buses are arranged for each column for the following reason. In a case in which, for example, the data path section 102 has a horizontal data flow, it is necessary to subdivide a pipeline in the vertical direction. However, for subdivision in the bit width direction (to implement a plurality of data paths), it is required to subdivide the pipeline in the horizontal direction. In the configuration of FIG. 31, both of the subdivisions can be efficiently carried out.

[11th Embodiment of Data Path Section Control Method]

Subsequently, referring to the drawings, description will be given of an 11th embodiment of the method of controlling the data path section 1402 adopting the operation control information memory 203 according to the embodiment.

FIG. 32(a) shows in a block diagram the 11th embodiment of the method of controlling the data path section 102 utilizing the operation control information memory 1402 in the embodiment of an array-type processor 1 in accordance with the present invention. FIG. 32(b) shows a circuit example to conduct operation of the embodiment in a block diagram.

In the data path section 102 including an operation control information memory 1402 shown in FIG. 32(a), the memory 1402 includes, as its feature, an instruction memory section 2201 and mask section 2202.

In the structure, address modification can be conducted only in some of the processor elements 105 controlled by the associated 01 operation control information memory 1402.

In other words, the mask section 2202 in FIG. 32(a) stores information to indicate whether or not each instruction code address contained in the operation control information memory 1402 is delivered as an effective value. Each of the masks 2203, 2204, and 2205 of the mask section 2202 includes one bit to store information to indicate whether or not each associated instruction code address is regarded as an effective value. In the mask section 2202 of FIG. 32(a), when a mask stores "1", the associated instruction code address is delivered as an effective value. When a mask stores "0", the associated instruction code address is delivered as an ineffective value. When the ineffective value is outputted, it is assumed, for example, that each processor element 105 operates according to the instruction code address saved in the previous state, and the operation control information memory 1402 outputs the instruction code address in the previous state. The mask need not necessarily include one bit. When each mask stores only information to indicate whether or not each associated instruction code address is regarded as an effective value, the mask includes one bit. However, to store other information, the mask may include two or more bits.

When each of the masks 2203 to 2205 includes one bit, the bit width of the mask section 2202 is equal to the number of instruction code addresses.

Specifically, assume, for example, that an address for which the mask section 2202 indicates "1" is effective, and an address for which the mask section 2202 indicates "0" is ineffective. In FIG. 32(a), since each of positions 2203 and 2204 is "1" in the mask section 2202, Addr1 and Addr2 respectively associated with the positions 2203 and 2204 are valid. Therefore, an instruction code is sent to PE1 and PE2.

In the mask section 2202, a position 2205 is "0" and hence Addrn associated therewith is ineffective. Consequently, Addrn is not transmitted to PEn.

To cope with this situation, the system can be configured such that PEn uses an instruction code address immediately before employed for processing.

In the constitution, when it is desired to change the address only for PE1 and PE2, it is only necessary to generate a mask in which only the positions for PE1 and PE2 are effective. The address can be readily modified only for PE1 and PE2 regardless of addresses of the other processor elements 105 in the previous state.

Without using the configuration, to alter the address of each of PE1 and PE2 from "0" to "1", for example, in both cases in which the address of PEn is "0" and the address thereof is "1", there are required two entries, i.e., an entry in which the address of each of PE1 and PE2 is "0" and the address of PEn is "0" and an entry in which each of the address of PE1, PE2, and PE3 is "1".

Description will be given in more detail of an example in which the instruction code address of PE1 is changed by a state transition from "0" to "1" regardless of the value of PEn. In this example, the instruction code address of PEn is not changed by a state transition.

In this situation, if it is impossible to mask each instruction code address by the mask section 2202, there are required two entries (configurations) in the operation control information memory 1402, namely, an entry (configuration) to change, when the instruction code address of PEn is "0", the instruction code address of PE1 to "1" and an entry (configuration) to change, when the instruction code address of PEn is "1", the instruction code address of PE1 to "1".

In short, as the instruction code address stored in the instruction code address section 2201, two entries including "1, . . . , 0" and "1, . . ., 1" are required for the following reason. Since an instruction code address must be sent to each processor element 105 in any situation, if the entries (configurations) suitable for the respective states are not disposed, the state of PEn is changed. Therefore, when the PEn address is "0", the PE1 address is changed to "1" using the former entry while the PEn address is kept "0". When the PEn address is "1", the PE1 address is changed to "1" using the latter entry while the PEn address is kept "1".

On the other hand, when the mask section 2202 is provided, the situation above can be coped with only be an entry (configuration) of the operation control information memory 1402 indicating that the PE1 address is set to "1".

In other words, with one entry "1, . . ., −" ("−" means that nor address is produced), there can be achieved a transition in which the PE1 address is changed to "1" and the PEn address is kept unchanged.

Furthermore, the configuration is very effective when there exist a plurality of processor elements 105 for which the change above does not take place.

Since the address modification can be partly carried out for the processor elements 105, the number of entries of the operation control information memories 1402 can be remarkably reduced.

The operation can be achieved as follows. The instruction memory section 2201 of the operation control information memory 1402 is simply masked. When an associated mask value is "0" (the associated address is not regarded as an effective value), the associated address is not produced. When an associated mask value is "1", the associated address is directly delivered.

The operation can be similarly achieved using, for example, a logical product circuit. FIG. 32(b) shows an example of constitution of the circuit.

Referring to the example of FIG. 32(b), a selector 2206 is connected to an output port of an address (e.g., Addr1 in 32(a)) of the operation control information memory 1402. The selector 2206 delivers its output (Addr1' in this example) to the data path section 102. Through a branch, Addr1 is fed via a register 2207 back to an input port of the selector 2206. Moreover, the mask section 2202 of the operation control information memory 1402 delivers its output value (e.g., a mask 2203) to the selector 2206. The selector 2206 selects an output value (Addr1 or Addr1') according to the value (of the mask 2203). The register 2207 includes, for example, a flip-flop circuit to keep a previous output value (address).

Specifically, paying attention to Addr1 of FIG. 32(a), the mask 2203 being fed to the selector 2206 is "1" (Addr1 is effective) in this example and hence the selector 2206 selects and outputs Addr1. On the other hand, when the mask is, for example, "0" (Addr1 is ineffective), the selector 2206 selects and outputs the value kept in the register 2207.

However, the data path section control method using the mask section in accordance with the present invention is not restricted by the 11th embodiment. The embodiment can be modified and changed in various ways within a scope of the present invention in which the address is distributed according to a state using a mask.

[12th Embodiment of Data Path Section Control Method]

Referring next to the drawings, description will be given in detail of a 12th embodiment. In this embodiment, the 11th embodiment is applied not only to the processor elements 105 but also to the processor switch elements 106.

Figure 33:
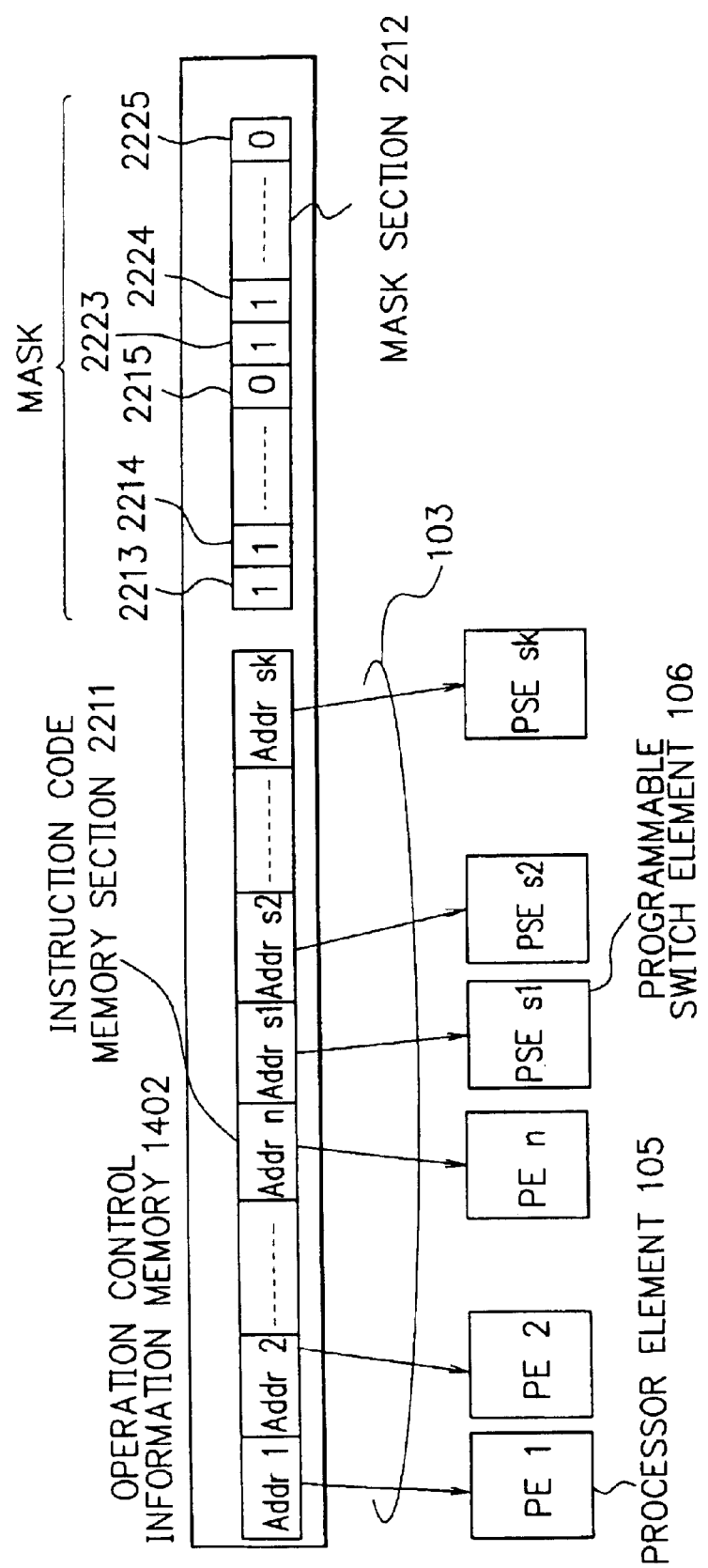
FIG. 33 is a schematic diagram showing a 12th embodiment of a control method of the data path section using the operation control information memory in an array-type processor in accordance with the present invention.

FIG. 33 shows in a block diagram the 12th embodiment of the method of controlling the data path section 102.

In FIG. 33, the data path section 102 includes as its feature an instruction code memory section 2211 and a mask section 2212 in the operation control information memory 1402.

In the construction, address modification can be accomplished only in some of the processor elements 105 controlled using the pertinent operation control information memory 1402.

Figure 32:
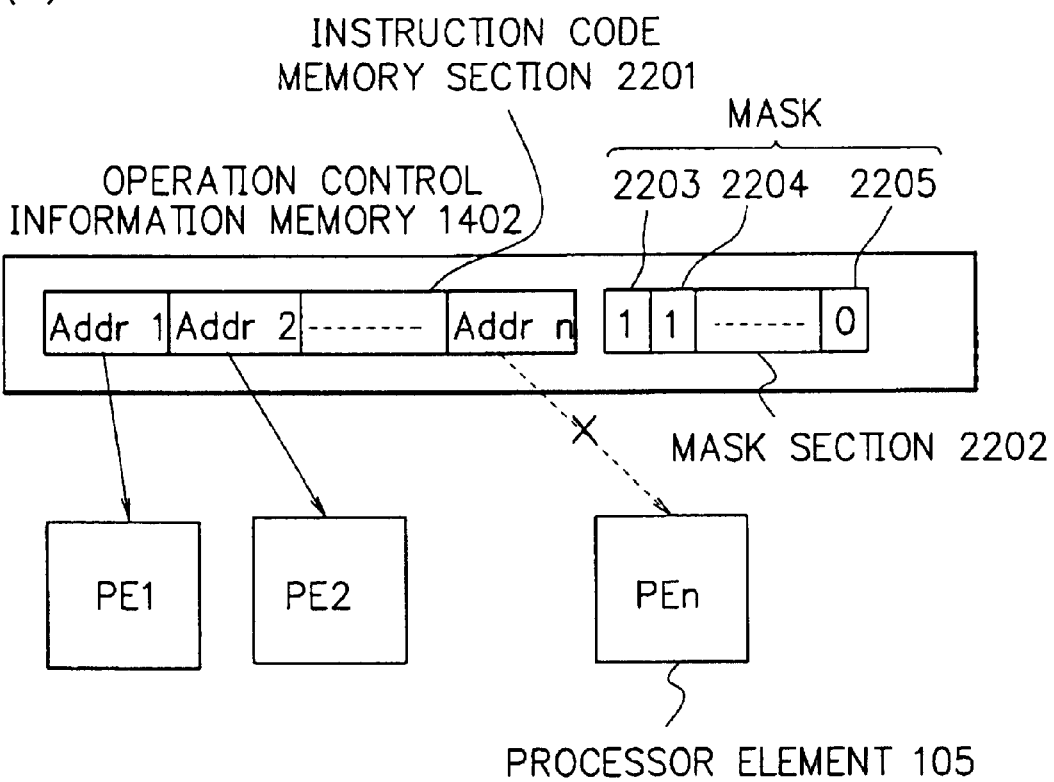
FIG. 32 is a diagram showing an 11th embodiment of a control method of the data path section using the operation control information memory in an array-type processor in accordance with the present invention in which (a) schematically shows the 11th embodiment and (b) shows a circuit configuration example to implement operation of the embodiment.
Figure 32:
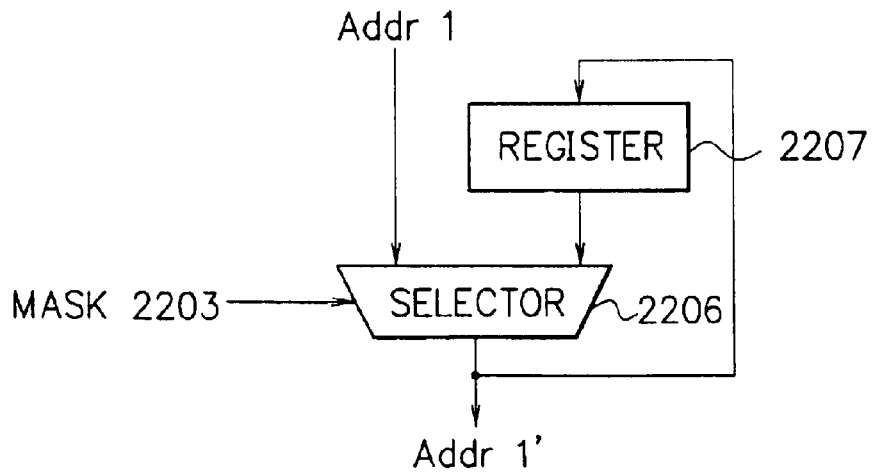

Assume, for example, that an address for which the mask section 2212 indicates "1" is effective, and an address for which the mask section 2212 indicates "0" is ineffective. In FIG. 32, since each of positions 2213, 2214, 2223, and 2224 is "1" in the mask section 2212, Addr1, Addr2, Addrs1, and Addrs2 respectively associated with the positions become valid. Consequently, an instruction code is fed to PE1, PE2, PSEs1, and PSEs2.

In the mask section 2212, positions 2215 and 2225 are "0" and hence Addrn and Addrsk associated therewith become ineffective. Therefore, Addrn is not transmitted to PEn and Addrsk is not fed to PSEsk.

To cope with this situation, the system can be configured such that PEn and PSEsk use respective instruction code addresses employed immediately before for processing.

In the constitution, when it is desired to alter the address only for PE1 and PSE1, it is only necessary to generate a mask in which only the positions for PE1 and PSEs1 are effective. The address can be readily modified only for PE1 and PSEs1 regardless of addresses of the other processor elements 105 in the previous state.

Without using the configuration, in a case in which it is desired to change an address of a PE from "0" to "1" in both cases in which the address of PEn or PSEk is "0" and the address thereof is "1", it is necessary to dispose an entry for each pattern of the current address of PEn or PSKn to change an address of the PE from "0" to "1". The reason therefor is the same as that described in conjunction with (a) and (b) of FIG. 32 corresponding to the 11th embodiment of the method of controlling the data path section 102.

Since the address modification can be partly carried out for the processor elements 105 and the programmable switch elements 106, the number of entries of the operation control information memories 1402 can be remarkably reduced.

[Instruction Code Address Issuing Timing]

Referring next to embodiments, description will be given in detail of timing at which the state transition table memory 202 issues an instruction code address in the array-type processor 1 in accordance with the present invention.

The signal issuance timing will be described by referring to FIG. 34 according to the second embodiment of the state transition table memory 202 in accordance with the present invention. For simplification of explanation, description will not be given of the configuration the forced state transition table 1113.

First, description will be given of a basic flow of the state transition. In the operation, "next state number 205" is obtained using "current state number 204" and "event 209 input". The "next state number 205" is set as "current state number 204" of a new (state transition destination).

When the circuit is operation in a synchronous fashion, the state transition at which the next state number 205 is set as the current state number 204 need only be conducted at timing synchronized with a clock signal fed to the sequencer section 201 of FIG. 3 (for example, a rising edge of the clock signal 207, which applies to examples in the following description). The event 209 (FIG. 3) is necessary to identify a next state number 205 in the state transition table memory 202. Therefore, it is necessary that the event 209 is inputted to the sequencer section 201 before the state transition timing at which the next state number 205 is set as the current state number 204.

[First Embodiment of Instruction Code Address Issuing Timing]

Figure 34:
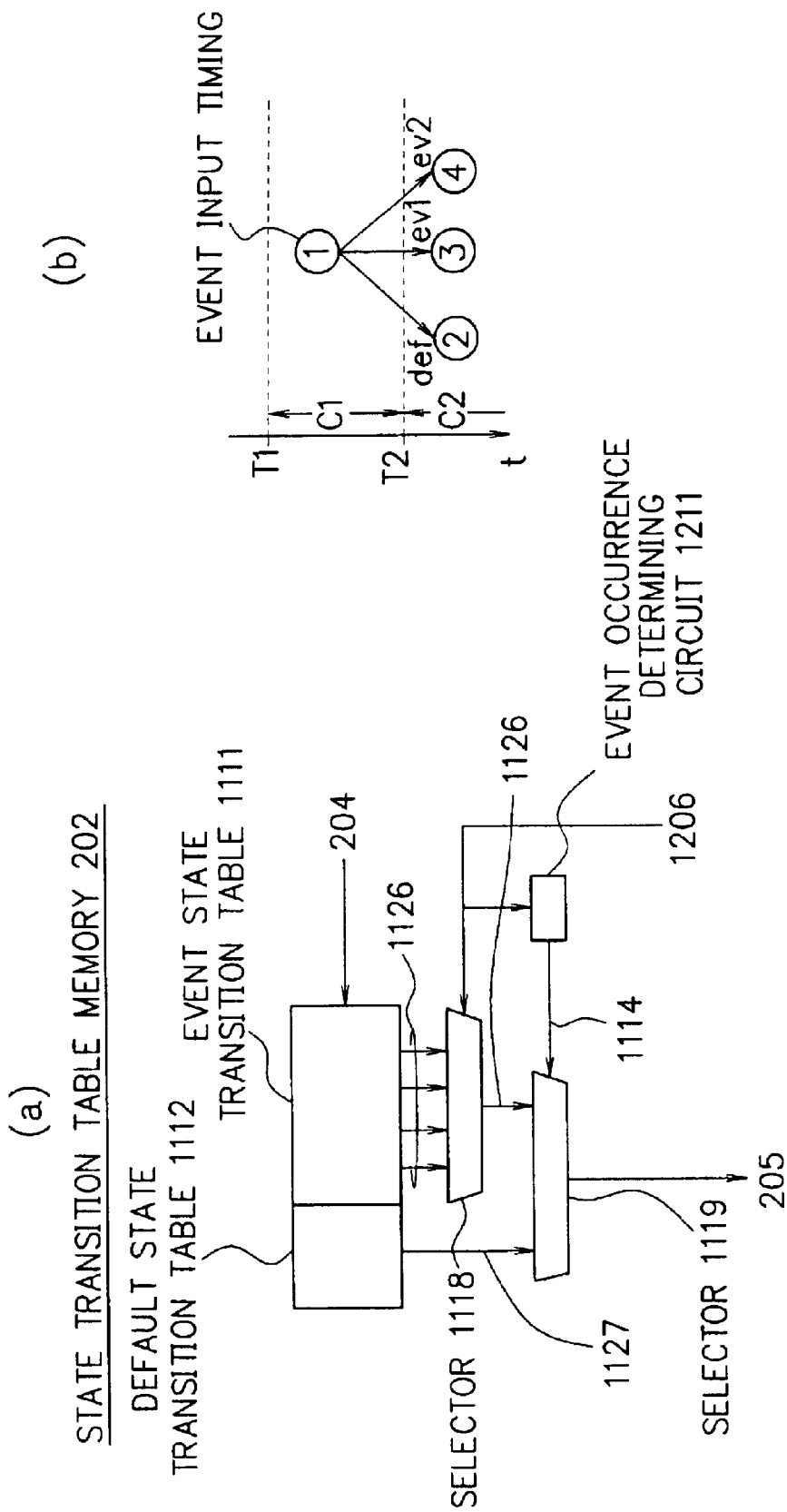
FIG. 34 is a schematic diagram to explain a first embodiment of instruction code address issuance timing of a state transition table memory in an array-type processor in accordance with the present invention in which (a) is a schematic block diagram of the first embodiment and (b) is a state transition timing chart of the first embodiment.

Referring to FIG. 34 showing a first embodiment of the instruction code address issuing timing, description will be given of timing at which the state transition table memory 202 issues an instruction code address.

The description will be similarly given by referring to the second embodiment of the state transition table memory 202 in accordance with the present invention, constitution of the state transition table memory 202 shown in (a) of FIG. 34, and a state transition timing chart shown in (b) of FIG. 34. For simplification of description, the configuration of the forced state transition table 1113 will be avoided.

For description of (b) of FIG. 34, assume the circuit is configured to operate at timing synchronized with a rising edge of its clock signal. In FIG. 34(b), "T1" and "T2" are rising edge timing of successive clock signals, respectively. A period of time between the timing points is called "cycle" (for example, a period from timing "T1" to a point immediately before timing "T2" is called cycle C1, which also applies to respective embodiments).

Under the condition described above, referring to FIG. 34(b), it is favorable in the present embodiment that the event 209 is supplied in a period of cycle C1 (however, it is desirable that the end point of cycle C1 is a point immediately before timing "T2" with slight margin). The state is changed simultaneously (synchronously) at timing of the rising edge of the clock signal.

Therefore, the state transition is efficiently (without delay) accomplished in this embodiment for the following reason. Before cycle C1, i.e., the period immediately before timing "T2", a next state number 205 is identified according to a combination of the current state number 204 and the inputted event 209 and then the identified next state number 205 is set as the current state number 204 immediately when timing "T2" appears. In short, when an event is inputted during a cycle of a state, the inputted event is interpreted within the cycle to change the state to a first state to be set in a succeeding cycle. The operation to change the state to a first state to be set in a succeeding cycle is possible that the next state number 205 is set as the current state number 204 (state transition) at timing of a clock (for example, a rising edge of the clock 207) supplied to the sequencer section 201 of FIG. 3. It is also possible to configure the system in which the event 209 is fed to the sequencer section 201 before timing "T1" such that the event 209 is kept in the sequencer 201 by, for example, a register. The leads to an advantage similar to that obtained in the configuration above.

Referring now to the configuration diagram of the state transition table memory 202 shown in FIG. 34(a), description will be given in detail of the state transition timing charge of FIG. 34(b) showing a process of state transition.

Referring to FIG. 34(a), the state is state (1) in cycle C1 in the state transition timing chart of FIG. 34(b). In this state, during the period of cycle C1, a current state number 204 (state (1)) is delivered to the event state transition table 1111 and the default state transition table 1112. In response to the input, the event state transition table 1111 outputs, for example, four next state numbers 1126 (two next state numbers 1126 for state (3) and state (4) in FIG. 34(b)) and the default state transition table 1112 outputs one next state numbers 1127 (one next state number 1127 for state (2) in FIG. 34(b)).

During the same period of cycle C1, an event identifying code 1206 is fed from the sequencer section 201 (FIG. 3) to the selector 1118 and the event occurrence determining circuit 1211. Therefore, if an event has taken place (for example, either one of the bits is "1" in the event identifying code 1206 configured as "1hot" in the description of FIG. 15), the selector 1118 selects an associated next state number from the next state numbers 1126 (states (3) and (4)) and outputs the selected next state number 1126 (state (3) or (4)) to the selector 1119. Moreover, during the period of cycle C1, in the event occurrence determining circuit 1211, an event matching signal 1114 indicating occurrence of an event is sent to the selector 1119. The default state transition table 1112 outputs a next state number (state (4)) corresponding to the current state number 204 to the selector 1119.

Resultantly, the selector 1119 outputs as the next state number either one of the next state numbers 1126 and 1127 (state (3), (4), or (2)) according to the event matching signal 1114. The operation up to this point is executed within cycle 1, namely, by a point immediately before timing "T2".

The next state number 205 is validated as the current state number 204 at timing "T2". In cycle C2, the current state number 204 is fed from the sequencer 201 to the state transition table memory 202.

[Second Embodiment of Instruction Code Address Issuing Timing]

Referring to the drawings, description will be given in detail of a second embodiment of instruction code address issuing timing in accordance with the present invention. Specifically, description will be given of timing at which the state transition table memory 202 of the present invention issues an instruction code address using the first embodiment of instruction code address issuing timing.

In the description of the second embodiment, as in the first embodiment of instruction code address issuing timing described above, there are used the second embodiment of the state transition table memory 202 in accordance with the present invention, the state transition table memory 202 shown in FIG. 35(a) and the state transition timing chart shown in FIG. 35(b). For simplification of description, constitution of the forced state transition table 113 will not be described.

When compared with the first embodiment of instruction code address issuing timing, the present invention has a feature that the event 209 is fed to the sequencer 201 (FIG. 2) at a point before two states (cycles) at which a conditional branch is carried out. (In the first embodiment, the event 209 is fed to the sequencer 201 at a point before two state (cycle) at which a conditional branch is carried out.)

The difference therebetween is that a register 3001 to keep an event identifying code 1206 is disposed at a stage before the selector 1118 and the event occurrence determining circuit 1211. The register 3001 includes, for example, a flip-flop circuit.

In this embodiment, the register 3001 achieves a conditional branch at timing "T3" shown in FIG. 35(b). In cycle C1 immediately before timing "T3" in FIG. 35(b), the event 209 is inputted to the sequencer section 201, which outputs an event identifying code 1206. The code 1206 is kept by the register 3001 at timing "T2". It is also possible to configure the system such that the event 209 is fed to the sequencer section 201 before timing "T1" to keep the event 209 by a register or the like. This configuration results in an advantage which is similar to those obtained from the configurations above.

Referring now to the configuration of the state transition table memory 202 shown in FIG. 35(a), description will be given of the state transition timing chart of FIG. 35(b) indicating a process of state transition.

In the description using (a) and (b) of FIG. 35, it is assumed that the circuit operates at timing synchronized with a rising edge of a clock signal. In FIG. 35(b), "T1", "T2", and "T3" are timing points of rising edges of respective particular clock signals. A period from timing "T1" to a point immediately before timing "T2" is called cycle C1 and a period from timing "T2" to a point immediately before timing "T3" is called cycle C2.

Under the condition, referring to FIG. 35(a), the event 209 is delivered to the sequencer 201 in cycle C1 in the state transition timing chart of FIG. 35(b).

Additionally, in cycle C1, a current state number 204 of state (1) is inputted to the event state transition table 1111 and the default state transition table 1112. In response to the input, the event state transition table 1111 produces, for example, four next state numbers 1126 (the number of the next state number does not restrict the present invention) for state (1). The default state transition table 1112 produces one next state number 1127 (one next state number 1127 of state (2) in FIG. 35(b)).

However, in the same period of cycle C1, since the event identifying code 1206 delivered from the sequencer section 201 is once kept in the register 3001, the event identifying code 1206 is not fed to the selector 1118 and the event occurrence determining circuit 1211. Consequently, there is established state (2) in which regardless of the output from the selector 1118, the next state number 205 from the selector 1119 is delivered as the next state number 1127. The next state number 205 (next state number 1127=state (2)) is fed to the sequencer section 201. At timing "T2", the next state number 205 is set as a current state number 204. Moreover, at timing "T2", the event identifying code 1206 inputted in cycle C1 is written in the register 3001.

Thereafter, in cycle C2, state (2) set as the current state number 204 at timing "T2" is fed to the event state transition table 1111 and the default state transition table 1112.

Accordingly, in cycle C2, the event state transition table 1111 outputs, for example, four next state numbers 1126 corresponding to state (2) (two next state numbers 1126 for states (4) and (5) in FIG. 35(b)) to the selector 1118. The default state transition table 1112 delivers one next state number 1127 corresponding to state (2) (one next state number 1127 of state (3) in FIG. 35(b)) to the selector 1119.

Furthermore, in cycle C2, the register 3001 supplies the event identifying code 1206 kept at timing "T2" to the selector 1118 and the event occurrence determining circuit 1211. In response thereto, the circuit 1211 then outputs an event matching signal 1114 to the selector 1119. In short, when there occurs an event in cycle C1, the selector 1118 sends the pertinent next state number 1126 (state (4) or (5)) to the selector 1119. From the selector 1119, the next state number 1126 (state (3) or (4)) received from the selector 1118 is outputted as a next state number 205. When no event occurs in cycle C1, regardless of the output from the selector 1118, the selector 1119 delivers as the next state number 205 the next state number 1127 (state (3)) received from the default state transition table 1112.

The delivered next state number 205 is supplied to the sequencer section 201 to be validated as a current state number 204 at timing "T3".

In the first embodiment of instruction code address issuing timing, (a next state number 205 in cycle C2) is identified according to ((current state number 204 in cycle C1)+(event 209 inputted in cycle C1)). In the configuration of the present embodiment, it is a feature that (a next state number 205 in cycle C3) is identified according to ((current state number 204 in cycle C2)+(event 209 inputted during the period of cycle C1)).

In this construction, the critical path can be minimized and the operating frequency of the array-type processor 1 can be increased in the present embodiment.

This is because that the event identifying code 1206 is fed to the state transition controller 101 according to a result of operation by the data path section 102 in a cycle (state).

In other words, when one cycle is configured to include all operations below. That is, when the event identifying code 1206 is fed to the selectors 1118 and 1119 and the next state number 205 is outputted, and the next state number 205 is delivered to the control information memory 203, for example, in the configuration example of FIG. 3, and an instruction code address is outputted to when the instruction code address is inputted to the instruction code memory 1501 (reference is to be made to, for example, FIG. 20). In this situation, this path as a critical path is long and hence the operation speed is lowered.

In the construction of the present embodiment, the path is divided into two relatively short critical paths by disposing a register 3001 at an intermediate point to thereby prevent the decrease in the operation speed. By accomplishing the two operations (the event transmission and the instruction address supply) in a pipeline operation, the throughput of the system and hence the overall processing performance can be increased.

However, in the first embodiment of instruction code address issuing timing, the next state number 205 is determined according to a combination of state (1) (corresponding to state (2) in the second embodiment) in cycle C1 in the first embodiment (corresponding to cycle 2 in the second embodiment) and the event 209 input. In the second embodiment of instruction code address issuing timing, the event 209 must be inputted in cycle C1 which is one cycle before the pertinent point (corresponding to the cycle immediately before cycle C1 in the first embodiment).

This leads to a drawback that determination of the state transition and timing to input the event 209 becomes complicated.

In this embodiment, when the event 209 cannot be inputted during cycle C1, timing of a conditional branch is delayed by one cycle for the following reason. In the state transition timing chart shown in FIG. 35(b), when the event cannot be inputted during cycle C1 and hence is inputted during cycle C2, it is necessary to dispose a dummy state in cycle C3. This delays actual timing of the conditional branch from timing "T3" by one cycle.

[Third Embodiment of Instruction Code Address Issuing Timing]

Referring to the drawings, description will be given in detail of a third embodiment of instruction code address issuing timing in accordance with the present invention. Concretely, description will be given of timing at which the state transition table memory 202 of the present invention issues an instruction code address using the second embodiment of instruction code address issuing timing.

Figure 36:
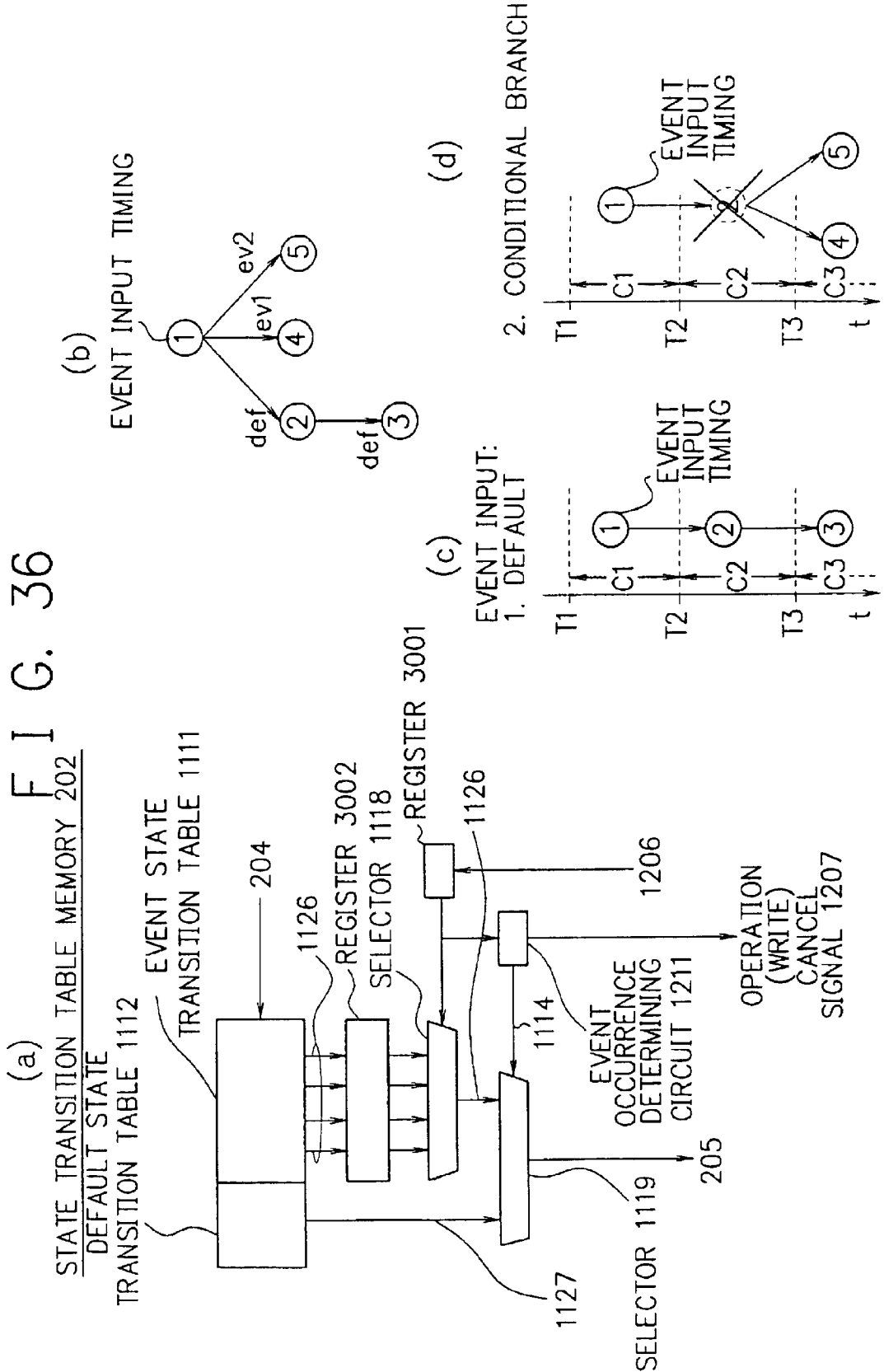
FIG. 36 is a schematic diagram to explain a third embodiment of instruction code address issuance timing of a state transition table memory in an array-type processor in accordance with the present invention in which (a) is a schematic block diagram of the third embodiment, (b) is a state transition timing chart of the third embodiment, (c) is a state transition timing chart associated with a default transition in the state transition, and (d) is a state transition timing chart associated with an event transition in the state transition.

In the description of the third embodiment, as in the second embodiment of instruction code address issuing timing described above, there are used the second embodiment of the state transition table memory 202 in accordance with the present invention, a configuration of the state transition table memory 202 shown in FIG. 36(a), the state transition diagram shown in FIG. 36(b), and the state transition timing charts shown in (c) and (d) of FIG. 36. For simplification of explanation, description of the construction of the forced state transition table 113 will be avoided.

In comparison with the second embodiment of instruction code address issuing timing, the present invention has a feature as shown in (c) and (d) of FIG. 36. That is, in state transition in the default mode, a normal state branch (state (1)→state (2)→state (3)) is implemented, and in state transition at occurrence of an event, an ineffective cycle exists at an intermediate point of the branch (state (1)→state (4) or (5)). According to the embodiment, when the event 209 is input supplied, the state is sequentially changed for each cycle according to the default state transition. When the event 209 is inputted, one ineffective cycle is disposed in a period from the input of the event 209 to the conditional branch. To implement the operation, the embodiment includes not only the register 3001 used in the second embodiment of instruction code issuing timing but also a register 3002 between an output port of the event state transition table 1111 and the register 3002. The register 3002 includes, for example, a flip-flop circuit.

The state transition will be described by referring to (c) and (d) of FIG. 36.

In the description in conjunction with (c) and (d) of FIG. 36, it is assumed that the circuit operates at timing synchronized with a rising edge of a clock signal as in the second embodiment. In (c) and (d) of FIG. 36, "T1", "T2", and "T3" are timing points of rising edges of respective particular clock signals. A period from timing "T1" to a point immediately before timing "T2" is called cycle C1 and a period from timing "T2" to a point immediately before timing "T3" is called cycle C2.

Under the condition, referring to FIG. 36(c), the state is state (1) in cycle C1 in this embodiment. When the event 209 is not delivered in the cycle C1, the state changed to state (2) in cycle (2) following the cycle C1. State (2) is then changed to state (3) in cycle C3 succeeding the cycle C2. In contrast thereto, referring to FIG. 36(d), when the event 209 is inputted in cycle C1, the state changed once to state (2) is canceled in cycle C2. In cycle C3 after the cycle C2, a state transition takes place (to state (4) or (5)) according to the event 209 inputted in cycle C1.

The state transition mode is quite efficient when transition frequently occurs in the default state and an event 209 is occasionally inputted for the following reason. In state transition according to a default state, although the state transition occurs without any cycle loss, there appears insertion of one useless cycle when the event 209 is inputted.

The state transition timing chart above will be described in detail by referring to the configuration of the state transition table memory 202 of FIG. 36(a).

Referring to FIG. 36(a), when the event 209 is supplied to the sequencer section 201 (FIG. 3) in cycle C1, the value thereof is fed to and is kept in the register 3001 at timing "T2". In cycle C1, state (1) is being fed as a current state number 204 to the event state transition table 1111 and the default state transition table 1112. Therefore, in cycle C1, the event state transition table 1111 produces, for example, four next state numbers 1126 (states (4) and (5) in (b) and (d) of FIG. 36) corresponding to state (1). The default state transition table 1112 produces a next state number 1126 (state (2) in (b), (c), and (d) of FIG. 36) corresponding to state (1). In this situation, since the next state number 1126 fed from the event state transition table 1111 is kept in the register 3002, no signal is delivered to the selector 1118 in cycle C1.

Since the event identifying code 1206 is not being fed to the selector 1118 and the event occurrence determining circuit 1211 in this case, an event matching signal 1114 is not supplied to the selector 1119. The selector 1119 forcibly sends to the sequencer section 201 the next state number 1127 (state (2)) received from the default state transition table 1112, the number 1127 being a next state number 205. In response thereto, the sequencer section 201 validates, at timing "T2", the received next state number 205 (state (2)) as a current state number 204 and outputs the current state number 204 in cycle C2. In this embodiment, for each conditional branch, a state delivered from the default state transition table 1112 is temporarily validated in cycle C2.

Subsequently, in cycle C2, the current state number 204 (state (2)) validated at timing "T2" is fed to the event state transition table 1111 and the default state transition table 1112. In association with state (2), the respectively tables 1111 and 1112 respectively output a next state number 1126 (the next state number 1126 is not limitative in accordance with the present invention) and a next state number 1127 (state (3) in (b), (c), and (d) of FIG. 36). Since the next state number 1126 kept in a preceding cycle, i.e., cycle C1 is remaining in the register 3002, the next state numbers 1127 fed to the selector 1118 in cycle C2 are the stored values (states (4) and (5) in (b) and (d) of FIG. 36).

The event identifying code 1206 kept in the register 3001 at timing "T2" is fed to the selector 1118 and the event occurrence determining circuit 1211 in cycle C2.

Consequently, for example, when an event occurs in cycle C2, a next state number 1126 (state (4) or (5) in (b) and (d) of FIG. 36) associated with the event identifying code 1206 is selected to be supplied to the selector 1119. Since the event occurrence determining circuit 1211 delivers an event matching signal 1114 indicating presence of an event to the selector 1119, the selector 1119 selects the next state number 1126 (state (4) or (5)) received from the selector 1118 and outputs the number 1126 as a next state number 205. The number 205 is then inputted to the sequencer section 201 to be validated as a current state number 204 at timing "T3". The number 204 is then delivered in cycle C3. However, in this state, since state (2) outputted as the current state number 204 from the default state transition table 1112 is validated, conflict occurs in operation. To overcome such difficulty in accordance with the configuration of the present embodiment, at a point of time in cycle C2 when the event occurrence determining circuit 1211 determines occurrence of an event according to the event identifying code 1206, the event occurrence determining circuit 1211 feeds an operation (write) cancel signal 1207 to the data path section 102 to cancel an operation (write, etc.) currently being executed. In this configuration, the operation being executed in cycle C2 is canceled and an operation according to the current state number 204 validated at timing "T3" is then continuously executed after the previous state (state (1) in this case).

In contrast thereto, when an event does not occur in cycle C2, like in the second embodiment, the selector selects a next state number 1127 (state (3)) from the default state transition table 1112 corresponding to the current state number 204 (state (2)) and then outputs the number 1127 as a next state number 205. associated with the event identifying code 1206 is selected to be supplied to the selector 1119. The number 205 (state (3)) is then inputted to the sequencer section 201 to be validated as a current state number 204 at timing "T3". The number 204 is then outputted in cycle C3. However, since no event occurs in this operation, the event occurrence determining circuit 1211 does not produce the operation (write) cancel signal 1207.

After the operation, at timing "T3", when an event 209 has been inputted in cycle C1, a next state number 205 (corresponding to state (4) or (5) in (b) and (d) of FIG. 36) corresponding to the event 209 is set as a current state number 204.

When an event 209 is absent in cycle C1, a next state number 205 (corresponding to state (3) in FIG. 36(*b*)) outputted according to the default state transition table 1112 is set as a current state number 204.

[State for Each Cycle of Instruction Code Address Issuing Timing In First to Third Embodiments]

Figure 38:
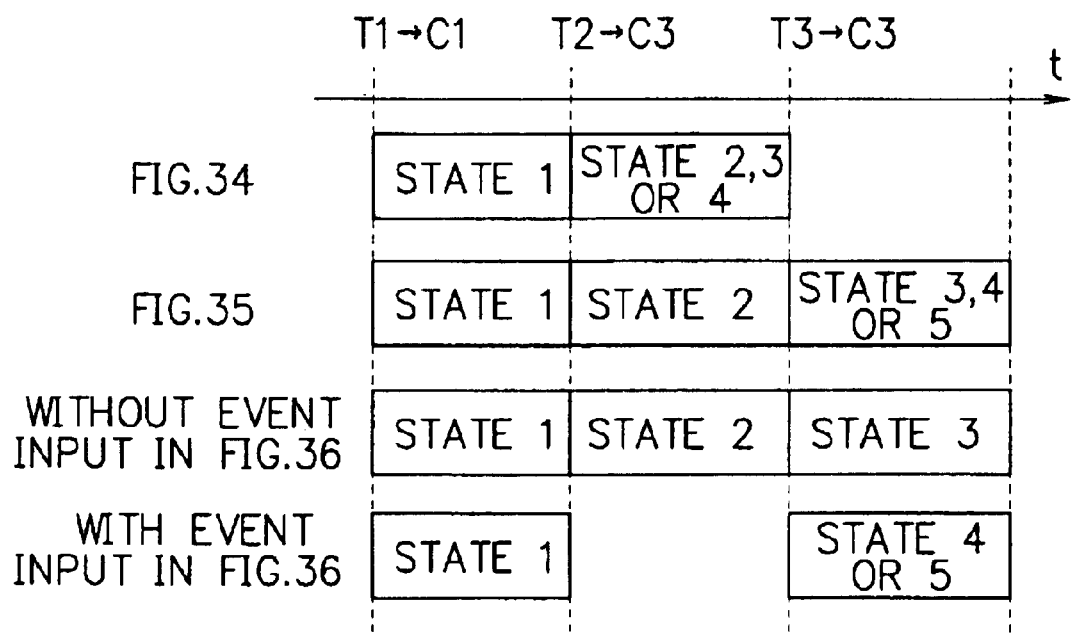
FIG. 38 is a diagram for comparing states of respective cycles in the first to third embodiments of instruction code address issuing timing in association with a state transition table memory in an embodiment of an array-type processor in accordance with the present invention.

Referring now to FIG. 38, states of the respective cycles of instruction code address issuing timing in first to third embodiments will be compared with each other.

Referring to FIG. 38, for the first to third embodiments of instruction code address issuing timing, the period from timing "T1" to a point immediately before timing "T2" of cycle C1 is in state (1).

In this state, according to the first embodiment, an event (including no event) and a current state number 204 (state (1)) are inputted in cycle C1, and a next state number 205 (state (2), (3), or (4)) corresponding to a combination thereof is outputted. Therefore, at timing "T2", the next state number 205 corresponding to the combination is validated as a current state number 203. In cycle C2, the state transition takes place at timing "T2" according to the current state number 204.

In the second embodiment, since the event inputted in cycle C1 is kept in the register 3001 at timing "T2", the state of cycle C2 is set to state (2) according to default transition. Therefore, a next state number 205 (state (3), (4), or (5)) corresponding to a combination of the event kept in the register 3001 and state (2) is produced. At timing "T3", the number 205 is validated as a current state number 204.

In the third embodiment, like in the second embodiment, the event inputted in cycle C1 is kept in the register 3001 at timing "T2". Therefore, at timing "T2", a next state number 1127 (state (2)) which is outputted in cycle C1 and which corresponds to state (1) in the default state transition table 1112 is validated as a current state number 204. In cycle C1, however, the event state transition table 1111 outputs a next state number 1126 (state (4) or (5)) corresponding to state (1) is kept in the register 3002.

When no event occurs, like in the second embodiment, the default state transition table 1112 outputs a next state number 1127 (state (3)) corresponding to state (2) set as the current state number 204 at timing "T2". The number 1127 is validated as a current state number 204 at timing "T3".

When an event occurs, the state (2) in execution is canceled by the operation (write) cancel signal 1207. In place thereof, the next state number 1126 (state (4) or (5)) kept in the register 3002 in cycle C1 is validated as a current state number 204.

[Fourth Embodiment of Instruction Code Address Issuance Timing]

Figure 37:
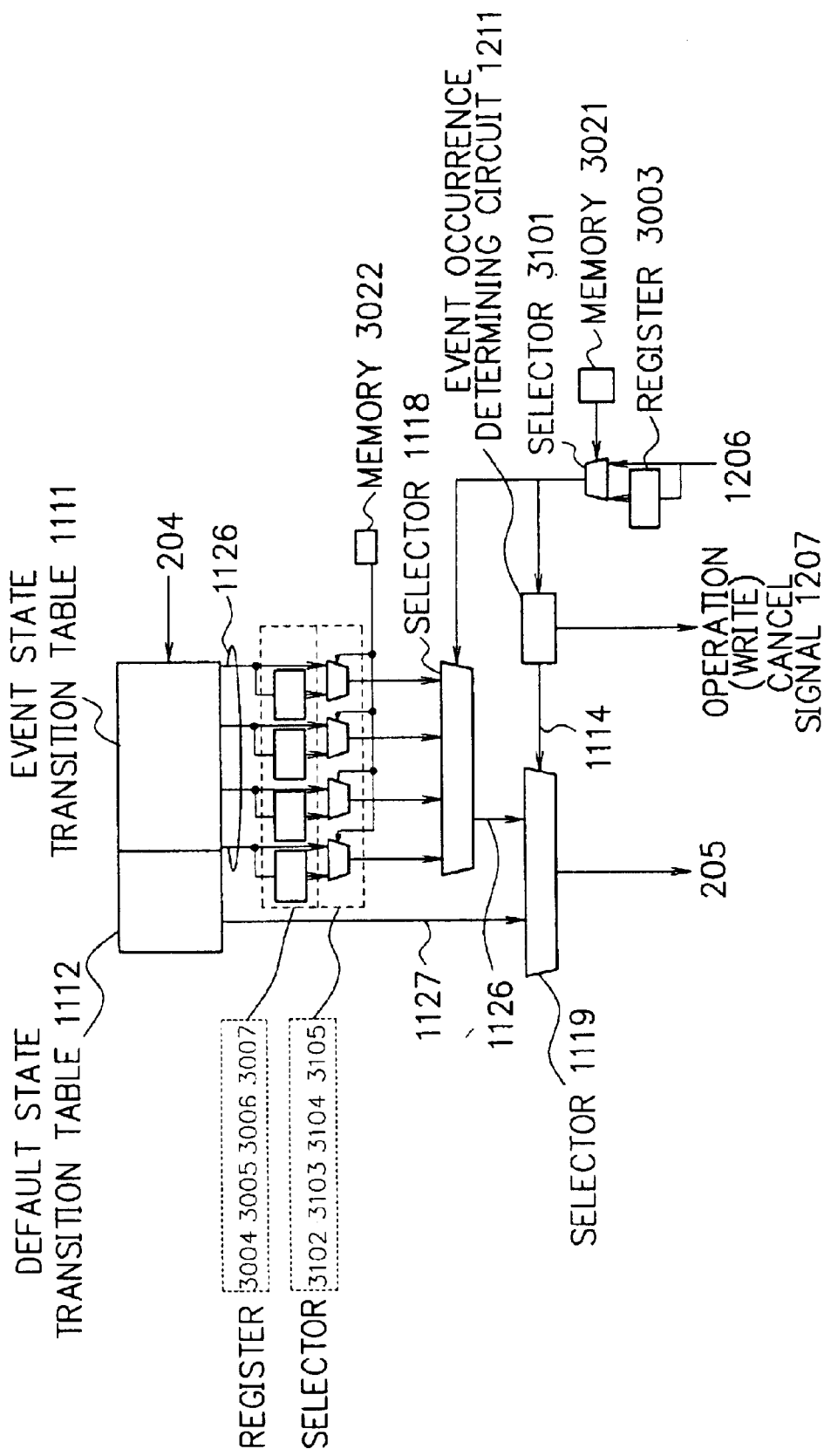
FIG. 37 is a schematic diagram to explain a fourth embodiment of instruction code address issuance timing of a state transition table memory in an array-type processor in accordance with the present invention.

In the first to third embodiments of instruction code address issuance timing, it is possible to execute processing by selecting either one thereof by configuring the system as shown in FIG. 37. Description will be given in detail of this configuration as a fourth embodiment of instruction code address issuance timing.

Also in the description of this embodiment, the second embodiment of the state transition table memory 1402 in accordance with the present invention is employed. For simplification of explanation, description of the configuration of the forced state transition table memory 1113 will be avoided.

Referring to FIG. 37, the event state transition table 1111 produces respective outputs. The outputs are each fed to two ways through a branch such that the outputs in a first way are fed respectively via registers 3004 to 3007 to selectors 3102 to 3105, respectively. The outputs in a second way are directly delivered to the selectors 3102 to 3105, respectively. The selectors 3102 to 3105 are connected to a memory 3022 corresponding to an output from the instruction decoder 1502 shown in FIG. 20 such that an instruction code decoded by the decoder 1502 is used in the selection by the respective selectors 3102 to 3105 (use of each of the registers 3004 to 3007).

In this embodiment, an event identifying code 1206 to be fed to the selector 1118 and the event occurrence determining circuit 1211 is also fed to two ways through a branch. A signal in a first way is fed via a register 3003 to the selector 3101 and a signal in a second way is directly fed to the selector 3101. The selector 3101 is also connected to a memory 3021 corresponding to an output from the instruction decoder 1502 shown in FIG. 20 such that an instruction code decoded by the decoder 1502 is used in the selection by the selectors 3101 (use of the register 3003).

Each of the registers 3003 to 3007 includes, for example, a flip-flop circuit.

In the configuration according to the present embodiment, by controlling the values of the memories 3022 and 3021, it is possible to select for the execution of processing by selecting either one of the first to third embodiments of instruction code address issuing timing shown in FIGS. 34 to 36, respectively.

For the selection of one of the embodiments, it is possible to fixedly assign the embodiment when the application is installed or it is possible to select one of the embodiments during the operation (state transition).

In the array-type processor in accordance with the present invention, the processor element array associated with the data path section can be dedicatedly used for the processing of operations. The state transition control section can be specialized to conduct operation as a state transition unit and to facilitate flexible control of the data path section. This advantageously leads to reduction in area and increase in processing performance.

In the operation as a state transition unit, specifically, in the operation to select one of a transition destinations according to a condition, the period of time necessary to jump to the destination is fixed regardless of the number of states of the transition destinations for selection. Moreover, in the table containing description of state transitions, the unnecessary areas caused by variation in the number of states of the transition destinations can be advantageously suppressed.

A destination of transition when the condition is satisfied and a transition destination when the condition is not satisfied can be easily described.

In the state transition method, control only in the state transition control section, control by a signal from the data path section, and control by a signal from the array-type processor are available. This advantageously increases flexibility of the condition setting for the state transition.

As the method for the state transition control section to control the data path section, there are provided a method to independently control all processor elements and all programmable switch elements, a method to classifying the elements in fixed groups, a method to determine classification of groups of elements, and a method to control only part of the elements.

In addition, in the control operation of the data path section by the state transition control section, it is possible that all processor elements and all programmable switch elements are independently controlled, several elements is fixedly assigned to a group, the grouping is determined and controlled by a program, or only part of the elements are controlled.

It is therefore possible to configure an array-type processor in consideration of balance between flexibility of control of the data path section according to purposes and the quantity of resources required for the control operation.

There is also available a method in which the state transition control section does not achieve all control operations, but the data path section generates therein control signals to directly control operations in the data path section. This considerably increase flexibility of the control operation.

While the present invention has been described with reference to the particular illustrative embodiments, it is not to be restricted by those embodiments but only by the appended claims. In these embodiments, even though description of element of the array-type processor and of address are a singular number, the present invention is not restricted. That is, a countable noun used in this specification containing these element(s) and address(es) may be a singular number or plural number. And decision of operating of data path may be executed one address or, two or more addresses. It is to be appreciated that those skilled in the art can change or modify the embodiments without departing from the scope and spirit of the present invention.

What is claimed is:

1. An array-type processor, comprising:
    a state transition control section including
        a state transition table memory for storing a state transition table in which transition rules between a plurality of operation states are written, and
        a sequencer section for controlling, using the state transition table memory, transitions between the operation states and for determining the operation states at a particular point of time; and
    a data path section independent of said state transition control section, including
        a plurality of processor elements for executing processing of operations according to the operation states determined by said state transition control section, and
        a plurality of programmable switch elements for connecting the processor elements to each other according to the operation states determined by said state transition control section,
    said processor elements and said programmable switch elements being electrically connected in a two-dimensional array shape, wherein:
    each said processor element includes
        an instruction code memory for storing a plurality of instruction codes,
        an instruction decoder for decoding an instruction code read from said instruction code memory, and
        an operating section for executing processing of operation according to the instruction code decoded by said instruction decoder; and
    each said programmable switch element includes a connection layout information memory for storing a plurality of sets of connection layout information, the information indicating a connection layout between said processor elements and said programmable switch elements and/or between said programmable switch elements.

2. The array-type processor in accordance with claim 1, wherein said state transition control section conducts a control operation according to a transition of the operation state by said state transition control section itself and/or a transition of the operation state by inputting an event from said data path section and/or a transition of the operation state by inputting an event from an external device.

3. The array-type processor in accordance with claim 1, further comprising an operation control bus for electrically connecting said state transition control section to said data path section, wherein,
    said state transition control section outputs an address of said instruction code memory and/or an address of said connection layout information memory via said operation control bus according to the operation states at a particular point of time.

4. The array-type processor in accordance with claim 3, comprising one or more said operation control buses, wherein:
    said state transition control section outputs the address to said operation control buses; and
    said each processor element and/or said each programmable switch element select/selects one of said operation control buses to input the address.

5. The array-type processor in accordance with claim 3, wherein said state transition control section concurrently supplies mutually independent said independent addresses respectively to said processor elements and respectively to said programmable switch elements.

6. The array-type processor in accordance with claim 3, wherein:
    said processor elements and/or said programmable switch elements are classified into groups; and
    one said address is supplied to one of said groups.

7. The array-type processor in accordance with claim 5 or 6, wherein:
    said address is supplied only to a part of said processor elements and/or a part of said programmable switch elements according to the operation states at a particular point of time; and
    each of other said processor elements and other said programmable switch elements continuously uses said address immediately used before the operation state at a particular point of time.

8. The array-type processor in accordance with claim 3, wherein:
said operation control buses are arranged for said processor elements and said programmable switch elements;
said state transition control section outputs said address to said operation control buses; and
each of said processor elements and/or said programmable switch elements selects one of said operation control buses in the vicinity thereof to obtain said address.

9. The array-type processor in accordance with claim 3, wherein:
said operation control buses are disposed respectively for said processor elements and said programmable switch elements,
said operation control buses being independent of each other,
said independent operation control buses conducting mutually independent control operations for said processor elements and said programmable switch elements, respectively.

10. The array-type processor in accordance with claim 1, wherein said each processor element includes a register for recording operation data.

11. The array-type processor in accordance with claim 10, wherein said each processor element executes processing of operation for external input data received from an external device or for the operation data under control of said state transition control section and outputs a result of the processing as output data to the external device or records a result of the processing in said register.

12. The array-type processor in accordance with claim 1, further comprising an event notifying bus for electrically connecting said state transition control section to said data path section,
said data path section notifying a result of processing as an event via said event notifying bus to said state transition control section.

13. The array-type processor in accordance with claim 1, wherein said sequencer section controls state transitions from the operation states to the same operation states or to other different operation states according to the state transition rules written in said state transition table memory and sets said same or other different operation states as new operation states.

14. The array-type processor in accordance with claim 1, wherein said state transition table is recorded in a list format including a plurality of script entries of the operation states,
each said script entry including a state number to identify a first state at a point of time, a state number to identify a second state of a state transition destination at a subsequent point of time, and a state transition condition for a transition from the first state to the second state.

15. The array-type processor in accordance with claim 13, wherein said state transition control section includes a control information memory for controlling an address of said instruction code memory and/or an address of said connection layout information memory in association with the first state number at the point of time or the second state number at the subsequent point of time,
the address of said instruction code memory and/or the address of said connection layout information memory being identified using said control information memory according to the first state number at the point of time or the second state number at the subsequent point of time identified using said state transition table.

16. The array-type processor in accordance with claim 13, wherein said state transition control section includes a state transition table for controlling the next state number of the subsequent point of time and an address of said instruction code memory and/or an address of said connection layout information memory in association with the first state number at the point of time,
said state transition table identifying the next state number of the subsequent point of time and the address of said instruction code memory and/or the address of said connection layout information memory using the first state number at the point of time.

17. The array-type processor in accordance with claim 14, wherein said state transition table includes
an event state transition table containing the entries, each said entry including a state number at a point of time, a state number at the subsequent point of time, and the state transition condition and
a default state transition table containing the entries, each said entry including a state number at the point of time and a state number of the subsequent point of time,
a state transition being achieved when the state transition condition is satisfied, according to said event state transition table,
a state transition being achieved when the state transition condition is not satisfied, according to said default state transition table.

18. The array-type processor in accordance with claim 14, wherein a plurality of said script entries correspond to said state number at a certain point of time,
said script entries having different state transition conditions, respectively, in case when the number of said script entries for said state number is two or more.

19. The array-type processor in accordance with claim 15, wherein said sequencer section generates an event identifying code from an event and searches said state transition table memory using the state number at a point of time and the event identifying code,
when there is found in the search an entry which has a state number matching the state number at a point of time and for which the event identifying code satisfies the state transition condition, a state of the state transition destination is determined according to the state number at a subsequent point of time in the entry.

20. The array-type processor in accordance with claim 19, wherein when the event is not notified, said sequencer section generates an event identifying code indicating that the event is not generated and searches said state transition table memory using a combination of the state number at a point of time and the event identifying code.

21. The array-type processor in accordance with claim 17, wherein:
said sequencer section generates an event identifying code from an event and searches said event state transition table using the state number at a point of time and the event identifying code and searches said default transition table memory using the state number at a point of time,
when there is found in the search an entry for which the state number and the event identifying code result in a matching state, a state of the state transition destination is determined according to the state number at a subsequent point of time in the entry and
when there is not found in the search an entry for which the state number and the event identifying code result in a matching state, a state of the state transition destination is determined according to the state number of a subsequent point of time in the script entry in the default state transition table for which the state number at a point of time results in a matching state.

22. The array-type processor in accordance with claim 19, wherein the state number at a point of time and the event identifying code are inputted to a content address memory including said state transition table, a collation is concurrently conducted for the content address memory and the script entry, and when the collation results in a matching state for the script entry, the state number at a next point of time of the script entry is outputted from the content address memory.

23. The array-type processor in accordance with claim 17, wherein when a state number of the next point of time is being generated, generation of the address corresponding to the state of the state transition destination is carried out.

24. The array-type processor in accordance with claim 17, wherein after start or completion of generation of the second state number at the subsequent point of time, an address of said instruction code memory and/or an address of said connection layout information memory are/is generated corresponding to the state of the transition destination.

25. The array-type processor in accordance with claim 14, further including a register in a path from the start point of generation of the state number at the next point of time to when the address of said instruction code memory and/or the address of said connection layout information memory reach/reaches said processor elements and said programmable switch elements, the start point of generation of the state number at the next point of time and the point of time when said processor elements and said programmable switch elements receive the addresses/address are assigned to mutually different cycles.

26. The array-type processor in accordance with claim 14, wherein a period of time from the start point of generation of the state number at the next point of time to when the address of said instruction code memory and/or the address of said connection layout information memory reach/reaches said processor elements and said programmable switch elements is assigned to one independent cycle.

27. The array-type processor in accordance with claim 19, further comprising a first register on a connection line to propagate the event identifying code from said sequencer section to said state transition table memory, said first register temporarily keeping the event identifying code on said connection line, thereby separating a cycle in which the start point of generation of the state number at the next point of time from a cycle in which said processor elements and said programmable switch elements receive the address of said instruction code memory and/or the address of said connection layout information memory reach/reaches.

28. The array-type processor in accordance with claim 27, wherein said state transition table memory includes one or more second registers each of which keeps the state number at the subsequent point of time in each entry including the state number at a point of time, said state transition table memory selecting and outputting, when the state transition condition is satisfied, either one of the state numbers of the subsequent points of time kept in said second registers, the selected one state number satisfying the state transition condition.

29. The array-type processor in accordance with claim 28, further comprising a selector for selecting whether or not each of said first and second registers is to be used, said instruction code including control information for controlling whether or not said first register and said second register are to be used, said selector selecting, according to said instruction code, whether or not said first register and said second register are to be used.

30. The array-type processor in accordance with claim 1, wherein said state transition control section includes a clock signal input terminal and synchronizes operation of a transition of the operation state at a rising point and/or a falling point of a clock signal inputted to said clock signal input terminal.

31. The array-type processor in accordance with claim 1, wherein said state transition control section forcibly conduct a transition of the operation state by a forced state transition signal to cause a state transition regardless of the operation state at the current point of time.

32. The array-type processor in accordance with claim 1, wherein said state transition table includes a forced state transition table to detect a matching state with respect to the event identifying code inputted thereto, when said forced state transition table contains a script entry matching the event identifying code inputted to said state transition table, a state number of a subsequent point of time described in the entry is forcibly set as a state of the state transition destination.

33. The array-type processor in accordance with claim 1, wherein said state transition control section includes an operation control information memory for controlling said data path section.

* * * * *